US009857800B2

(12) United States Patent
Ben Shalom et al.

(10) Patent No.: US 9,857,800 B2
(45) Date of Patent: Jan. 2, 2018

(54) SYSTEMS AND METHODS FOR DETERMINING THE STATUS OF A TURN LANE TRAFFIC LIGHT

(71) Applicant: MOBILEYE VISION TECHNOLOGIES LTD., Jersualem (IL)

(72) Inventors: Itai Ben Shalom, Mazkaret Batya (IL); Shai Shalev-Shwartz, Jerusalem (IL); Eyal Bagon, Jerusalem (IL); Yoav Taieb, Jerusalem (IL); Amnon Shashua, Mevaseret Zion (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 21 days.

(21) Appl. No.: 15/176,813

(22) Filed: Jun. 8, 2016

(65) Prior Publication Data
US 2016/0283807 A1    Sep. 29, 2016

Related U.S. Application Data

(63) Continuation of application No. 14/610,404, filed on Jan. 30, 2015, now Pat. No. 9,365,214.
(Continued)

(51) Int. Cl.
*G06T 7/00* (2017.01)
*G05D 1/02* (2006.01)
(Continued)

(52) U.S. Cl.
CPC .......... *G05D 1/0276* (2013.01); *B60K 31/00* (2013.01); *B60T 7/12* (2013.01); *B60W 10/20* (2013.01);
(Continued)

(58) Field of Classification Search
None
See application file for complete search history.

(56) References Cited

U.S. PATENT DOCUMENTS 6,223,125 B1   4/2001   Hall
6,516,262 B2   2/2003   Takenaga et al.
(Continued)

FOREIGN PATENT DOCUMENTS

DE   102013111933   6/2014

OTHER PUBLICATIONS

Cai et al., "Real-time Arrow Traffic Light Recognition System for Intelligent Vehicle," The 2012 World Congress in Computer Science, Computer Engineering, and Applied Computing, Jul. 2012, Las Vegas, NV, 7 pages.
(Continued)

*Primary Examiner* — Delomia L Gilliard
(74) *Attorney, Agent, or Firm* — Finnegan, Henderson, Farabow, Garrett & Dunner, LLP

(57) ABSTRACT

Systems and methods use cameras to provide autonomous navigation features. In one implementation, a traffic light detection system is provided for a vehicle. One or more processing devices associated with the system receive at least one image of an area forward of the vehicle via a data interface, with the area including at least one traffic lamp fixture having at least one traffic light. The processing device(s) determine, based on at least one indicator of vehicle position, whether the vehicle is in a turn lane. Also, the processing device(s) process the received image(s) to determine the status of the traffic light, including whether the traffic light includes an arrow. Further, the system may cause a system response based on the determination of the status of the traffic light, whether the traffic light includes an arrow, and whether the vehicle is in a turn lane.

25 Claims, 49 Drawing Sheets

Related U.S. Application Data

(60) Provisional application No. 61/933,325, filed on Jan. 30, 2014, provisional application No. 61/993,111, filed on May 14, 2014, provisional application No. 62/040,246, filed on Aug. 21, 2014, provisional application No. 62/060,603, filed on Oct. 7, 2014, provisional application No. 62/102,669, filed on Jan. 13, 2015.

(51) Int. Cl.

| | | |
|---|---|---|
| *B60W 30/00* | (2006.01) | |
| *G06K 9/00* | (2006.01) | |
| *B60T 7/12* | (2006.01) | |
| *B62D 6/00* | (2006.01) | |
| *B60W 10/20* | (2006.01) | |
| *B60K 31/00* | (2006.01) | |
| *B60W 30/09* | (2012.01) | |
| *B60W 30/14* | (2006.01) | |
| *G01S 19/42* | (2010.01) | |
| *G05D 1/00* | (2006.01) | |
| *H04N 7/18* | (2006.01) | |
| *G08G 1/095* | (2006.01) | |
| *G06T 7/62* | (2017.01) | |
| *B60W 30/12* | (2006.01) | |

(52) U.S. Cl.
CPC ............ *B60W 30/00* (2013.01); *B60W 30/09* (2013.01); *B60W 30/14* (2013.01); *B62D 6/00* (2013.01); *G01S 19/42* (2013.01); *G05D 1/0088* (2013.01); *G05D 1/0246* (2013.01); *G06K 9/00798* (2013.01); *G06K 9/00805* (2013.01); *G06K 9/00825* (2013.01); *G06T 7/62* (2017.01); *G08G 1/095* (2013.01); *H04N 7/181* (2013.01); *H04N 7/183* (2013.01); *B60W 30/12* (2013.01); *B60W 2420/42* (2013.01); *B60W 2550/10* (2013.01); *B60W 2550/142* (2013.01); *B60W 2710/207* (2013.01); *G06T 2207/30256* (2013.01); *G06T 2207/30261* (2013.01)

(56) References Cited

U.S. PATENT DOCUMENTS

| | | |
|---|---|---|
| 7,398,076 B2 | 7/2008 | Kubota et al. |
| 7,587,271 B2 | 9/2009 | Kiim |
| 7,821,422 B2 | 10/2010 | Hutchison et al. |
| 7,890,231 B2 | 2/2011 | Saito et al. |
| 8,064,643 B2 | 11/2011 | Stein et al. |
| 8,170,340 B2 | 5/2012 | Klefenz |
| 8,224,550 B2 | 7/2012 | Kudo |
| 8,559,673 B2 | 10/2013 | Fairfield et al. |
| 8,620,032 B2 | 12/2013 | Zeng |
| 8,638,990 B2 | 1/2014 | Kudo |
| 8,675,909 B2 | 3/2014 | Silvertsen |
| 8,761,991 B1 | 6/2014 | Ferguson et al. |
| 8,831,849 B2 | 9/2014 | Joshi et al. |
| 9,256,791 B2 | 2/2016 | Stein et al. |
| 2003/0016143 A1 | 1/2003 | Ghazarian |
| 2005/0200500 A1 | 9/2005 | Wing |
| 2008/0015772 A1 | 1/2008 | Sanma et al. |
| 2008/0243378 A1* | 10/2008 | Zavoli .................... G01C 21/28 701/533 |
| 2008/0291276 A1 | 11/2008 | Randler |
| 2010/0033571 A1 | 2/2010 | Fujita et al. |
| 2012/0288150 A1 | 11/2012 | Kido |
| 2012/0313770 A1* | 12/2012 | Zeiger .................... B60K 35/00 340/441 |
| 2013/0110371 A1 | 5/2013 | Ogawa |
| 2013/0142393 A1 | 6/2013 | Lord et al. |
| 2013/0229520 A1 | 9/2013 | Aimura |
| 2013/0253754 A1 | 9/2013 | Ferguson et al. |
| 2014/0277986 A1 | 9/2014 | Mahler et al. |
| 2015/0086080 A1* | 3/2015 | Stein .................. G06K 9/00798 382/104 |
| 2016/0161270 A1* | 6/2016 | Okumura ............... G01C 21/34 701/23 |
| 2016/0203719 A1* | 7/2016 | Divekar ................... B60R 1/00 701/70 |
| 2016/0363647 A1* | 12/2016 | Zeng ..................... G01S 5/0263 |

OTHER PUBLICATIONS

Fairfield et al., "Traffic Light Mapping and Detection," Proceedings of the IEEE International Conference on Robotics and Automation, May 2011, Shanghai, China, 6 pages.

Stein et al., U.S. Appl. No. 14/554,500, filed Nov. 26, 2014.

Real-time Arrow Traffic Light Recognition System for Intelligent Vehicle. Zixing Cai, Mingqin Gu, Yi Li. May 2012.

\* cited by examiner

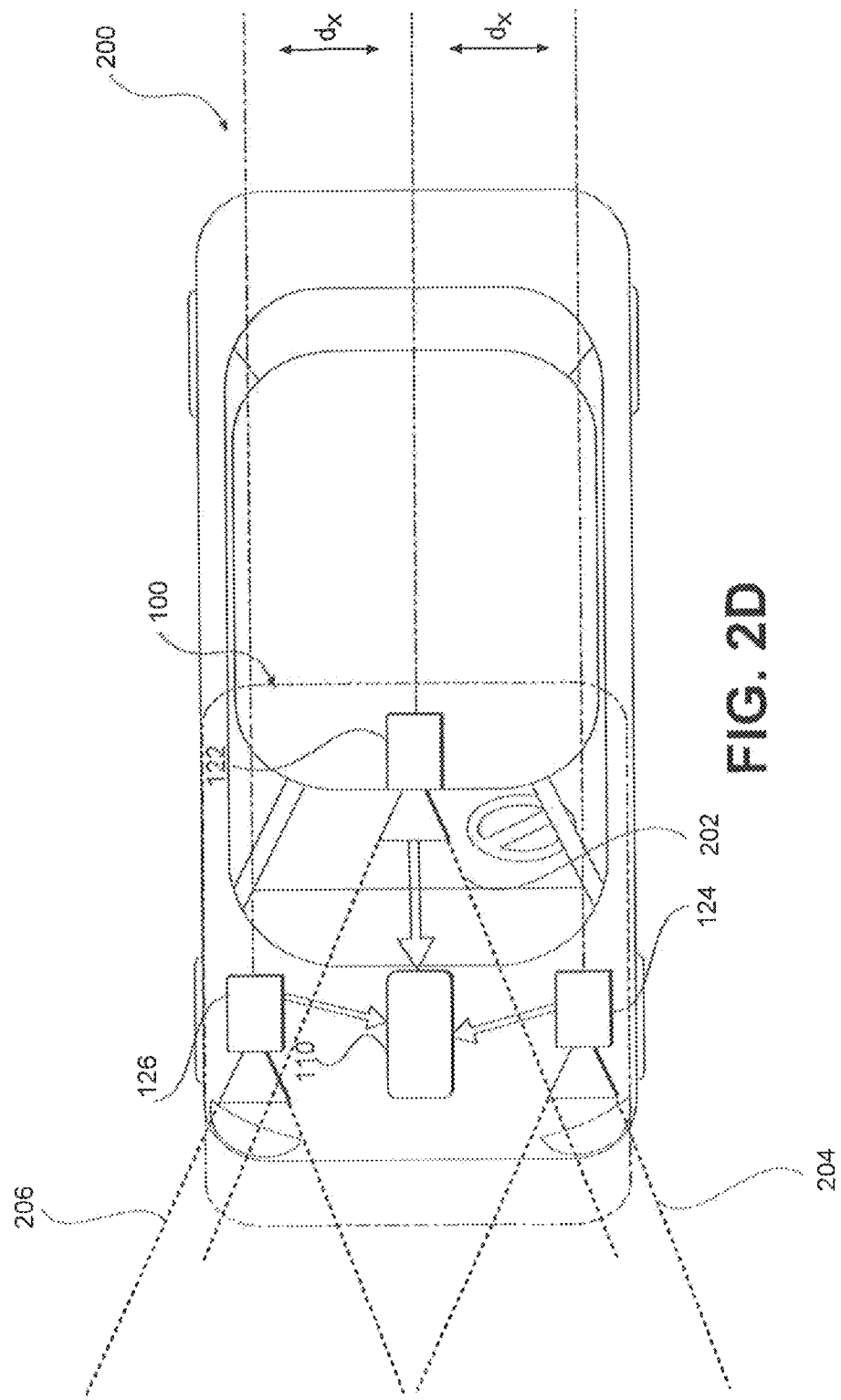

SYSTEMS AND METHODS FOR DETERMINING THE STATUS OF A TURN LANE TRAFFIC LIGHT

CROSS REFERENCES TO RELATED APPLICATIONS

This application claims the benefit of priority of U.S. patent application Ser. No. 14/610,404, filed Jan. 30, 2015, which claims the benefit of priority of U.S. Provisional Patent Application No. 61/933,325, filed on Jan. 30, 2014; U.S. Provisional Patent Application No. 61/993,111, filed on May 14, 2014; U.S. Provisional Patent Application No. 62/040,246, filed on Aug. 21, 2014; U.S. Provisional Patent Application No. 62/060,603, filed on Oct. 7, 2014; and U.S. Provisional Patent Application No. 62/102,669, filed on Jan. 13, 2015. All of the foregoing applications are incorporated herein by reference in their entirety.

BACKGROUND

I. Technical Field

The present disclosure relates generally to autonomous vehicle navigation and, more specifically, to systems and methods that use cameras to provide autonomous vehicle navigation features.

II. Background Information

As technology continues to advance, the goal of a fully autonomous vehicle that is capable of navigating on roadways is on the horizon. Primarily, an autonomous vehicle may be able to identify its environment and navigate without input from a human operator. Autonomous vehicles may also take into account a variety of factors and make appropriate decisions based on those factors to safely and accurately reach an intended destination. For example, various objects—such as other vehicles and pedestrians—are encountered when a vehicle typically travels a roadway. Autonomous driving systems may recognize these objects in a vehicle's environment and take appropriate and timely action to avoid collisions. Additionally, autonomous driving systems may identify other indicators—such as traffic signals, traffic signs, and lane markings—that regulate vehicle movement (e.g., when the vehicle must stop and may go, a speed at which the vehicle must not exceed, where the vehicle must be positioned on the roadway, etc.). Autonomous driving systems may need to determine when a vehicle should change lanes, turn at intersections, change roadways, etc. As is evident from these examples, many factors may need to be addressed in order to provide an autonomous vehicle that is capable of navigating safely and accurately.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle and cause a navigational response based on an analysis of images captured by one or more of the cameras.

Consistent with a disclosed embodiment, a lane ending detection system is provided for a vehicle. The system may include at least one image capture device configured to acquire at least one image of an area forward of the vehicle, the area including at least one road sign providing information indicative of a lane ending; a data interface; and at least one processing device. The at least one processing device may be configured to: receive the at least one image via the data interface; extract lane ending information from a representation of the at least one road sign included in the at least one image; determine, based on at least one indicator of position of the vehicle, a distance from the vehicle to one or more lane constraints associated with the current lane in which the vehicle is traveling; determine, based on the extracted lane ending information and based on the determined distance from the vehicle to the one or more lane constraints, whether a current lane in which the vehicle is traveling is ending; and cause the vehicle to change lanes based on the determination of whether the current lane in which the vehicle is traveling is ending.

Consistent with another disclosed embodiment, a vehicle may include a body; at least one image capture device configured to acquire at least one image of an area forward of the vehicle, the area including at least one road sign providing information indicative of a lane ending; a data interface; and at least one processing device. The at least one processing device may be configured to: receive the at least one image via the data interface; extract lane ending information from a representation of the at least one road sign included in the at least one image; determine, based on at least one indicator of position of the vehicle, a distance from the vehicle to one or more lane constraints associated with the current lane in which the vehicle is traveling; determine, based on the extracted lane information and based on the determined distance from the vehicle to the one or more lane constraints, whether a current lane in which the vehicle is traveling is ending; and cause the vehicle to change lanes based on the determination of whether the current lane in which the vehicle is traveling is ending.

Consistent with another disclosed embodiment, a method is provided for detecting a lane ending for a vehicle. The method may include acquiring, via at least one image capture device, at least one image of an area forward of the vehicle, the area including at least one road sign providing information indicative of the lane ending; extracting lane ending information from a representation of the at least one road sign included in the at least one image; determining, based on at least one indicator of position of the vehicle, a distance from the vehicle to one or more lane constraints associated with the current lane in which the vehicle is traveling; determining, based on the extracted lane ending information and based on the determined distance from the vehicle to the one or more lane constraints, whether a current lane in which the vehicle is traveling is ending; and causing the vehicle to change lanes based on the determination of whether the current lane in which the vehicle is traveling is ending.

Consistent with a disclosed embodiment, a driver-assist object detection system is provided for a vehicle. The system may include at least one image capture device configured to capture a plurality of images representative of an area surrounding the vehicle; a data interface; and at least one processing device. The at least one processing device may be configured to: receive, via the data interface, a first image from among the plurality of images and at least a second image from among the plurality of images; analyze the first image and at least the second image to determine a reference plane corresponding to a road plane; locate a target object in the first image and in the second image; determine a difference in a size of at least one dimension of the target object between the first image and the second image; use the determined difference in the size of the at least one dimension to determine at least a height of the target object; and cause a change in at least a directional course of the vehicle if the determined height of the object exceeds a predetermined threshold.

Consistent with another disclosed embodiment, a vehicle may include a body; at least one image capture device configured to capture a plurality of images representative of an area surrounding the vehicle; a data interface; and at least one processing device. The at least one processing device may be configured to: receive, via the data interface, a first image from among the plurality of images and at least a second image from among the plurality of images; analyze the first image and at least the second image to determine a reference place corresponding to a road plane; locate a target object in the first image and in the second image; determine a difference in a size of at least one dimension of the target object between the first image and the second image; use the determined difference in the size of the at least one dimension to determine at least a height of the target object; and cause a change in at least a directional course of the vehicle if the determined height of the object exceeds a predetermined threshold.

Consistent with another disclosed embodiment, a method is provided for detecting an object in a roadway. The method may include capturing, via at least one image capture device, a plurality of images representative of an area surrounding the vehicle; receiving a first image from among the plurality of images and at least a second image from among the plurality of images; analyzing the first image and at least the second image to determine a reference plane corresponding to a road plane; determining a difference in a size of at least one dimension of the target object between the first image and the second image; using the determined difference in the size of the at least one dimension to determine at least a height of the target object; and causing a change in at least a directional course of the vehicle if the determined height of the object exceeds a predetermined threshold.

Consistent with a disclosed embodiment, a traffic light detection system is provided for a vehicle. The system may include at least one image capture device configured to acquire a plurality of images of a traffic light located in a region above the vehicle, outside of a sightline of a typical driver location in the vehicle, a data interface; and at least one processing device. The at least one processing device may be configured to: receive the plurality of images via the data interface; determine a status of the traffic light based on analysis of at least a first image from among the plurality of images; determine a change in status of the traffic light based on at least a second image from among the plurality of images; and cause a system response based on the determination of the change in status.

Consistent with another disclosed embodiment, a vehicle may include a body; at least one image capture device configured to acquire a plurality of images of a traffic light located in a region above the vehicle, outside of a sightline of a typical driver location in vehicle; a data interface; and at least one processing device. The at least one processing device may be configured to: receive the plurality of images via the data interface; determine a status of the traffic light based on analysis of at least a first image from among the plurality of images; determine a change in status of the traffic light based on at least a second image from among the plurality of images; and cause a system response based on the determination of the change in status.

Consistent with another disclosed embodiment, a method is provided for navigating a vehicle. The method may include: acquiring, via at least one image capture device, a plurality of images of a traffic light located in a region above the vehicle, outside of a sightline of a typical driver location in vehicle; determining a status of the traffic light based on analysis of at least a first image from among the plurality of images; determining a change in status of the traffic light based on at least a second image from among the plurality of images; and causing a system response based on the determination of the change in status.

Consistent with a disclosed embodiment, a traffic light detection system is provided for a vehicle. The system may include at least one image capture device configured to acquire at least one image of an area forward of the vehicle, the area including a plurality of traffic lamp fixtures each including at least one traffic light. They system may further include a data interface and at least one processing device. The at least one processing device may be configured to: receive the at least one acquired image via the data interface; use at least one indicator of vehicle position, as determined from the at least one acquired image, to determine a relevance to the vehicle of each of the plurality of traffic lamp fixtures; determine, based on the at least one acquired image, a status of a traffic light included in at least one traffic lamp determined to be relevant to the vehicle; and cause a system response based on the determined status.

Consistent with another disclosed embodiment, a vehicle may include a body; at least one image capture device configured to acquire at least one image of an area forward of the vehicle, the area including a plurality of traffic lamp fixtures each including at least one traffic light; a data interface; and at least one processing device. The at least one processing device may be configured to: receive the at least one acquired image via the data interface; use at least one indicator of vehicle position, as determined from the at least one acquired image, to determine a relevance to the vehicle of each of the plurality of traffic lamp fixtures; determine, based on the at least one acquired image, a status of a traffic light included in at least one traffic lamp fixture determined to be relevant to the vehicle; and cause a system response based on the determined status.

Consistent with another disclosed embodiment, a method is provided for traffic light detection. The method may include acquiring, via at least one image capture device, at least one image of an area forward of a vehicle, the area including a plurality of traffic lamp fixtures each including at least one traffic light; using at least one indicator of vehicle position, as determined from the at least one acquired image, to determine a relevance to the vehicle of each of the plurality of traffic lamp fixtures; determining, based on the at least one acquired image, a status of a traffic light included in at least one traffic lamp fixture determined to be relevant to the vehicle; and causing a system response based on the determined status.

Consistent with a disclosed embodiment, a traffic light detection system is provided for a vehicle. The system may include at least one image capture device configured to acquire at least one image of an area forward of the vehicle, the area including a traffic lamp fixture having at least one traffic light; a data interface; and at least one processing device. The at least one processing device may be configured to: receive, via the data interface, the at least one acquired image; determine, based on at least one indicator of vehicle position, whether the vehicle is in a turn lane; perform image processing on the at least one image to determine whether an arrow exists in the at least one image within pixels of the image representative of the traffic light; determine, based on the at least one image, a status of the traffic light; and cause a system response based on the determination of the status of the traffic light, whether the traffic light includes an arrow, and whether the vehicle is in a turn lane.

Consistent with another disclosed embodiment, a vehicle may include a body; at least one image capture device configured to acquire at least one image of an area forward of the vehicle, the area including a traffic lamp fixture having at least one traffic light; a data interface; and at least one processing device. The at least one processing device may be configured to: receive, via the data interface, the at least one acquired image; determine, based on at least one indicator of vehicle position, whether the vehicle is in a turn lane; perform image processing on the at least one image to determine whether an arrow exists in the at least one image within pixels of the image representative of the traffic light; determine, based on the at least one image, a status of the traffic light; and cause a system response based on the determination of the status of the traffic light, whether the traffic light includes an arrow, and whether the vehicle is in a turn lane.

Consistent with another disclosed embodiment, a method is provided for traffic light detection. The method may include acquiring, via at least one image capture device, at least one image of an area forward of a vehicle, the area including a traffic lamp fixture having at least one traffic light; determining, based on at least one indicator of vehicle position, whether the vehicle is in a turn lane; performing image processing on the at least one image to determine whether an arrow exists in the at least one image within pixels of the image representative of the traffic light; determining, based on the at least one image, a status of the traffic light; and causing a system response based on the determination of the status of the traffic light, whether the traffic light includes an arrow, and whether the vehicle is in a turn lane.

Consistent with a disclosed embodiment, a traffic light detection system is provided. The system may include at least one image capture device configured to acquire a plurality of images of an area forward of the vehicle, the area including a traffic lamp fixture having at least one traffic light, a data interface, and at least one processing device configured to receive the plurality of images via the data interface. The at least one processing device may be further configured to align areas of the plurality of images corresponding to the traffic light, based on a determined center of brightness, expand each pixel within the aligned areas, determine a set of average pixel values including an average pixel value for each set of corresponding expanded pixels within the aligned areas, and determine, based on the set of average pixel values, whether the traffic light includes an arrow.

Consistent with another disclosed embodiment, a vehicle is provided. The vehicle may include a body, at least one image capture device configured to acquire a plurality of images of an area forward of the vehicle, the area including a traffic lamp fixture having at least one traffic light, a data interface, and at least one processing device configured to receive the plurality of images via the data interface. The at least one processing device may be further configured to align areas of the plurality of images corresponding to the traffic light, based on a determined center of brightness, expand each pixel within the aligned areas, determine a set of average pixel values including an average pixel value for each set of corresponding expanded pixels within the aligned areas, and determine, based on the set of average pixel values, whether the traffic light includes an arrow.

Consistent with another disclosed embodiment, a method of traffic light detection is provided. The method may include acquiring, via at least one image capture device, a plurality of images of an area forward of a vehicle, the area including a traffic lamp fixture having at least one traffic light, aligning areas of the plurality of images corresponding to the traffic light, based on a determined center of brightness, and expanding each pixel within the aligned areas. The method may also include determining a set of average pixel values including an average pixel value for each set of corresponding expanded pixels within the aligned areas, and determining, based on the set of average pixel values, whether the traffic light includes an arrow.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 2D is a diagrammatic top view representation of yet another embodiment of a vehicle including a system consistent with the disclosed embodiments.

DETAILED DESCRIPTION

Figure 1:
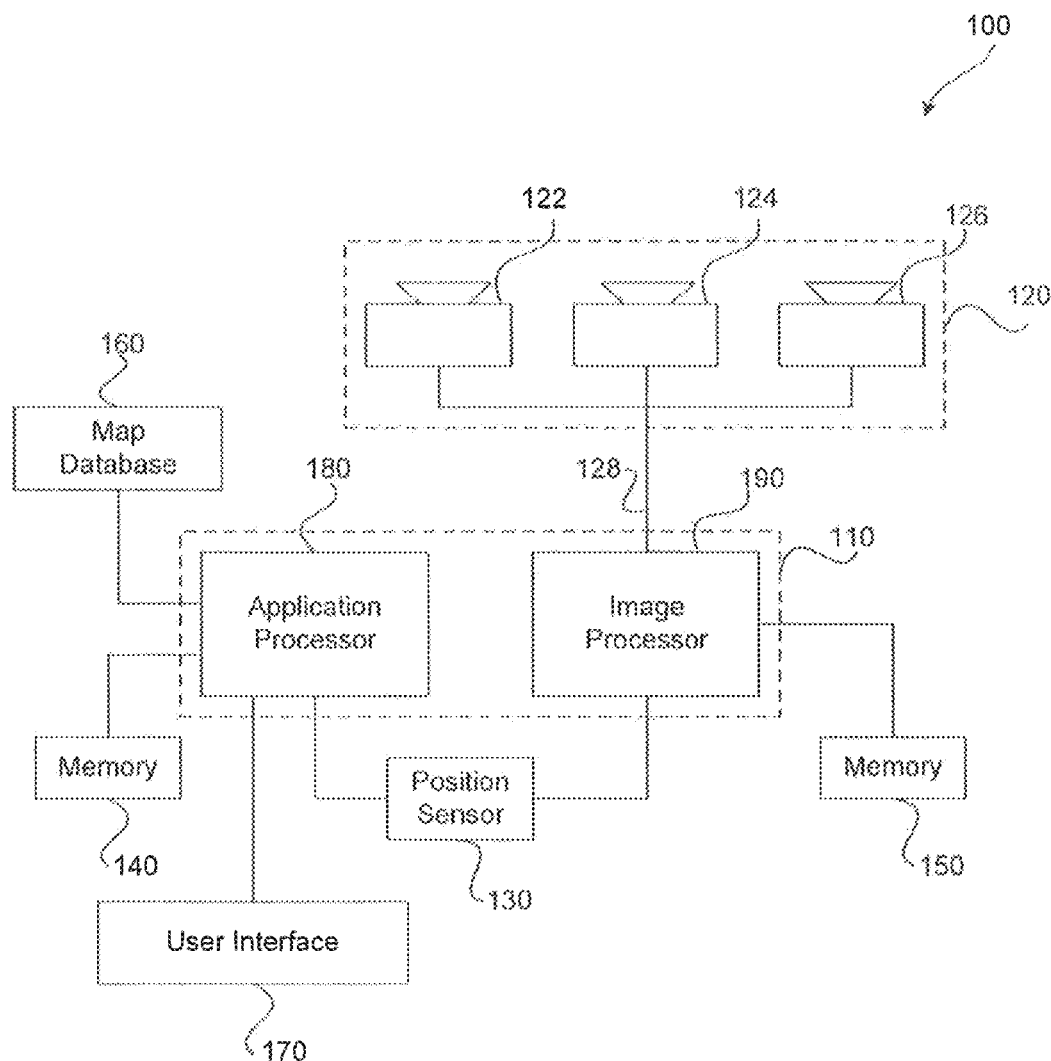
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Disclosed embodiments provide systems and methods that use cameras to provide autonomous navigation features. In various embodiments, the system may include one, two or more cameras that monitor the environment of a vehicle. In one embodiment, the system may recognize when a driving lane will end and, when an end is detected, make a responsive navigational change, such as a lane change. Rather than relying on map data to make this determination, the system may operate based solely on visual information. Further, while the system may recognize an end of a lane by direct observation of the lane ending, the system may recognize an approaching lane end sooner by, for example, observing and recognizing road sign alerts that provide information regarding a lane ending. In another embodiment, the system may determine the presence of obstacles in a roadway where those obstacles have a height of less than, for example, 10 cm. In another embodiment, the system may view and recognize traffic lights located above a vehicle. In another embodiment, the system may recognize a traffic light and its status from among a plurality of traffic lights and cause a navigational change based on the status of the traffic light (e.g., discontinue cruise and cause braking when a red light is recognized). For example, the system may recognize which of the imaged traffic lights are relevant to the vehicle and respond only to those traffic lights determined to be relevant. In another embodiment, the system may recognize a turn lane traffic light and its status based on analysis of road context information combined with determined characteristics of the light. In another embodiment, the system may employ a super resolution technique to recognize and analyze traffic lights. For example, the system may distinguish between round and arrow shaped traffic lights.

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, and a user interface 170. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras), such as image capture device 122, image capture device 124, and image capture device 126. System 100 may also include a data interface 128 communicatively connecting processing device 110 to image acquisition device 120. For example, data interface 128 may include any wired and/or wireless link or links for transmitting image data acquired by image accusation device 120 to processing unit 110.

Both applications processor 180 and image processor 190 may include various types of processing devices. For example, either or both of applications processor 180 and image processor 190 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices.

Processing unit 110 may comprise various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software. The memory units may include random access memory, read only memory, flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.).

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

Figure 2A:
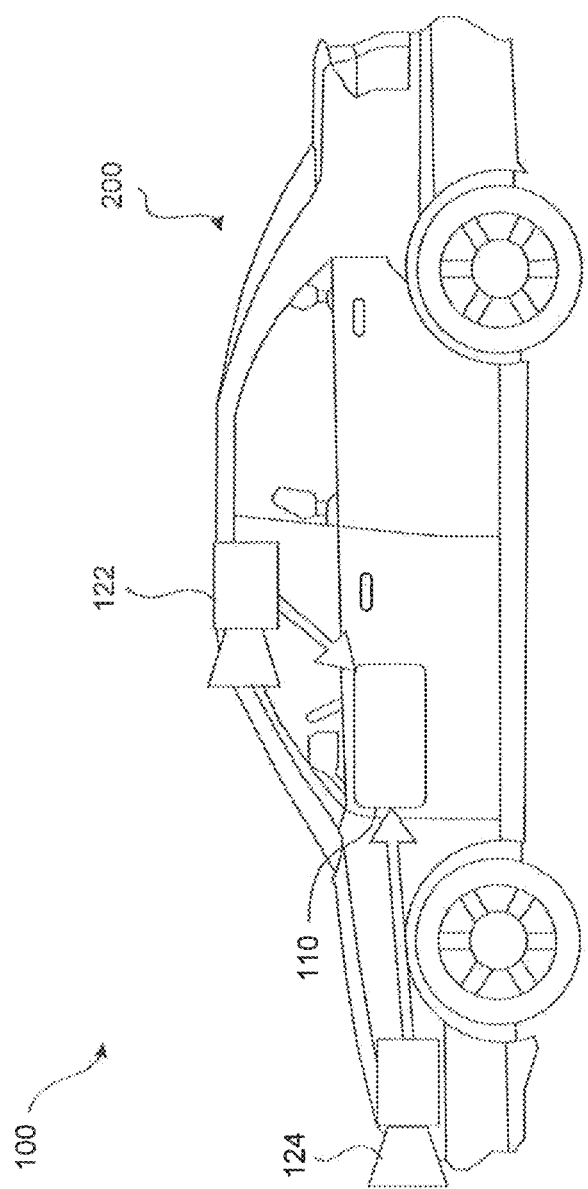
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

Figure 2B:
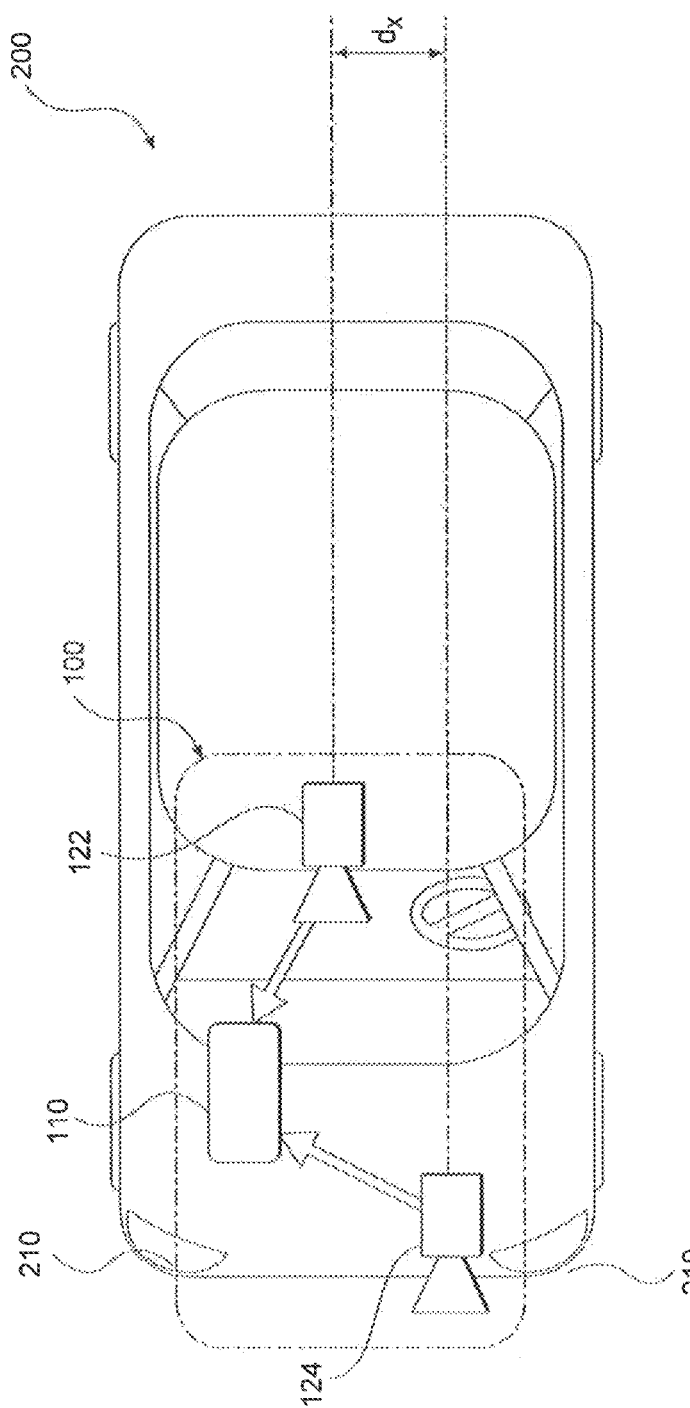
FIG. 2B is a diagrammatic top view representation of the vehicle and system shown in FIG. 2A consistent with the disclosed embodiments.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
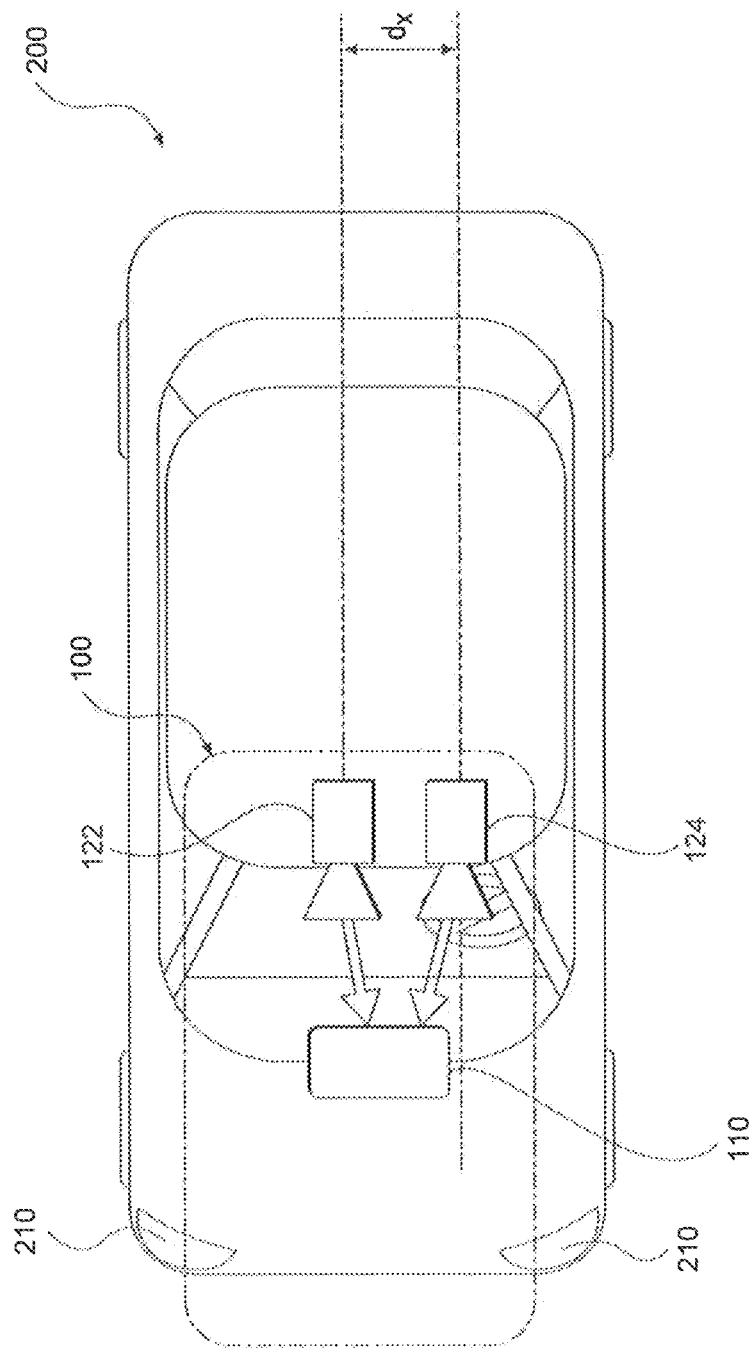
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2E:
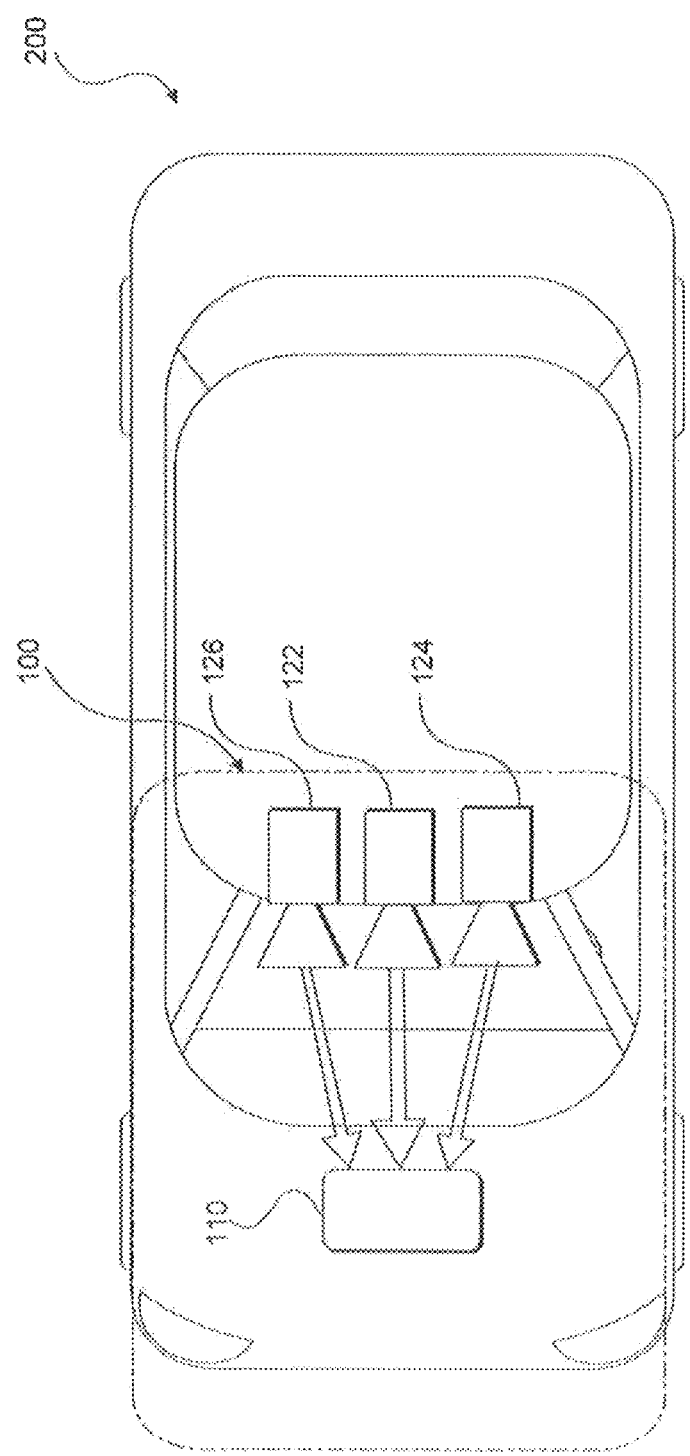
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV.

The first image capture device 122 may acquire a plurality of first images relative to a scene associated with the vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with the vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by $d_x$, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280×960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
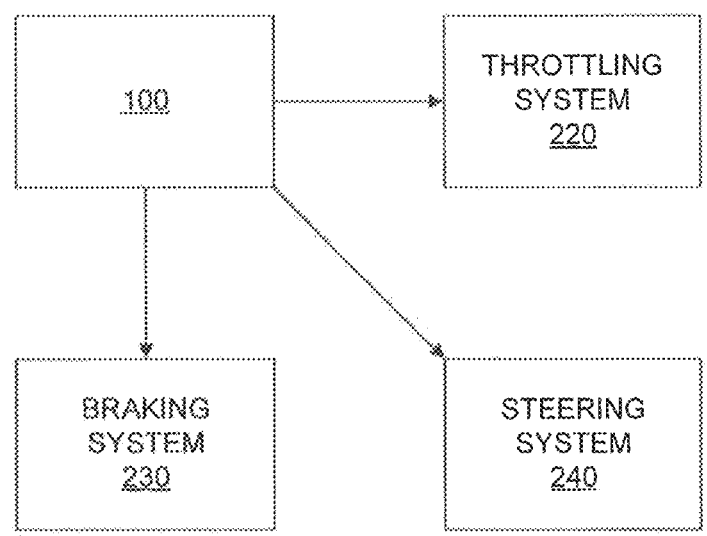
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
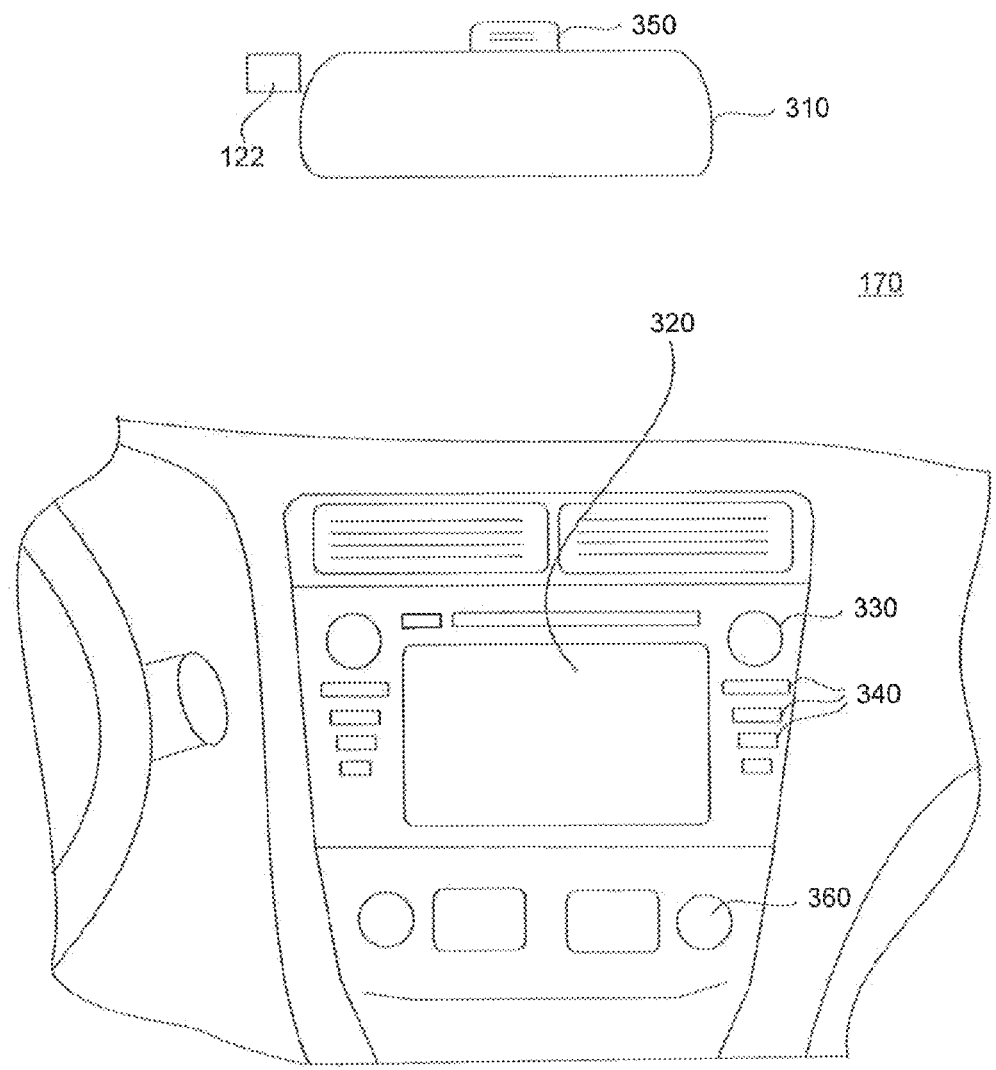
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
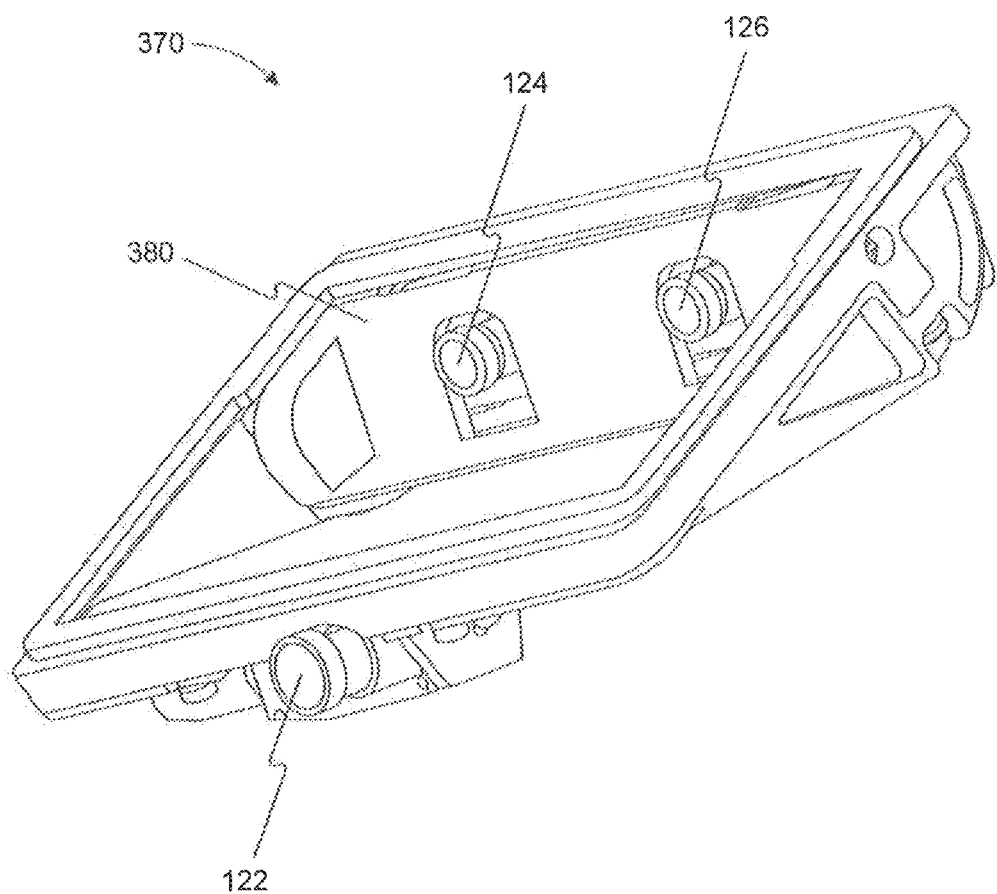
FIG. 3B is an illustration of an example of a camera mount that is configured to be positioned behind a rearview mirror and against a vehicle windshield consistent with the disclosed embodiments.
Figure 3C:
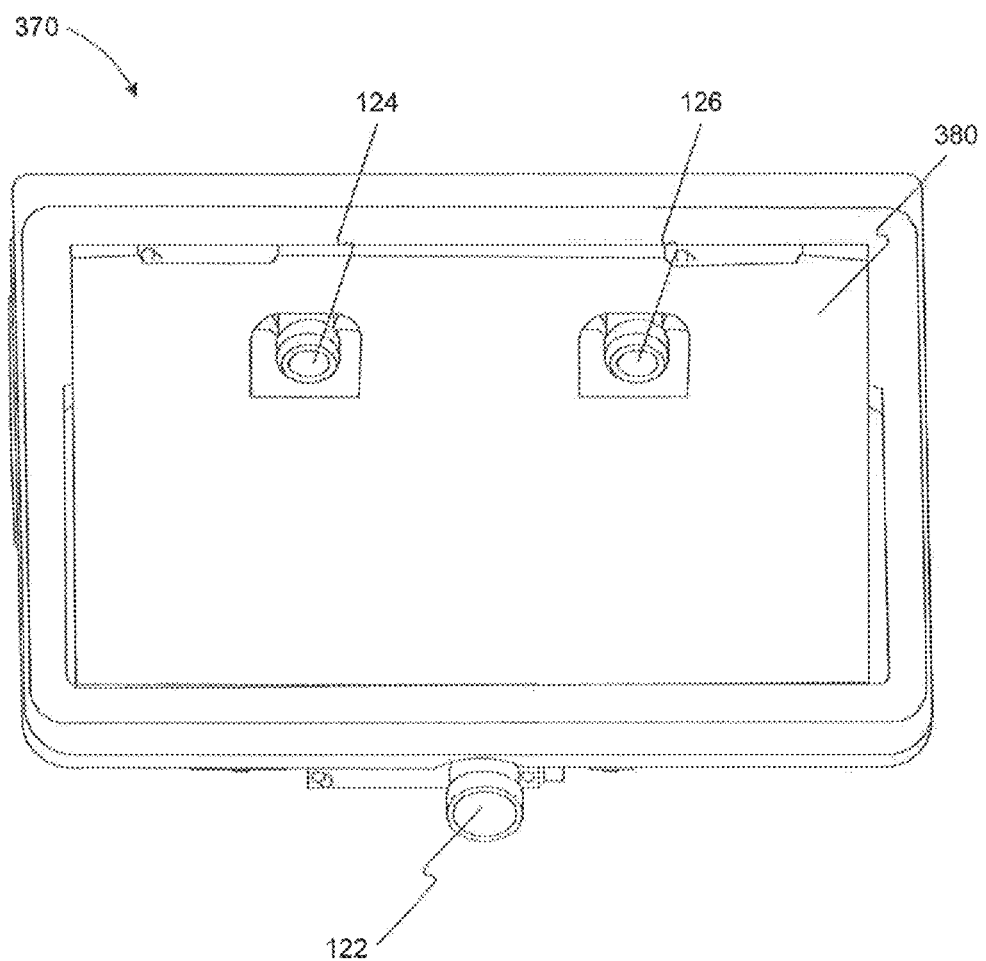
FIG. 3C is an illustration of the camera mount shown in FIG. 3B from a different perspective consistent with the disclosed embodiments.
Figure 3D:
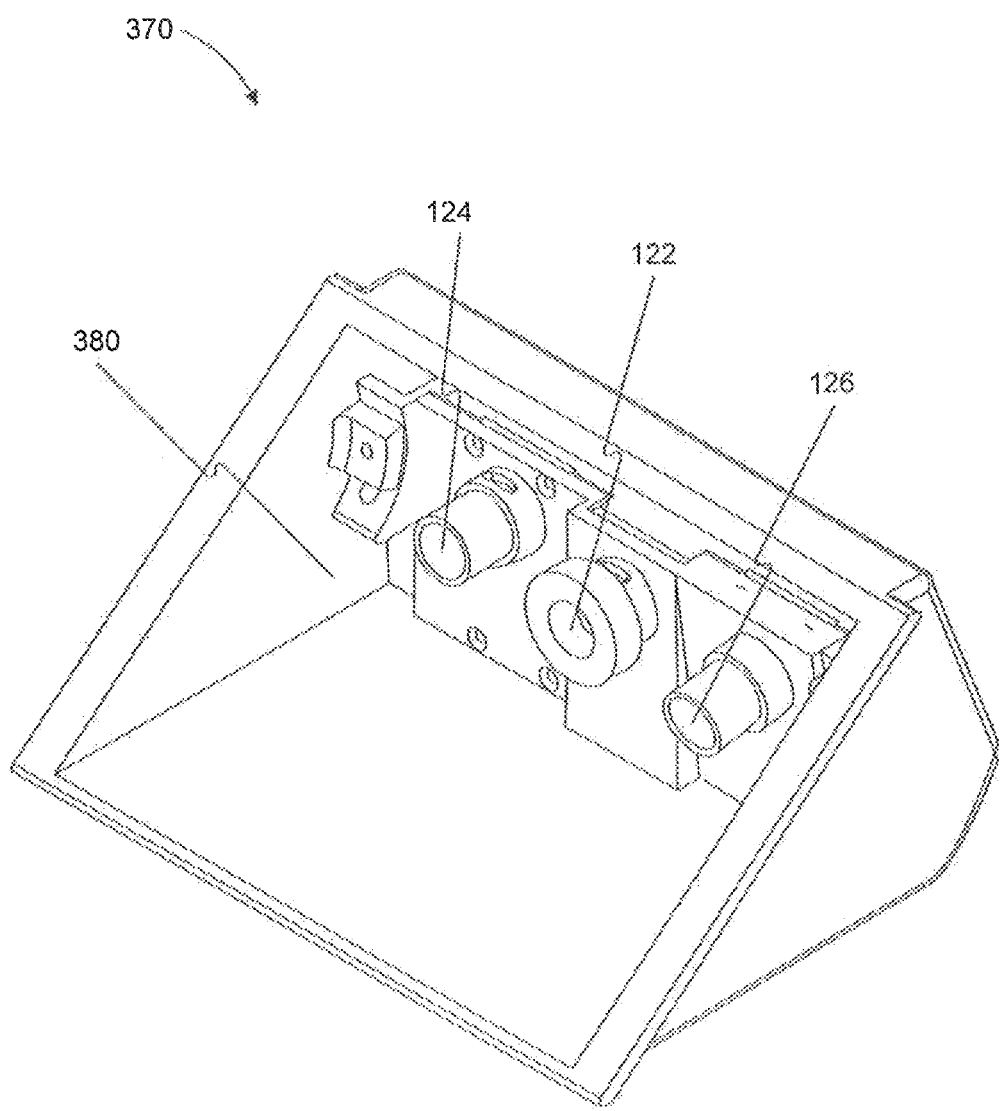
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that it aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122-126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122-126 may be positioned behind rearview mirror 310 and positioned substantially side-by-side (e.g., 6 cm apart). Further, in some embodiments, as discussed above, one or more of image capture devices 122-126 may be mounted behind glare shield 380 that is flush with the windshield of vehicle 200. Such shielding may act to minimize the impact of any reflections from inside the car on image capture devices 122-126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122-126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126)

to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
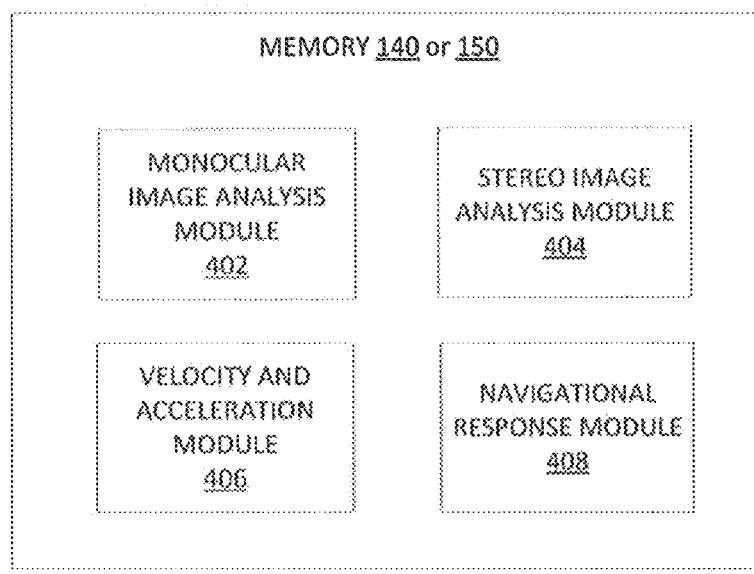
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, application processor 180 and/or image processor 190 may execute the instructions stored in any of modules 402-408 included in memory 140. One of skill in the art will understand that references in the following discussions to processing unit 110 may refer to application processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Figure 5A:
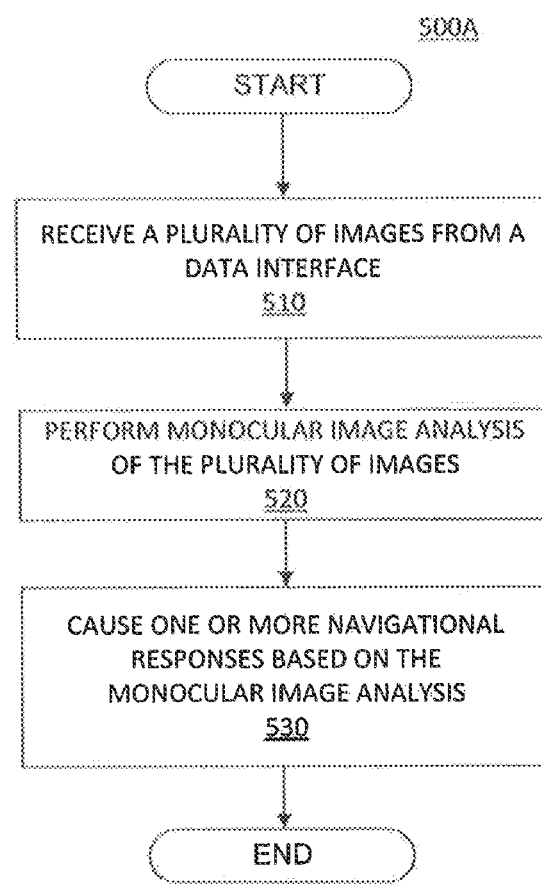
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
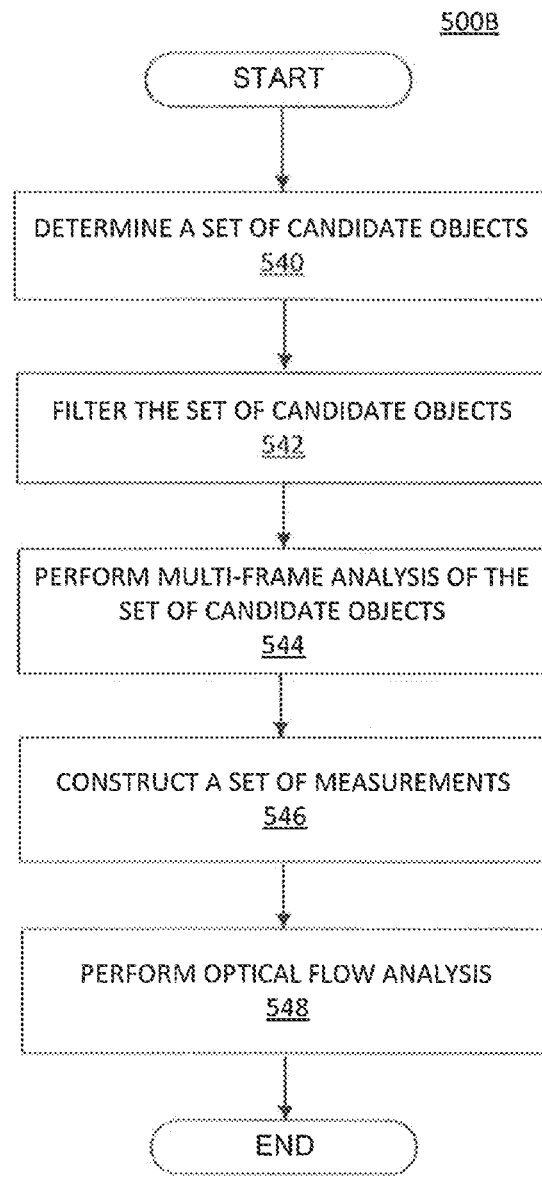
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
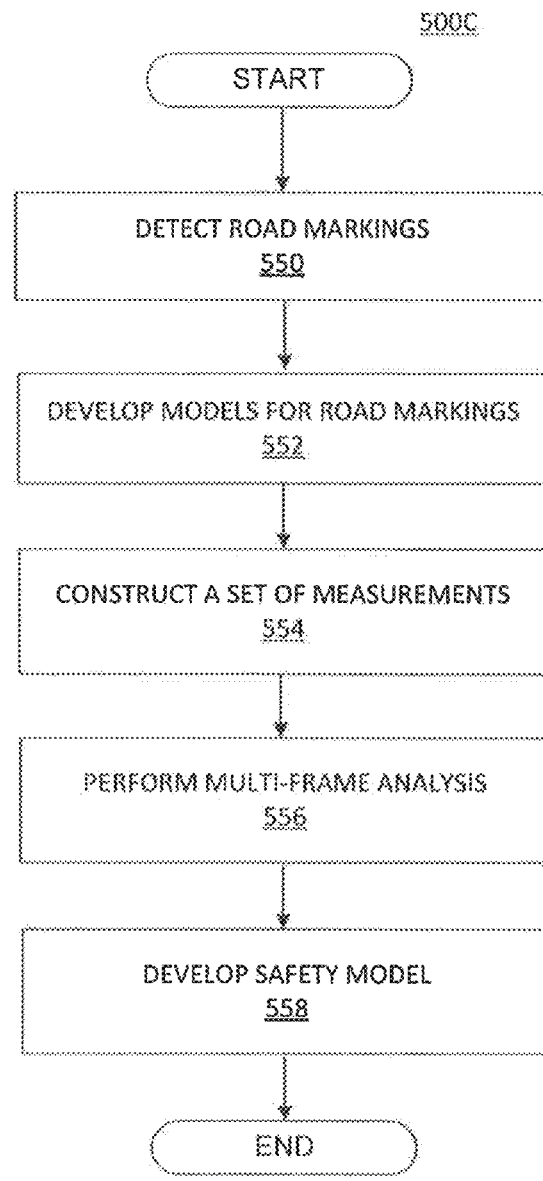
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550-556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
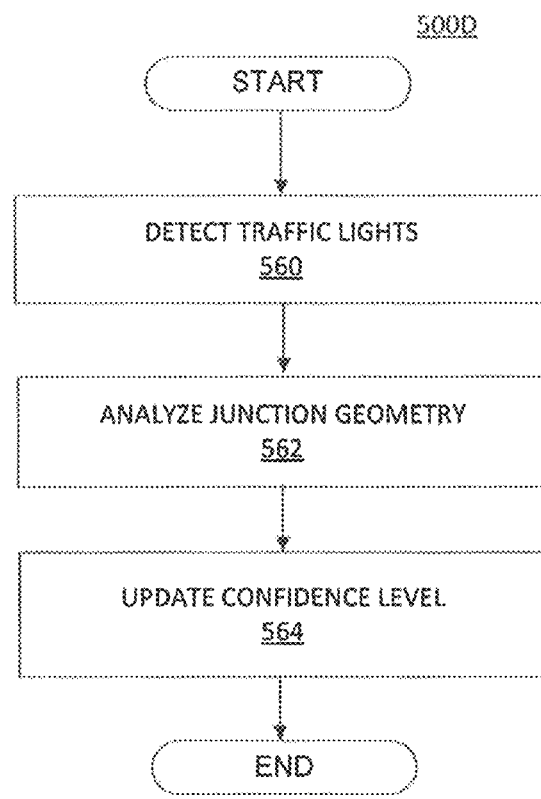
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560-564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
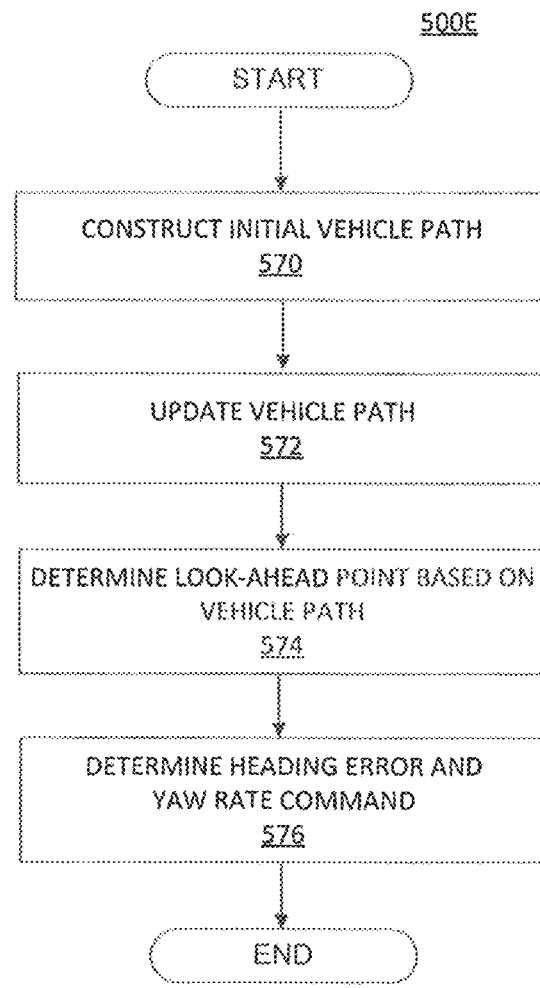
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance $d_i$ between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_l$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_l, z_l)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., $\arctan(x_l/z_l)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
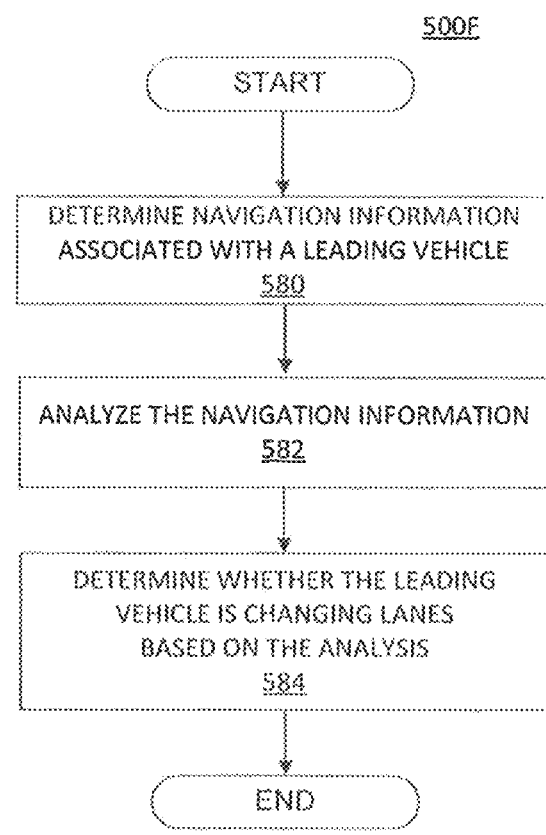
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2 + \delta_x^2)/2/(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights.

Figure 6:
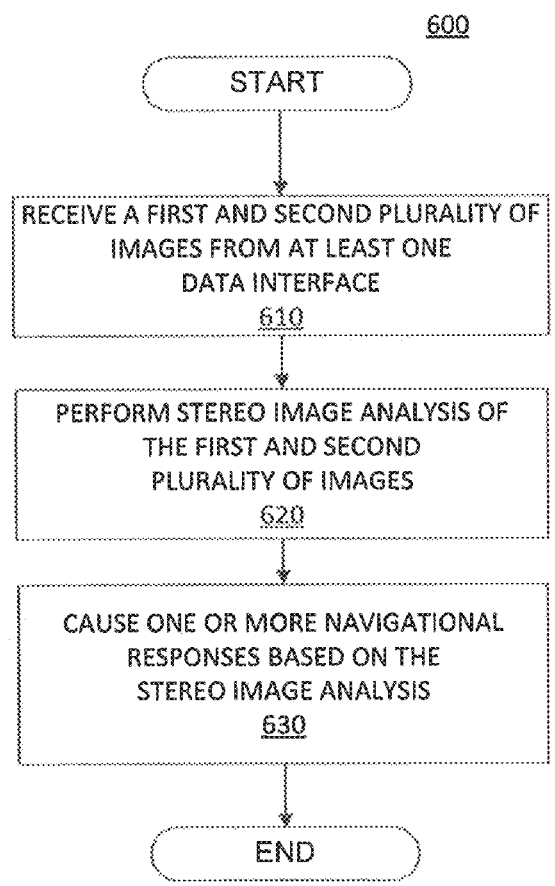
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing if the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
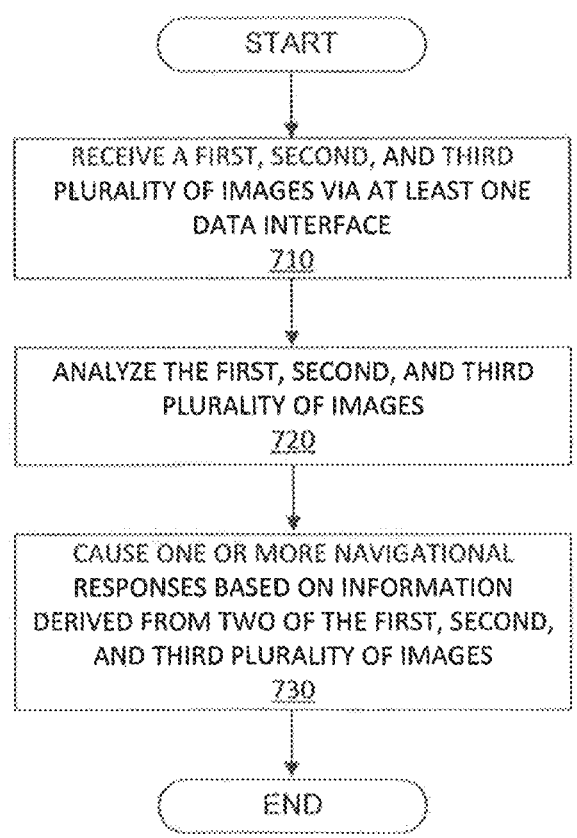
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126—including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Lane End Recognition System

System 100 may recognize when a driving lane will end and, when an end is detected, make a responsive navigational change in the course of vehicle 200, such as a lane change. A "lane" may refer to a designated or intended travel path of a vehicle and may have marked (e.g., lines on a road) or unmarked boundaries (e.g., an edge of a road, a road barrier, guard rail, parked vehicles, etc.), or constraints. Rather than relying on map data to make a lane end determination, the system may operate based solely on visual information. In some cases, however, the system may rely upon a combination of map data and visual information relative to a lane of travel. Further, while the system may recognize an end of a lane by direct observation of the lane ending, the system may recognize an approaching lane end sooner by, for example, observing and recognizing road sign alerts that provide information regarding a lane ending.

Figure 8:
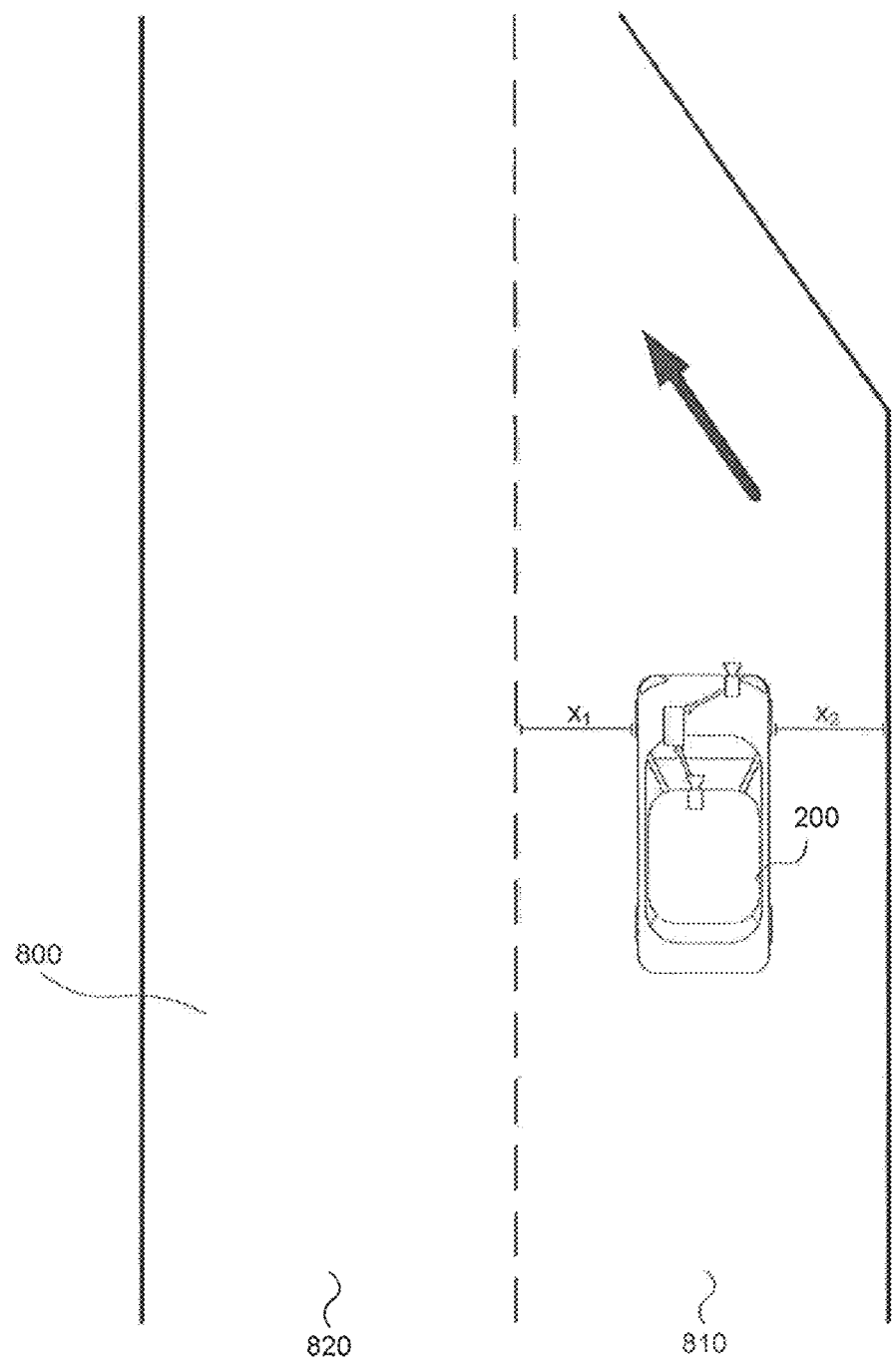
FIG. 8 is a diagrammatic top view representation of an exemplary vehicle including a system consistent with the disclosed embodiments in which the vehicle's current travel lane is ending.

FIG. 8 illustrates a vehicle 200 traveling on a roadway 800 in which the disclosed systems and methods for recognizing the end of a travel lane and operating vehicle 200 within the lanes may be used. While vehicle 200 is depicted as being equipped with image capture devices 122 and 124, more or fewer cameras may be employed on any particular vehicle 200. As shown, roadway 800 may be subdivided into lanes, such as lanes 810 and 820. Lanes 810 and 820 are shown as examples; a given roadway 800 may have additional lanes based on the size and nature of the roadway, for example, an interstate highway. In the example of FIG. 8, vehicle 200 is traveling in lane 810, and lane 810 can be seen to be ending shortly. In response, system 100 may, as discussed in detail below, cause vehicle 200 to shift to lane 820.

Processing unit 110 may be configured to determine one or more lane constraints associated with each of lanes 810 and 820 based on a plurality of images acquired by image capture device 122-126 that processing unit 110 may receive via data interface 128. According to some embodiments, the lane constraints may be identified by visible lane boundaries, such as dashed or solid lines marked on a road surface. Additionally or alternatively, the lane constraints may include an edge of a road surface or a barrier. Additionally or alternatively, the lane constraints may include markers (e.g., Botts' dots). According to some embodiments, processing unit 110 (via lane constraint module 910 and/or lane positioning module 920, described in detail below) may determine constraints associated with lanes 810/820 by identifying a midpoint of a road surface width, such as the entirety of roadway 800 or a midpoint of one of lanes 810/820. Processing unit 110 may identify lane constraints in alternative manners, such as by estimation or extrapolation based on known roadway parameters when, for example, lines designating road lanes such as lanes 810/820 are not painted or otherwise labeled.

Detection of the constraints and pathways of roadway 800 and constituent lanes 810/820 may include processing unit 110 determining their 3D models via a camera coordinate system. For example, the 3D models of lanes 810/820 may be described by a third-degree polynomial. In addition to 3D modeling of travel lanes, processing unit 110 may perform multi-frame estimation of host motion parameters, such as the speed, yaw and pitch rates, and acceleration of vehicle 200. Processing unit 110 may receive information pertaining to these parameters from, for example, speed sensors, multi-axis accelerometers, etc., included in vehicle 200. Optionally, processing unit 110 may detect static and moving vehicles and their position, heading, speed, and acceleration, all relative to vehicle 200, which will be described below in association with FIG. 10B. Processing unit 110 may further determine a road elevation model to transform all of the information acquired from the plurality of images into 3D space.

Generally, as a default condition, vehicle 200 may travel relatively centered within lanes 810/820, so that distances $x_1$ and $x_2$ from vehicle 200 to the lane constraints associated with lanes 810/820 depicted in FIG. 8 are equal or close to equal. However, in some circumstances, environmental factors may make this undesirable or unfeasible, such as when objects or structures are present on one side of the road. Thus, there may be circumstances in which it may be desirable or advantageous for vehicle 200 to be closer to one lane constraint or the other (i.e. $x_1 > x_2$ or vice versa), particularly if the lane is determined to be ending, as will be discussed below in association with FIGS. 10-11.

Figure 9:
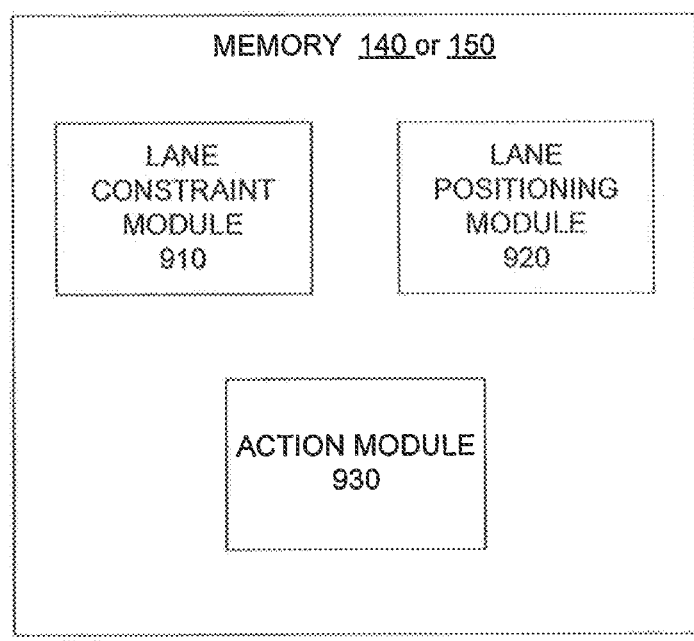
FIG. 9 is a diagrammatic representation of the memory of an exemplary lane end recognition system consistent with the disclosed embodiments.

FIG. 9 is an exemplary block diagram of memory 140 and/or 150, which may store instructions for performing one or more operations consistent with disclosed embodiments. As illustrated in FIG. 9, memory 140 may store one or more modules for performing the lane end recognition and responses described herein. For example, memory 140 may store a lane constraint module 910, a lane positioning module 920, and an action module 930. Application processor 180 and/or image processor 190 may execute the instructions stored in any of modules 910-930 included in memory 140. One of skill in the art will understand that references in the following discussions to processing unit 110 may refer to application processor 180 and image processor 190 individually or collectively. Accordingly, steps of any of the following processes may be performed by one or more processing devices.

Lane constraint module 910 may store instructions which, when executed by processing unit 110, may detect and define boundaries associated with lanes such as lanes 810 and 820. In some embodiments the detected boundaries may be artificial, for example, painted lines or reflectors. In other embodiments, the detected boundaries may simply include the natural curvature of the road or a termination of a lane or road surface. Lane offset module 910 may process the plurality of images received from at least one image capture device 122-124 to detect lane constraints. As discussed above, this may include identifying painted lane lines and/or measuring a midpoint of a road surface. Additionally, lane constraint module 910 may detect the course and/or constraint of travel lanes such as lanes 810 and 820 by extracting information from one or more road signs within the field of view of image capture device(s) 122-124. Examples of these road signs may include, but are not limited to, signs containing textual messages such as "Lane Ends—Merge Left" or signs containing visual messages, such as a visual representation of a lane ending.

Lane positioning module 920 may store instructions which, when executed by processing unit 110, may assist system 100 in determining a position of vehicle 200. In some embodiments, determining the position of vehicle 200 may include determining, based on at least one indicator of vehicle position, a distance from the vehicle to one or more lane constraints associated with the current lane in which the vehicle is traveling. Such determinations of the position of vehicle 200 may be based at least in part on an analysis of image data captured by one or more of image capture devices 122-126. In some embodiments, the image data may be supplemented by or substituted with map data (e.g., GPS information) and/or data from other sensors (e.g., laser range finders, etc.). In these embodiments, the distance may be measured relative to lane constraints identified by lane constraint module 910. For example, the distance to the one or more lane constraints may specify the distance to an end of a lane or an area in which a lane has partially ended (e.g., for a lane that includes a merging zone that diminishes over distance until the lane has ended). Lane positioning module 920 may process the plurality of images to detect features of the roadway on which vehicle 200 is traveling, such as roadway 800, in order to determine the position of vehicle 200. Additionally or alternatively, lane offset module 920 may receive information from other modules (including position sensor 130) or other systems indicative of the presence of other features in the image data, such as additional vehicles, curvature of the road, etc. Lane positioning module 920 may periodically update the positional status of the vehicle using coordinate systems or other notations of position (e.g., map data from a mapping application, GPS information, etc.). The status may be stored within the system, such as within memory 140/150. Lane positioning module 920 may update the positional status while vehicle 200 is moving at set timepoints, such as each minute, after a predetermined number of minutes, each hour, etc. Alternatively, lane positioning module 920 may update the positional status when certain vehicle operations are detected, such as changing lanes, accelerating, decelerating, or other steering operations.

Action module 930 may store instructions which, when executed by processing unit 110, may assist system 100 in taking one or more actions relative to the operation of vehicle 200 based on information received from one or more sources, such as position sensor 130, lane constraint module 910, or lane positioning module 920. In some embodiments, action module 930 may receive information indicating that the current travel lane of vehicle 200 is ending. Action module 930 may then perform one or more actions affecting the operational status of vehicle 200, such as causing system 100 to provide control signals to one or more of throttling system 220, braking system 230, and steering system 240 to navigate vehicle 200 (e.g., by causing an acceleration, a turn, a lane shift, etc.). For example, in some embodiments, action module 930 may send an instruction to steering system 240, and steering system 240 may execute the instruction to steer the vehicle into a new lane of travel. Additionally or alternatively, action module 300 may send instructions to other systems associated with vehicle 200, such as braking system 230, turn signals, throttling system 220, etc. In some embodiments, action module 930 may instead provide a human operator of the vehicle with audio, visual, haptic, or tactile feedback representative of the information gathered from the relevant systems and/or sensors. The human operator may then act on this feedback to steer the vehicle to a different lane.

Figure 10A:
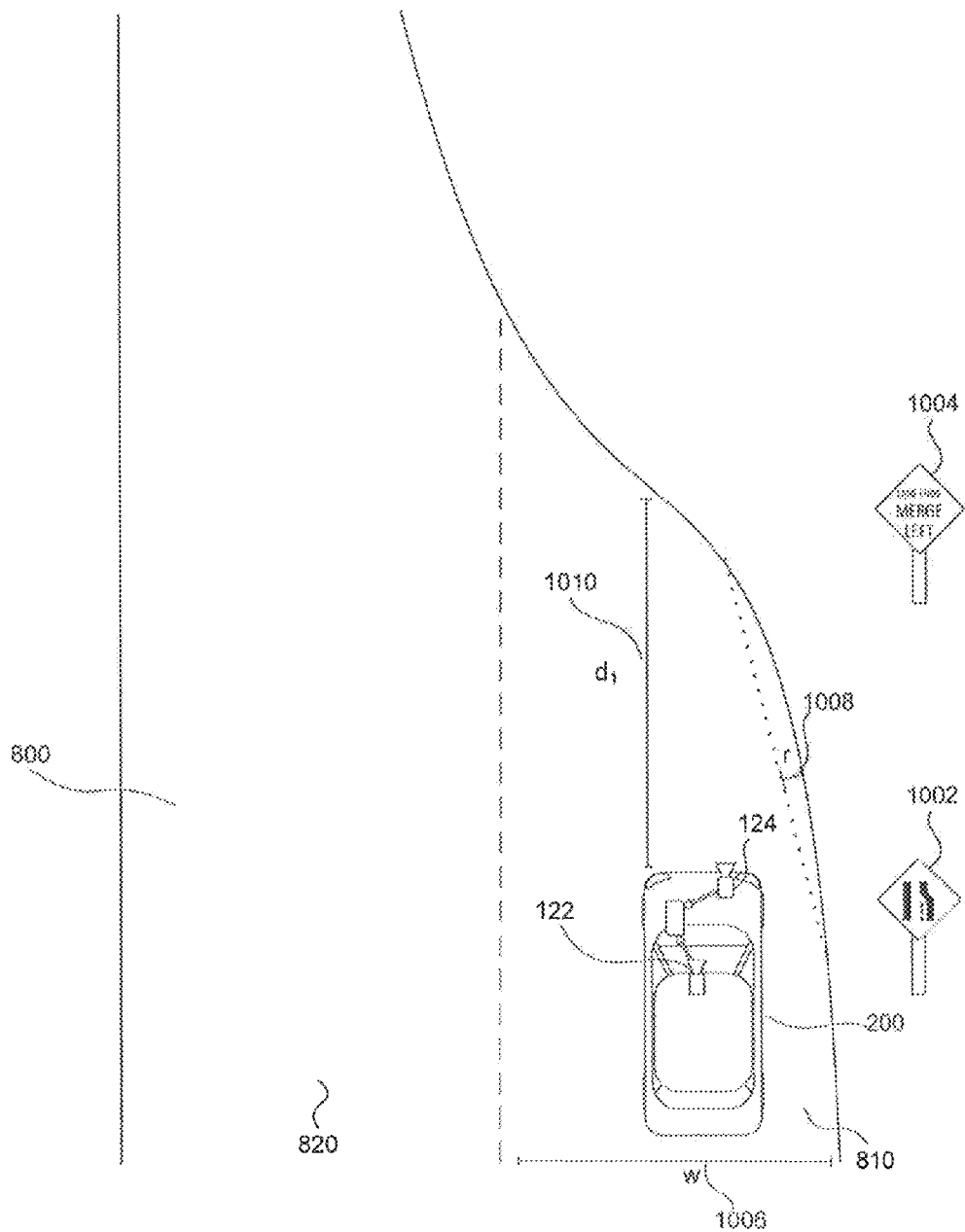
FIG. 10A is a diagrammatic representation of an exemplary vehicle including a lane end recognition system encountering the end of a travel lane marked by road signs consistent with the disclosed embodiments.

FIG. 10A provides an annotated view of the situation depicted in FIG. 8. Vehicle 200 is once again traveling in lane 810 of roadway 800, which is about to end. Vehicle 200 is again equipped with image capture devices 122 and 124; more or fewer devices may be associated with any particular vehicle 200.

To the right side of roadway 800 are road signs 1002 and 1004. These signs are exemplary, and not intended to be limiting. Road sign 1002 presents a visual depiction of a lane ending. This sign is familiar to many drivers, indicating a need to merge. Sign 1004, typically placed closer to the actual end of the lane, informs drivers that the "LANE ENDS—MERGE LEFT." Consistent with disclosed embodiments, system 100 may be configured to extract information from road signs such as signs 1002 and 1004 for purposes of determining if and when the current travel lane that a vehicle 200 is traveling in is ending. For visual signs such as sign 1002, image capture devices 122-126 may capture images of the entire face of the sign. Image processor 190 may be configured to recognize the image pattern of sign 1002, and may transmit information to other modules or units within system 100 indicating that the sign instructs that the lane is ending. In some embodiments, constituent modules or subsystems of system 100, such as memory 140/150, may be configured to contain lists or databases of typical road signs and patterns for purposes of rapid, real-time detection and information extraction. Sign 1004 contains only text, and thus its warning may be read by system 100 through optical character recognition (OCR) capability, which may be configured within processing unit 110, memory 140/150, image processor 190, or any other constituent subsystem or module of system 100.

Extraction of information from road signs is one of several actions that system 100 may be configured to execute for purposes of lane recognition. In addition, system 100, via lane constraint module 910 and lane positioning module 920 within memory 140/150, may be configured to perform visual determinations of roadway 800 and make accompanying distance measurements based on at least one indicator of position of the vehicle. In the example of FIG. 10A, various potential measurements that may be used by system 100 are shown. System 100 may obtain the measurements by, for example, analyzing one or more images acquired by one or more of image capture devices 122-126. Measurement 1006 may represent the total width w of lane 810. Distance w may also be thought of as the sum of distances $x_1$ and $x_2$ from FIG. 8 plus the width of vehicle 200. Measurement 1008 may represent the radius of curvature r of roadway 800 as lane 810 comes to an end. A shorter radius r may indicate a more urgent need for system 100 to steer vehicle 200 into lane 820. Measurement 1010 may represent the distance $d_l$ from vehicle 200 to a constraint associated with lane 810. This constraint may indicate that lane 810 is ending. As discussed above, the constraint may be a painted line, or may be the natural edge of roadway 800. Distance $d_1$ may also be measured to any portion in three-dimensional space of a barrier, such as a guardrail, wall, barrel, cone, or any other such object. Distance $d_1$ and other such distances, such as $x_1$, $x_2$, and w, may be measured from any portion of the interior or exterior vehicle 200, including but not limited to the front of vehicle 200, a portion of vehicle 200 such as a headlight or front license plate, a position as-installed of image capture devices 122 or 124, a determined centroid of vehicle 200, the rear of vehicle 200, one or more windshields or mirrors associated with vehicle 200, wheels of vehicle 200, right or left sides or windows of vehicle 200, a point associated with the roof of vehicle 200, or a point associated with the chassis of vehicle 200. As will be discussed below in association with process 1100 of FIG. 11, system 100 may use one or both of the extracted road sign information or the distances 1006-1010 to determine if the current travel lane of vehicle 200 is ending.

Figure 10B:
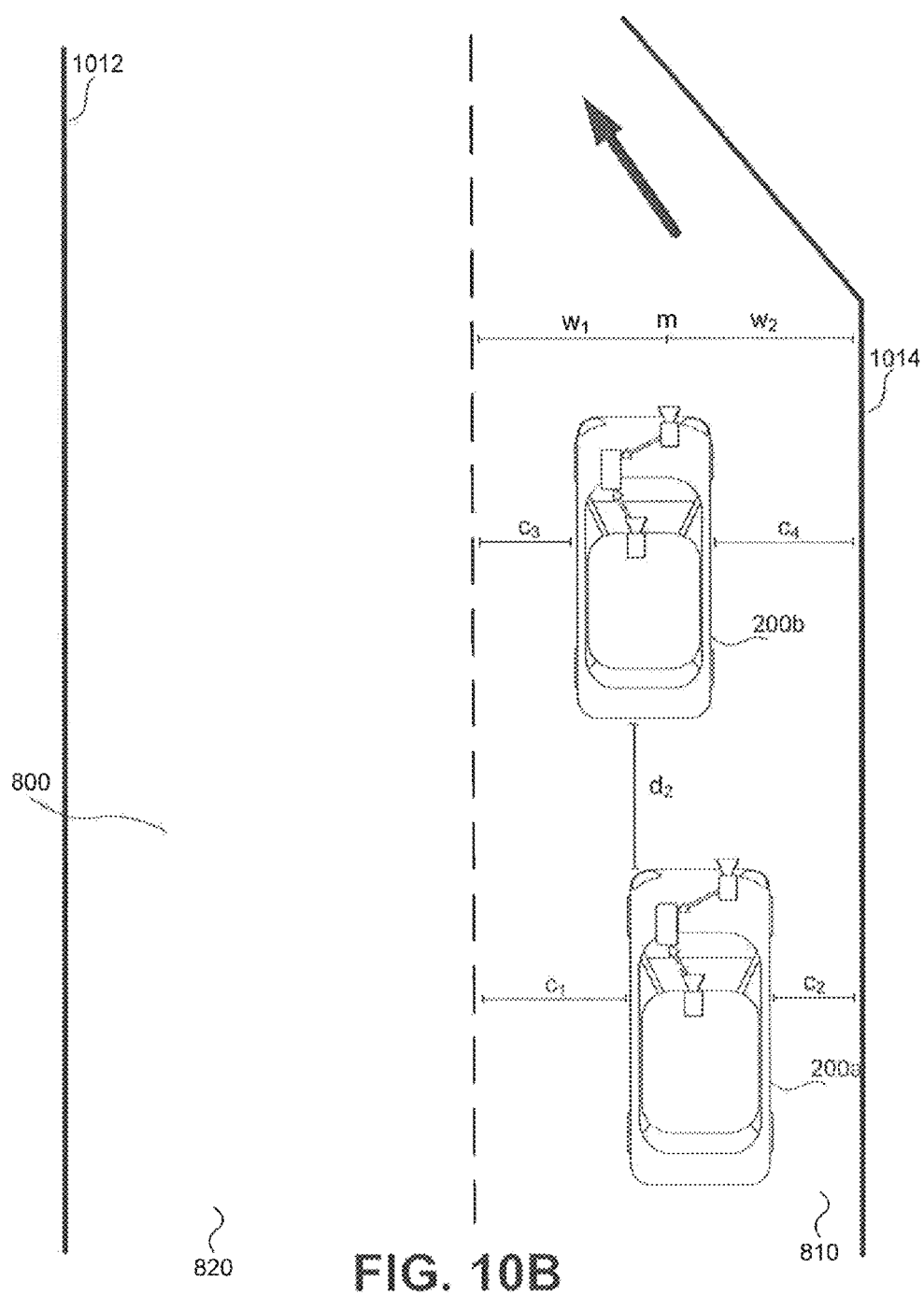
FIG. 10B is a diagrammatic representation of an exemplary vehicle including a lane end recognition system traveling a measurable distance behind a lead vehicle consistent with the disclosed embodiments.

FIG. 10B illustrates an additional visual determination and/or set of distance measurements that system 100 may use to determine if a current travel lane is ending on a roadway. In the example of FIG. 10B, there are two vehicles 200a and 200b driving in lane 810 of roadway 800, which is ending. In some embodiments, vehicle 200a may be equipped with a system 100 and may measure a distance $d_2$ to the back side of vehicle 200b. Distance $d_2$ may be measured to or from any of the portions of vehicles 200a and 200b discussed previously. Alternatively, vehicle 200b may be equipped with the system 100, and may measure distance $d_2$ backwards to vehicle 200a. Both vehicles are depicted as being equipped with systems 100 for purposes of FIG. 10B's exemplary illustration. In some embodiments, the system 100 (on whichever of the two vehicles illustrated in FIG. 10B) may be configured to make a visual determination of whether the current travel lane is ending based on distance $d_2$. In these embodiments, system 100 may be configured to recognize that the lane is ending based on an abrupt shortening of distance $d_2$. Alternatively, system 100 may detect that distance $d_2$ has acquired a lateral element instead of being a straight line extending normal to a front plane associated with vehicle 200a. When configured in this manner, measurements such as $c_1$-$c_4$ may be measured and used for positional status determination by lane positioning module 920. Distances $c_1$-$c_4$ may represent the distance from a side of vehicle 200a or 200b to the edge of lane 810, be it lane constraint 1014 or the dashed center line in the middle of roadway 800 dividing lanes 810/820. In other embodiments, a distance may be measured to lane constraint 1012 on the far side of lane 820 (not shown).

As in FIG. 8 and in FIG. 10A, lane 810 in FIG. 10B is ending, and both vehicles 200a and 200b will need to merge into lane 820. FIG. 10B illustrates additional distances that system 100 may be configured to calculate, extract, and/or analyze in a live driving situation. In addition to distances $c_1$-$c_4$ described above, system 100 may be further configured to calculate distances $w_1$ and $w_2$ and midpoint m of lane 810 relative to one or more lane constraints associated with that lane. When summed together, distances $w_1$ and $w_2$ equal measurement 1006 w as shown in FIG. 10A. System 100, via lane positioning module 920, may periodically measure distances $w_1$ and $w_2$ and midpoint m of lane 810 over set timepoints. Should distances $w_1$ and $w_2$ shrink, and/or if midpoint m shifts to the right or left, system 100 may determine that lane 810 is ending and that a merge to the other lane is needed.

Figure 11:
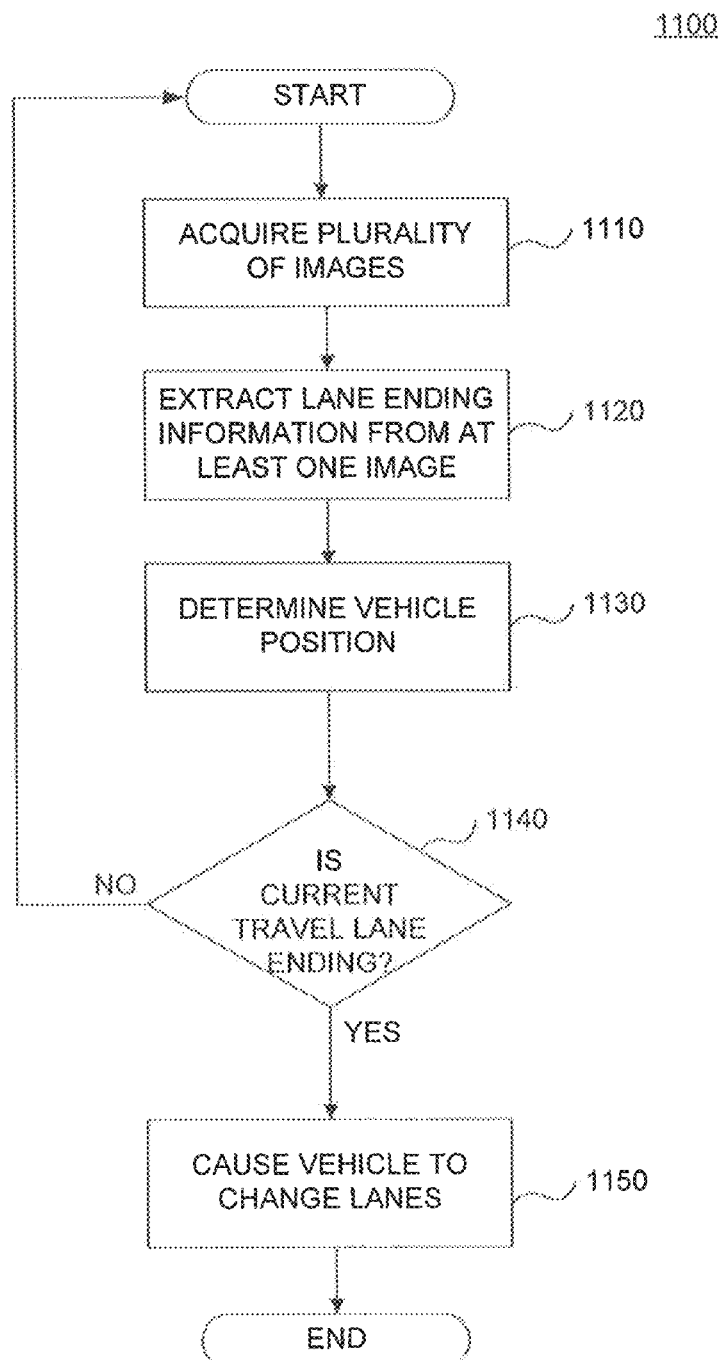
FIG. 11 is a flowchart showing an exemplary process for determining whether a current lane in which the vehicle is traveling is ending, consistent with the disclosed embodiments.

FIG. 11 illustrates a process 1100 for detecting a lane ending for a vehicle, consistent with disclosed embodiments. Steps of process 1100 may be performed by one or more of processing unit 110, image acquisition unit 120, position sensor 130, lane constraint module 910, lane positioning module 920, or action module 930.

At step 1110, process 1100 may include acquiring, using at least one image capture device 122, 124, and/or 126, at least one image of an area forward of vehicle 200. The area may further include at least one road sign providing information indicative of the lane ending, such as road signs 1002 and/or 1004. Processing unit 110 may receive the plurality of images from the image capture device(s) through data interface 128. The at least one image may then be processed in real time by image processor 190 of processing unit 110.

At step 1120, process 1100 may extract lane ending information from a representation of the at least one road sign included in the at least one image. The extraction may be carried out by one or more of image processor 190, lane constraint module 910, or lane positioning module 920. A variety of lane ending information may be extracted from the image data. For example, on roadways such as roadway 800 comprising a plurality of travel lanes (such as lanes 810 and 820), the extracted lane ending information may include an identification of which of the lanes from the plurality of lanes is ending. In other embodiments, the extracted lane ending information may include a distance to the lane ending. Image processor 190, lane constraint module 910, and/or lane positioning module 920 may identify one or more objects or lane constraints to help determine the distance until the lane ends. Taking the example of FIG. 10A, one or more images received from data interface 128 may include road signs 1002 and 1004, and may factor in road curvature 1008 to determine the distance 1010 remaining in the lane. In some embodiments, a value of curvature 1008 may itself independently constitute the extracted lane ending information. As part of processing the extracted information, system 100 may determine the distance from vehicle 200 to one or more of the identified objects (e.g., lane constraints) using position sensor 130. In some embodiments, system 100 may determine the distance from vehicle 200 to one or more of the identified objects (e.g., lane constraints) by analyzing one or more images acquired by one or more of image capture devices 122-126. In yet other embodiments, system 100 may determine the distance from vehicle 200 to one or more of the identified objects (e.g., lane constraints) by using a combination of data provided by position sensor 130 and data obtained through an analysis of one or more images acquired by one or more of image capture devices 122-126. At step 1130, process 1100 may determine a position of the vehicle, such as vehicle 200, based on at least one indicator of position of the vehicle. The at least one indicator of position of the vehicle may include information obtained by a direct measuring tool, physical device, or module, such as position sensor 130. Alternatively or additionally, the at least one indicator of position of the vehicle may include information obtained by an indirect measurement. For example, in some embodiments the at least one indicator of position may include a visual determination of which lane (such as lanes 810 and 820) among a plurality of lanes on a roadway 800 that vehicle 200 may be traveling. In other embodiments, the at least one indicator of position may include one or more visual determinations.

The visual determinations may be directly determined by software instructions executed by image acquisition unit 120 in the manner of a "range finder," or may be determined from analysis of image data received from data interface 128 by image processor 190 and acquired by one or more of image capture devices 122-126. In some embodiments, the at least one indicator of position may include a visual determination of a distance to the lane ending. This determination may, for example, be made by lane constraint module 910 and lane positioning module 920 based on a determined distance from vehicle 200 to one or more lane constraints of roadway 800 associated with one or more lanes. In still other embodiments, the at least one indicator of position may include a visual determination of a distance to a second vehicle. The second vehicle may be traveling in front of vehicle 200. This is the scenario described above in association with FIG. 10B. Once determined, the positional information may be stored within system 100, such as in memory 140/150, and may be periodically updated by lane positioning module 920 as discussed above in association with FIG. 9.

At step 1140, process 1100 may determine (based on the extracted lane information from step 1120 and the determined distance from the vehicle to the one or more roadway 800 lane constraints from step 1130), whether the current lane in which the vehicle is traveling is ending. As described generally above, system 100 may determine the ongoing status of a travel lane, such as lanes 810 and 820, within a roadway 800. For example, system 100 may extract information from road signs ahead of the vehicle, such as road signs 1002 and 1004 indicating that the lane in which vehicle 200 is traveling in may be ending shortly. Additionally, measurements of distance may be made, using various elements of system 100. For example, position sensor 130 and/or lane positioning module 920 may send information to processing unit 110 regarding the relative position of vehicle 200 within lane 810/820, including how far vehicle 200 is from the end of the lane. The end of the lane may be based on a measured distance or a visual determination (e.g., by analyzing one or more image images acquired by one or more of image capture devices 122-126).

If processing unit 110 determines from the acquired information that the current travel lane is not ending (Step 1140: NO), then process 1100 may revert back to the beginning, and system 100 may continue to monitor the status of vehicle 200 with respect to its current lane of travel. This condition may result, for example, if a road sign indicates that a lane is ending due to road construction, but due to an overriding exception, however, such as weather, the day of the week, or other factors, no workers or obstacles are actually blocking the lane. System 100 may also determine, for example, via lane constraint module 910 that a perceived shift in one or more lane constraints may be due to a new or temporary road pattern, or may comprise a natural curvature in the road. Of course, the driver (if any) of vehicle 200 is still capable of changing lanes manually.

Alternatively, if system 100 determines that the current travel lane is ending (Step 1140: YES), then process 1100 may proceed to step 1150. At step 1150, process 1100 may cause vehicle 200 to change lanes to another lane of roadway 800 that is not ending. Via action module 930, processing unit 110 may send an instruction to one or more systems associated with vehicle 200. For example, an instruction may be sent to steering system 240, instructing vehicle 200 to merge left or right into the next lane. Additional instructions may be sent; for example, image processor 190 may determine from real-time image data that traffic prevents an immediate merge into the next lane. In these embodiments, an instruction may first be sent to braking system 230 and/or the turn signal control system, and vehicle 200 may decelerate or be brought to a stop until the desired new lane is safe to merge into. At that time, the instruction to steering system 220 may be made and the vehicle may turn. In some alternative embodiments, where vehicle 200 is partially or fully under the control of a human operator, step 1150 may instead comprise generating feedback to the operator informing that the travel lane is ending and that a lane change is required. In some embodiments, an automated system such as system 100 and its action module 930 may take over operation of the car and cause the vehicle to change lanes automatically as described above if the human operator does not respond to the feedback within a certain time period. The time period may be predetermined, or may be calculated based on visual determinations of the distance to the end of the lane such as those described above in association with step 1130.

Detection of Low-Height Objects in a Roadway

System 100 may detect when an object is situated within a current lane of travel and, if system 100 determines that the object exceeds a threshold height, the system may steer an associated vehicle around or over the object. A "lane" may refer to a designated or intended travel path of a vehicle and may have marked (e.g., lines on a road) or unmarked boundaries (e.g., an edge of a road, a road barrier, guard rail, parked vehicles, etc.), or constraints. System 100 may operate to make these detections and determinations based solely on visual information acquired by one or more image acquisition units. In some embodiments, system 100 may be configured to detect objects in a roadway that project above the roadway surface by as little as 2 cm.

Figure 12:
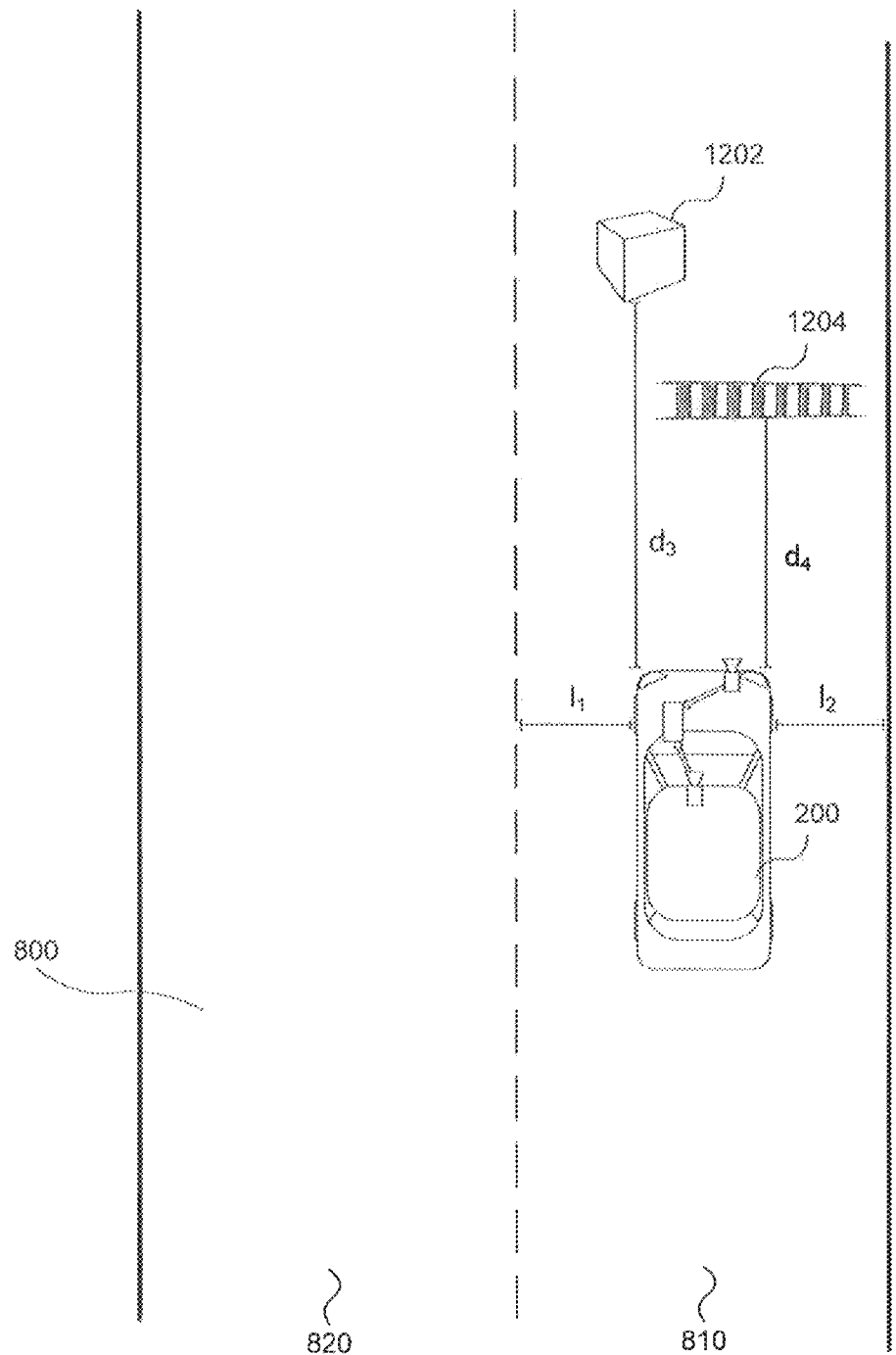
FIG. 12 is a diagrammatic top view representation of an exemplary vehicle including a system consistent with the disclosed embodiments in which an object is detected within the travel lane in which the vehicle is traveling.

FIG. 12 illustrates a vehicle 200 traveling on a roadway 800 in which the disclosed systems and methods for detecting an object in the roadway may be used. Vehicle 200 is depicted as being equipped with image capture devices 122 and 124; more or fewer image capture devices (including cameras, for example) may be employed on any particular vehicle 200. As shown, roadway 800 may be subdivided into lanes, such as lanes 810 and 820. Lanes 810 and 820 are shown as examples; a given roadway 800 may have additional lanes based on the size and nature of the roadway, for example, an interstate highway. In the example of FIG. 12, vehicle 200 is traveling in lane 810, and two objects 1202 and 1204 are located in lane 810. System 100 may, as discussed in detail below, cause vehicle 200 to steer around or over the object(s).

Processing unit 110 may be configured to determine one or more lane constraints associated with each of lanes 810 and 820 based on a plurality of images acquired by image capture device 122-126 that processing unit 110 may receive via data interface 128. According to some embodiments, the lane constraints may be identified by visible lane boundaries, such as dashed or solid lines marked on a road surface. Additionally or alternatively, the lane constraints may include an edge of a road surface or a barrier. Additionally or alternatively, the lane constraints may include markers (e.g., Botts' dots). According to some embodiments, processing unit 110 (via lane positioning module 1320, described in detail below) may determine constraints associated with lanes 810/820 by identifying a midpoint of a road surface width, such as the entirety of roadway 800 or a midpoint of one of lanes 810/820. Processing unit 110 may identify lane constraints in alternative manners, such as by estimation or extrapolation based on known roadway parameters when, for example, lines designating road lanes such as lanes 810/820 are not painted or otherwise labeled.

Detection of the constraints and pathways of roadway 800 and constituent lanes 810/820 may include processing unit 110 determining their 3D models via a camera coordinate system. For example, the 3D models of lanes 810/820 may be described by a third-degree polynomial. In addition to 3D modeling of travel lanes, processing unit 110 may perform multi-frame estimation of host motion parameters, such as the speed, yaw and pitch rates, and/or acceleration of vehicle 200. Processing unit 110 may detect static and moving objects and their position, all relative to vehicle 200, which will be described below in association with FIGS. 14A, 14B, and 15. For example, processing unit 110 may use image data, GPS data, and/or data from sensors (e.g. position sensor 130, speed sensors, etc.) to determine the position of vehicle 200. Processing unit 110 may further determine a road elevation model to transform a portion or all of the information acquired from the plurality of images into 3D space.

In the example of FIG. 12, several measurements are represented that system 100 may take into account when determining potential actions to take using action module 1330, which will be described in detail below. Objects 1202 and 1204 are represented in the illustration of FIG. 12 as a cardboard box and a ladder, respectively. These are common items that may be found as obstacles in a typical roadway, for example, after falling from an unseen second vehicle. These objects are meant as examples only. System 100 may be configured to detect the presence of any object that may be found in a roadway, including but not limited to branches, tires or portions thereof, scraps of metal or wood, speed bumps within a travel lane, a human or animal, a pipe, a piece of another vehicle, etc.

As part of a driver-assist object detection system consistent with disclosed embodiments, system 100 may determine, for example, distances $l_1$ and $l_2$, which may represent the distance of a surface of vehicle 200 to various features of roadway 800 and/or lanes 810/820, such as lane constraints, road signs, or any other such feature. Further, system 100 may determine distances $d_3$ and $d_4$, which are distances measured from a surface of vehicle 200 to each of objects 1202 and 1204, respectively. Distances such as $l_1$, $l_2$, $d_3$, and $d_4$, may be measured from any portion of the interior or exterior vehicle 200, including but not limited to the front of vehicle 200, a portion of vehicle 200 such as a headlight or front license plate, a position as-installed of image capture devices 122 or 124, a determined centroid of vehicle 200, the rear of vehicle 200, one or more windshields or mirrors associated with vehicle 200, wheels of vehicle 200, right or left sides or windows of vehicle 200, a point associated with the roof of vehicle 200, or a point associated with the chassis of vehicle 200. Further detail on how these exemplary distance measurements may be used to determine potential actions taken by system 100 will now be discussed in detail.

Figure 13:
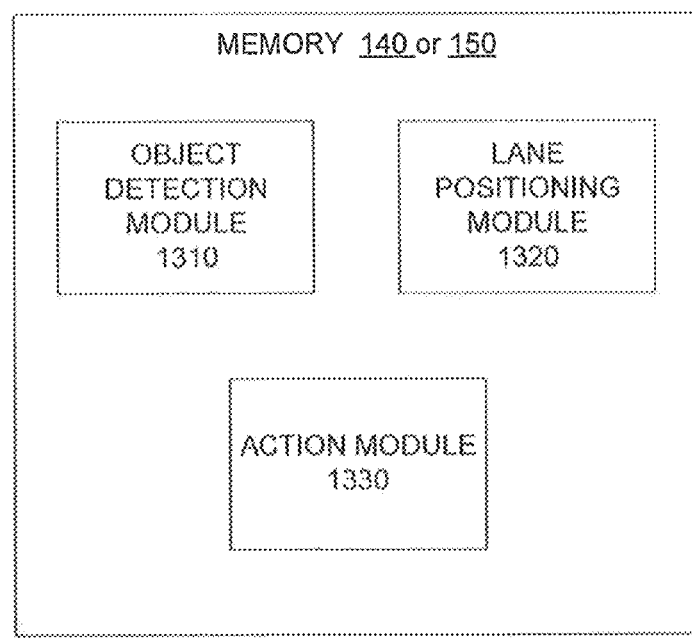
FIG. 13 is a diagrammatic representation of the memory of an exemplary driver-assist object detection system consistent with the disclosed embodiments.

FIG. 13 is an exemplary block diagram of memory 140 and/or 150, which may store instructions for performing one or more operations consistent with disclosed embodiments. As illustrated in FIG. 13, memory 140 may store one or more modules for performing the object detection and responses described herein. For example, memory 140 may store an object detection module 1310, a lane positioning module 1320, and an action module 1330. Application processor 180 and/or image processor 190 may execute the instructions stored in any of modules 1310-1330 included in memory 140. One of skill in the art will understand that references in the following discussions to processing unit 110 may refer to application processor 180 and image processor 190 individually or collectively. Accordingly, steps of any of the following processes may be performed by one or more processing devices.

Object detection module 1310 may store instructions which, when executed by processing unit 110, may detect one or more objects found within a roadway 800, such as within lanes 810 and 820. As will be discussed below in association with FIGS. 14A, 14B, and 15, object detection module 1310 may identify one or more objects within image data captured by one or more of image capture devices 122-126 and determine that those objects are resting on the roadway surface. Object detection module 1310 may further determine a reference plane corresponding to the road surface, and using the reference plane, may determine dimensions and attributes of the identified object(s), such as their height, length, and width. The object detection process may further include identifying painted lane lines and/or measuring a midpoint of a road surface such as roadway 800, for purposes of determining the reference plane and for determining the location of the objects within the roadway/lanes. In some embodiments, the field of view of the image capture device(s) used to generate the image data may range from about 35 to about 55 degrees.

Lane positioning module 1320 may store instructions which, when executed by processing unit 110, may assist system 100 in determining a position of vehicle 200. In some embodiments, determining the position of vehicle 200 may include determining, based on at least one indicator of vehicle position, a distance from the vehicle to one or more lane constraints associated with the current lane in which the vehicle is traveling. In these embodiments, the distance may also be measured relative to identified objects detected by object detection module 1310. Consistent with disclosed embodiments, the distance(s) measured to the one or more lane constraints may be used to determine if a change in a directional course of vehicle 200 is required or recommended. Lane positioning module 1320 may process the plurality of images to detect features of the roadway on which vehicle 200 is traveling, such as roadway 800, in order to determine the position of vehicle 200. Additionally or alternatively, lane positioning module 1320 may receive information from other modules (including position sensor 130) or other systems indicative of the presence of other features in the image data, such as additional vehicles, curvature of the road, etc.

Action module 1330 may store instructions which, when executed by processing unit 110, may assist system 100 in taking one or more actions relative to the operation of vehicle 200 based on information received from one or more sources, such as position sensor 130, object detection module 1310, or lane positioning module 1320. In some embodiments, action module 1330 may receive information (from, e.g., object detection module 1310) indicating that one or more objects have been detected in roadway 800. The information may further include one or more dimensions or attributes of the detected object, such as its height relative to the roadway surface. Action module 1330 may then perform one or more actions affecting the operational status of vehicle 200, such as causing system 100 to provide control signals to one or more of throttling system 220, braking system 230, and steering system 240 to navigate vehicle 200 (e.g., by causing an acceleration, a turn, a swerve, a lane shift, etc.). For example, in some embodiments, action module 1330 may send an instruction to steering system 240, and steering system 240 may execute the instruction to steer the vehicle into a new lane of travel. In other embodiments, action module 1330 may determine that a safer and/or better course of action is to simply steer vehicle 200 such that it passes over top of the object, assuming the height of the object is less than the road clearance height of vehicle 200. Additionally or alternatively, action module 1330 may send instructions to other systems associated with vehicle 200, such as braking system 230, turn signals, throttling system 220, etc. In some embodiments, action module 1330 may instead provide a human operator of the vehicle with audio, visual, or tactile feedback representative of the information gathered from the relevant systems and/or sensors. The human operator may then act on this feedback to steer the vehicle to a different lane.

Figure 14A:
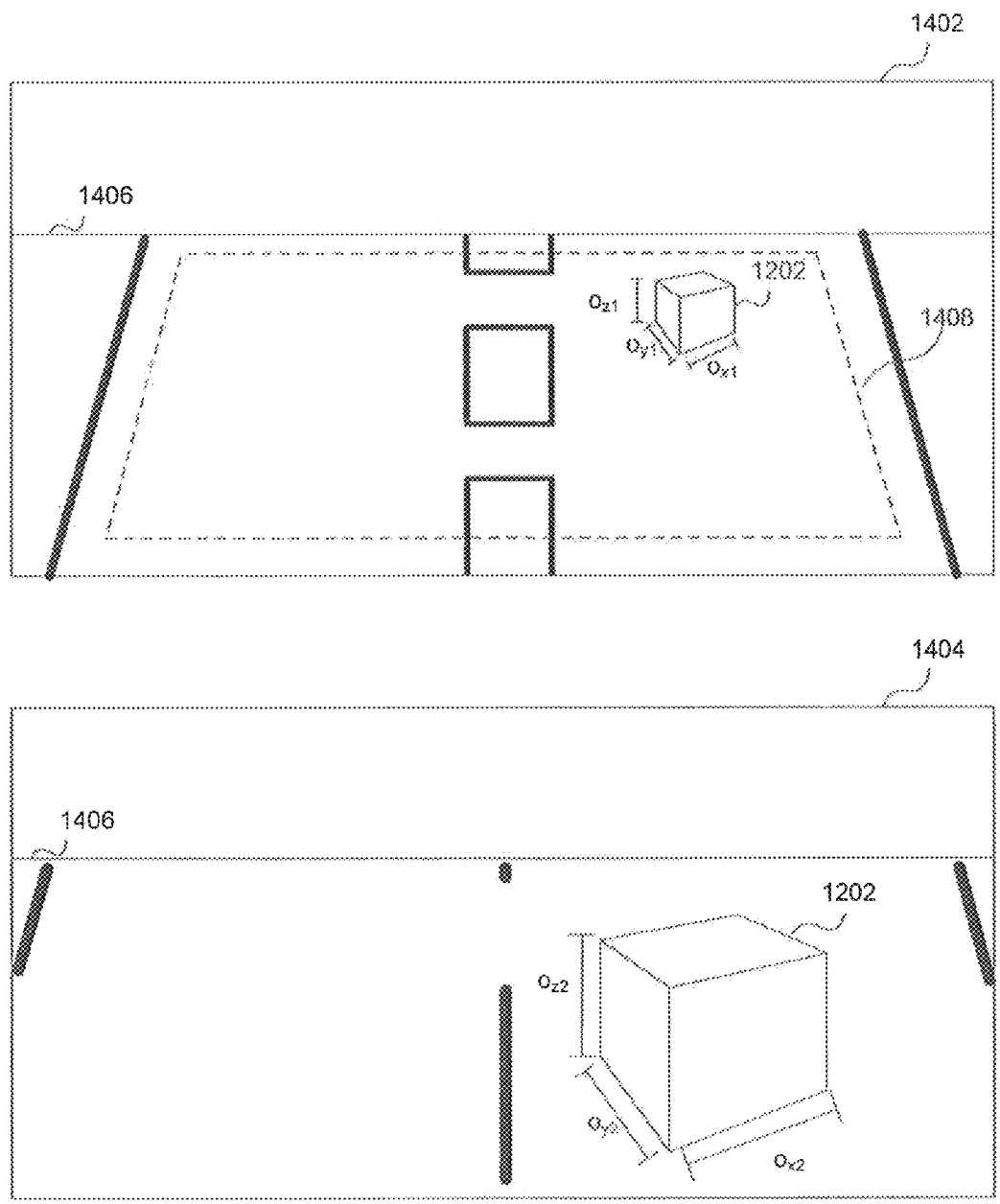
FIG. 14A is a diagrammatic representation of two captured images indicating an object found within the travel lane among a plurality of images captured by an exemplary driver-assist object detection system consistent with the disclosed embodiments.

FIG. 14A illustrates examples of two images among the plurality of captured images that may be acquired by system 100 via image capture devices 122-126. In the example of FIG. 14A, image 1402 (top) may be the first image acquired, and image 1404 (bottom) may be a second image taken at a later time, such as a few seconds later. As can be seen in images 1402 and 1404, a vehicle equipped with a system 100, such as vehicle 200 above, is driving on a roadway, such as roadway 800. The roadway is aligned straight ahead of the vehicle, with the view of the road ending at horizon 1406. Based on the view illustrated in image 1402, the roadway may be cresting a hill. Any roadway configuration or alignment may be capable of being analyzed by system 100. As can be seen in both images 1402 and 1404, object 1202, representing a cardboard box of initially unknown dimensions, is lying in the middle of the right travel lane of the illustrated roadway.

In some embodiments, system 100 may be configured to analyze captured images, such as images 1402 and 1404, to determine a reference plane corresponding to a road plane, such as the roadway surface. This process will be described in more detail below in association with FIG. 15 and process 1500. Briefly, system 100 (via processing unit 110 and image processor 190) may determine the reference plane corresponding to the roadway surface as an average surface level associated with the road surface. This may account for variations in the roadway surface due to the composition of the roadway (i.e., asphalt, concrete, or even gravel) or changes in the pitch and/or curvature of the roadway. Multiple images from among the plurality of images may be used to determine the reference plane. In the illustration of FIG. 14A, the determined reference plane is represented by reference plane 1408.

System 100, via processing unit 110 and object detection module 1310, may locate one or more objects lying in the roadway, such as object 1202. The detection may occur, for example, when the object appears in the same location in multiple images among the captured plurality of images. Objects, such as object 1202, may be moving or stationary. Object 1202 is stationary in the roadway in the illustration of FIG. 14A. The location(s) of the object(s) may be determined by object detection module 1310 by various methods. In some embodiments, the location of the target object(s) may be determined by GPS and/or other coordinate-based systems. Further, object detection module 1310 may make a visual determination of the location of object 1202. In some embodiments, one or more of object detection module 1310, position sensor 130, and image processor 190 may further determine how far away object 1202 is from vehicle 200, as discussed above in association with FIG. 12. When configured in this manner, measurements such as $d_3$-$d_4$ as shown in FIG. 12 may be measured and used for positional status determination by lane positioning module 1320.

Distances from vehicle 200 to objects detected within the roadway, such as object 1202, may be calculated in the manner described above in association with FIGS. 5-7. For example, system 100 may analyze image data, position data (e.g., GPS location information), map data, speed data, and/or data from sensors included in vehicle 200 to calculate the distances. System 100 may collect the data for analysis from, for example, image acquisition unit 120, position sensor 130, and other sensors.

In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object).

Processing unit 110 may be configured in some embodiments to create a 3D reconstruction of the visible portion of the roadway, using one or more mathematical algorithms or models as discussed previously. For example, as discussed above in association with FIG. 5, processing unit 110 may determine a look-ahead distance for vehicle 200, which may have a lower bound ranging from 10 to 20 meters, may be calculated as the product of the speed of vehicle 200 and a determined look-ahead time. For example, as the speed of vehicle 200 decreases, the look-ahead distance may also decrease (e.g., until it reaches the lower bound). Additionally or alternatively, processing unit 110 may execute stereo image analysis module 404 to perform stereo image analysis of the first and second plurality of images to create a 3D map of the road in front of the vehicle and detect features within the images, such as object 1202. Processing unit 110 may estimate a position of object 1202 relative to vehicle 200 by observing differences that may exist relative to objects appearing in at least two of the plurality of captured images within the image data. For example, position, velocity, and/or acceleration relative to vehicle 200 may be determined based on trajectories, positions, movement characteristics, etc. of features associated with object 1202.

Object 1202 may be a relatively flat object, or it may be three dimensional. As discussed in further detail below, if the object is flat or relatively flat (e.g., 2 cm or less, 1 cm or less, etc.), system 100 may determine that no further action or change in course of vehicle 200 is necessary. In the illustration of FIG. 14A, object 1202 is again a cardboard box. In first image 1402, object 1202 has initial dimensions $o_{x1}$, $o_{y1}$, and $o_{z1}$. System 100, via object detection module 1310, may be configured to determine these dimensions based on the reference plane 1408, the detected lane constraints of the roadway, or other reference points of known size and/or location within the image data. In second image 1404, taken later, the object 1202 is now closer to the vehicle, and appears larger. Object 1202 now has second dimensions $o_{x2}$, $o_{y2}$, and $o_{z2}$. System 100 may determine this second set of dimensions in the same manner as the first.

In some embodiments, system 100 may use the determined dimensions of object 1202 in first image 1402 and at least a second image, such as image 1404, to gather more information about the object and determine one or more attributes of the object. In some embodiments, system 100 (via processing unit 110 and/or image processor 190) may be configured to automatically recognize the object based on known objects previously programmed into an integrated database or a database accessible by the Internet. In these embodiments, system 100 may be configured to generate audio or visual feedback to a human operator of vehicle 200.

System 100 may determine, for example, that one or more dimensions $o_{x2}$, $o_{y2}$, and $o_{z2}$ on from image 1404 are different from dimensions $o_{x1}$, $o_{y1}$, and $o_{z1}$ from image 1402. If the second set of dimensions from image 1404 are smaller than those taken from the first image 1402, the object is likely moving away from vehicle 200 and is generally not of concern. If the second set of dimensions is determined to be larger than the first set of dimensions, then that determination may indicate that object 1202 is either stationary in the roadway or moving towards vehicle 200, and additional actions may be taken. For example, system 100 may determine the height of object 1202 (essentially, dimension $o_{x1}/o_{x2}$) relative to reference plane 1408 to determine the approximate height of object 1202 relative to the roadway surface. In some embodiments, system 100 may be configured to detect objects as small as 2 cm tall. Based on the determined height of the object, system 100 may take one of several alternative actions, as will now be discussed in further detail.

Figure 14B:
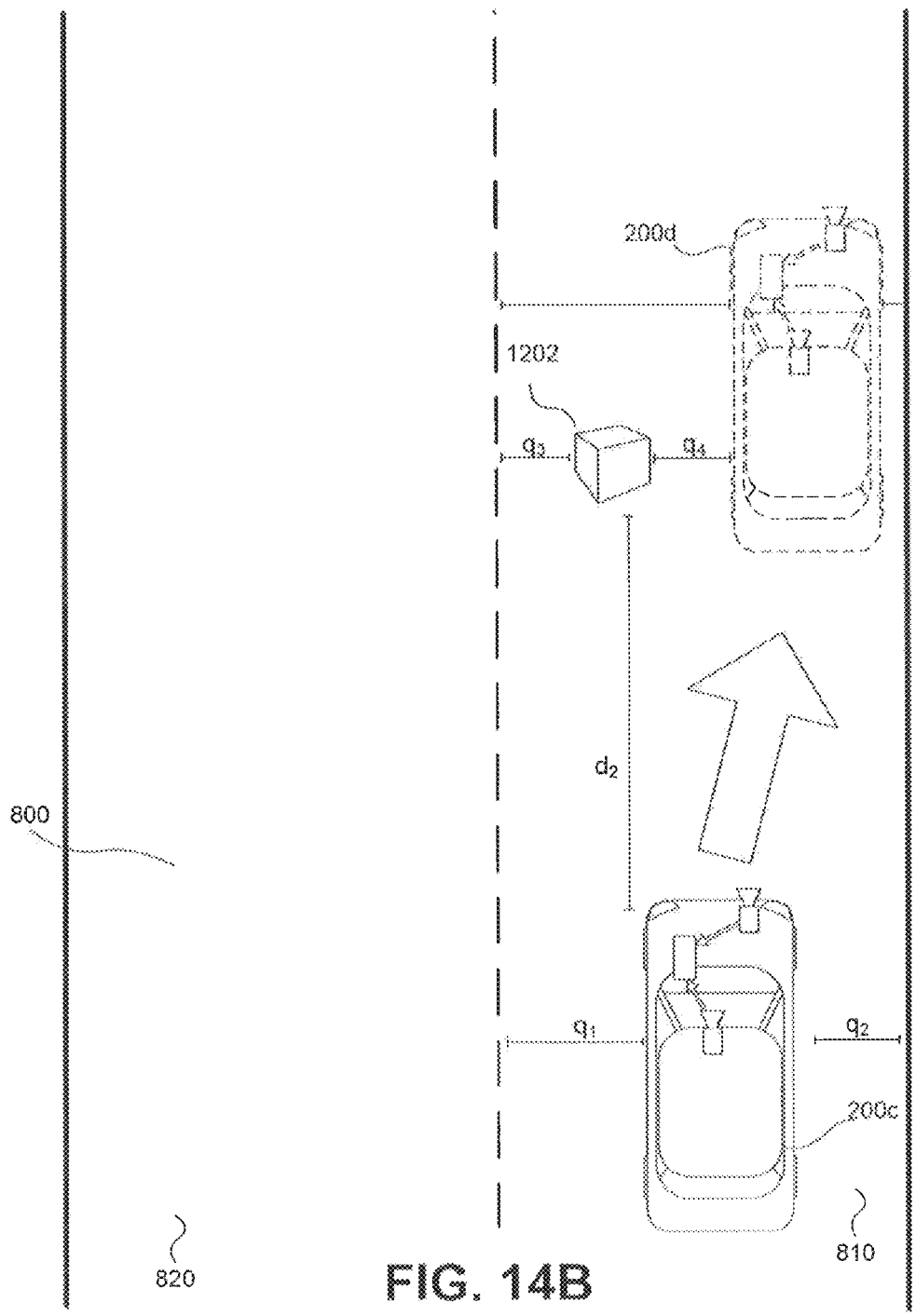
FIG. 14B is a diagrammatic top view representation of an exemplary vehicle including a system consistent with the disclosed embodiments in which an object is detected within the travel lane in which the vehicle is traveling.

FIG. 14B provides an annotated view of the situation depicted in FIG. 12. Vehicle 200 (here represented as vehicle 200c) is once again traveling in lane 810 of roadway 800. Vehicle 200c is again equipped with image capture devices 122 and 124; more or fewer devices may be associated with any particular vehicle 200.

Object 1202 is located in lane 810 of roadway 800. Using the process described above in association with FIG. 14A (and in further detail below in association with FIG. 15 and process 1500), system 100 may be configured to determine multiple attributes of object 1202 based on a plurality of images acquired from one or more of image capture devices 122-126, and received via data interface 128. These attributes may include the position and dimensions of object 1202, including its height relative to the surface of roadway 800.

As an initial step, system 100, via position sensor 130 and/or lane positioning module 1320, may determine relative positions of vehicle 200c and object 1202. This determination may include determining lane constraints or other such positional indicators associated with roadway 800 and/or lanes 810/820. System 100 via processing unit 110 may then determine the position of vehicle 200c within its current lane of travel (here, lane 810) by calculating distances from the determined constraints. In the illustration of FIG. 14B, system 100 may for example determine distances $q_1$ and $q_2$ from one or more surfaces of vehicle 200 to the lane constraints. Further, system 100 may determine distance $d_2$ from a surface of vehicle 200c to a surface of object 1202. System 100 may also determine relative positioning of object 1202 laterally within the lane, such as by measuring distance $q_3$ from a surface of the object 1202 to the lane constraint separating lanes 810 and 820. Each of these determined distances, such as $q_1$, $q_2$, etc., may be measured from any portion of the interior or exterior of vehicle 200c, including but not limited to the front of vehicle 200c, a portion of vehicle 200c such as a headlight or front license plate, a position as-installed of image capture devices 122 or 124, a determined centroid of vehicle 200c, the rear of vehicle 200c, one or more windshields or mirrors associated with vehicle 200c, wheels of vehicle 200c, right or left sides or windows of vehicle 200c, a point associated with the roof of vehicle 200c, or a point associated with the chassis of vehicle 200c. Distances $d_2$ and $q_3$ may also be measured to any portion in three-dimensional space of object 1202.

Based at least on the dimensions of object 1202 determined as discussed above in association with FIG. 14A, as well as the determined distances illustrated in FIG. 14B, system 100 may determine one or more actions to take. System 100 may act via action module 1330 to send information and instructions to various associated subsystems of vehicle 200c to carry out the actions, including but not limited to throttling system 220, braking system 230, and steering system 240. The action taken by action module 1330 may be further informed by a determination of the roadway clearance height of vehicle 200c. This clearance height may be a known value stored in memory 140/150 of system 100, or it may be determined anew in each driving situation based on various factors such as the inflation status of the tires, the road surface, weather conditions, etc. In some embodiments, the clearance height may be measured using optics and a reference point (e.g., from vehicle 200c to a point on the road surface) or by a sound echo, optical echo, radio frequency from the road surface, etc. Action module 1330 may then determine one of several alternative actions to undertake based on the determined height of object 1202 and the roadway clearance height of vehicle 200c. For example, if the height of object 1202 is less than the roadway clearance height of vehicle 200c, action module 1330 may determine that the safest course of action is to simply do nothing, and allow vehicle 200c to drive over object 1202 with the object oriented between the wheels of vehicle 200c. Alternatively, action module 1330 may determine that the height of object 1202 is less than the roadway clearance height of vehicle 200c, but that a minor change in the directional course of vehicle 200c may permit vehicle 200c to safely drive over object 1202. Further, system 100 and action module 1330 may determine that the height of object 1202 exceeds the roadway clearance height of vehicle 200c, and that corrective adjustments to the directional course of vehicle 200c may be required in order to avoid object 1202. These adjustments may further require instructions to be sent to throttling system 220 and/or braking system 230 in order to safely undertake the change in course.

This latter scenario is illustrated in FIG. 14B. This illustration is an example only, and is not intended to be limiting. In the example of FIG. 14B, system 100 has determined that the height of object 1202 is larger than the roadway clearance height of vehicle 200c. Accordingly, action module 1330 may determine, based on detected lane constraints and measured distances as described above, that the best course of action for vehicle 200c is to move slightly to the right to avoid object 1202. Action module 1330 may then send instructions to throttling system 220, braking system 230, and steering system 240 to effect this change in directional course.

The projected location of vehicle 200c as it passes object 1202 is represented by vehicle 200d. System 100 may determine new and additional distances in order to successfully complete the pass of object 1202. For example, system 100 may determine a distance $q_4$ as shown in FIG. 14B, corresponding to a safe distance needed from object 1202 to a surface of vehicle 200d. System 100 may further calculate distances $q_5$ and $q_6$ via lane positioning module 1320, representing the position of vehicle 200d relative to detected lane constraints. These distances may be sent to action module 1330 to assist in determining the proper directional course for vehicle 200d. Ideally, vehicle 200d would successfully swerve around object 1202 while staying within the constraints of lane 810. In some embodiments, however, it may be necessary for vehicle 200d to move outside of lane 810's constraints in order to avoid object 1202, or it may be necessary for vehicle 200*d* to simply change lanes, such as to lane 820. Once object 1202 is passed, action module 1330 may send an indication to throttling system 220, braking system 230, and steering system 240 that normal operation of vehicle 200 may be resumed.

Figure 15:
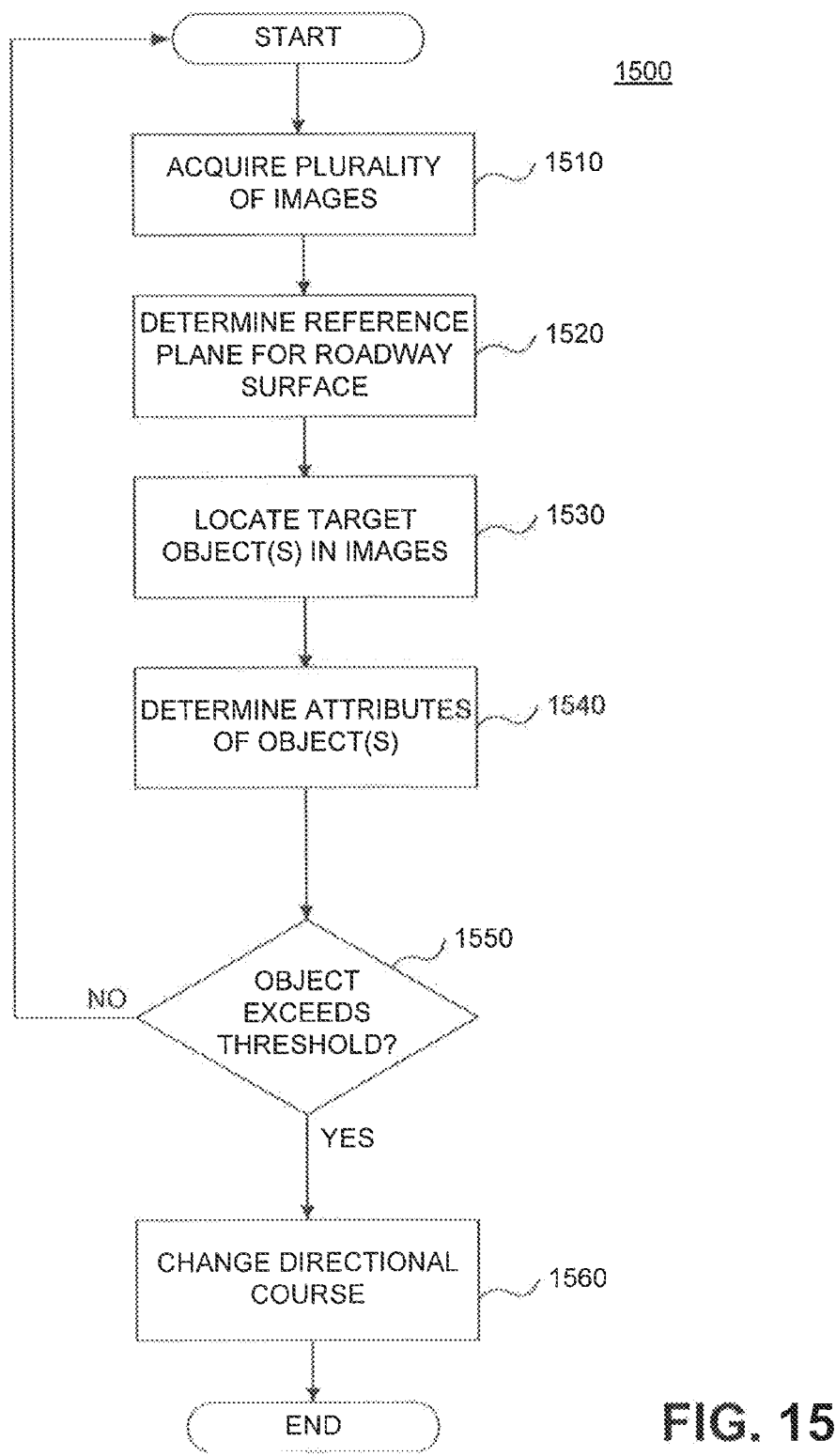
FIG. 15 is a flowchart showing an exemplary process for determining whether a current lane in which the vehicle is traveling is ending, consistent with the disclosed embodiments.

FIG. 15 illustrates a process 1500 for detecting an object in a roadway, consistent with disclosed embodiments. Steps of process 1500 may be performed by one or more of processing unit 110, image acquisition unit 120, position sensor 130, image processor 190, object detection module 1310, lane positioning module 1320, or action module 1330.

At step 1510, process 1500 may include acquiring, using at least one image capture device 122, 124, and/or 126, a plurality of images of the area surrounding vehicle 200. In some embodiments, the plurality of images may be of an area forward of vehicle 200. Processing unit 110 may receive the plurality of images from the image capture device(s) through data interface 128. The plurality of images may then be processed in real time by image processor 190 of processing unit 110. Image processor 190 may process the first image captured by the at least one image capture device, as well as at least one additional image captured at a later point in time. The at least one image capture device may be configured to have a field of view of between about 35 degrees and about 55 degrees. Examples of acquired images and potential fields of view for system 100 are illustrated above in association with FIG. 14A.

At step 1520, process 1500 may determine a reference plane corresponding to the surface of roadway 800. The determination may be carried out by one or more of image processor 190, object detection module 1310, or lane positioning module 1320. The reference plane may be similar to the plane 1408 described above in association with FIG. 14A. The reference plane may be determined based on the plurality of images captured by the at least one image capture device. In these embodiments, the reference plane may be determined by analyzing the first image and at least a second image from among the plurality of images. In some embodiments, the location of a roadway surface may be determined by analysis of the plurality of images by image processor 190.

The reference plane may be detected by way of parallax information, or by way of detecting one or more lane constraints on the roadway surface. In some embodiments, the reference plane may be determined by color or darkness differences in the image data. Processing unit 110 may generate and propose multiple potential reference planes, with image processor 190, and then select the best candidate. Once a reference plane is selected, information about its location may be stored within system 100, such as in memory 140/150. In some embodiments, processing unit 110 and/or image processor 190 may periodically redetermine the reference plane based on changes in the roadway surface, such as elevation or curvature changes, or when vehicle 200 turns onto a different roadway. In some embodiments, processing unit 110 may be configured to determine the reference plane 1408 corresponding to the surface of roadway 800 as an average surface level associated with a road surface appearing in the plurality of images. This method may be useful, for example, when roadway 800 is not perfectly flat or is otherwise unusual, such as if the road surface includes one or more of gravel, potholes, snow or ice, mud, vegetation, etc.

At step 1530, process 1500 may locate a target object in the first image and at least one second image taken at a later time within the plurality of images. Object detection module 1310 may locate the images based on their presence in multiple images among the plurality of images acquired by the system, as illustrated above in association with FIG. 14A. Object detection module 1310 may determine one or more positional measurements associated with the detected object. These measurements, as discussed above in association with FIGS. 14A-14B, may include relative measurements to other objects, such as vehicles or lane constraints. The determination of object position may be assisted by a direct measuring tool, physical device, or module, such as position sensor 130. In other embodiments, the determinations may include one or more visual determinations. The visual determinations may be directly determined by software instructions executed by image acquisition unit 120 in the manner of a "range finder," or may be determined from analysis of image data received from data interface 128 by image processor 190 and acquired by one or more of image capture devices 122-126. Once determined, the object's position may be stored within system 100, such as in memory 140/150, and may be periodically updated by object detection module 1310.

At step 1540, process 1500 may determine one or more attributes of the detected object(s). In some embodiments, the object may be recognized as a particular object, based on information stored in a database associated with system 100. As discussed above, these determined attributes may include dimensions of the detected object, such as its height relative to the detected reference plane. System 100 may be configured to determine the height of any object within a roadway that extends at least about 2 cm above the reference plane. In alternative embodiments, system 100 may be configured to detect and determine attributes for any object extending between 2 and 10 cm above the reference plane. In other embodiments, the determination of target object height may also be based on a detected velocity of the vehicle. The velocity may be determined based on information received from one or more of throttling system 220 or braking system 230. Additional details on the calculation of a reference plane for the road surface and calculating the height of a target object may be found in U.S. patent application Ser. No. 14/554,500, filed Nov. 26, 2014, which is hereby incorporated by reference in its entirety.

System 100 may be configured to determine actions associated with the detected object based on the determined attributes. For example, system 100 and action module 1330 may be configured to take no substantive action unless the determined height of the detected object exceeds a threshold level. In some embodiments, the threshold level may be about 2 cm, as discussed above, or may be higher (e.g., 3 cm, 4 cm, 5 cm, 6 cm, etc.) depending on user or system preferences. For example, in some embodiments, the threshold may be associated with a detected roadway clearance height of vehicle 200. If processing unit 110 determines from the acquired information that height of the object does not exceed the configured threshold (Step 1550: NO), then process 1500 may revert back to the beginning, and system 100 may continue to monitor the status of potential objects within a roadway.

Alternatively, if system 100 determines that an action may be needed in response to the presence of a detected object in the roadway (Step 1550: YES), then process 1100 may proceed to step 1560. At step 1560, process 1500 may cause vehicle 200 to change directional course to evade or otherwise pass a detected object. Via action module 1330, processing unit 110 may send an instruction to one or more systems associated with vehicle 200. For example, an instruction may be sent to steering system 240, instructing vehicle 200 to merge left or right into the next lane.

Alternatively, instructions may be sent to swerve around the object, or to change directional course such that the vehicle simply drives over the object with the object situated between the wheels. Additional instructions may be sent; for example, image processor 190 may determine from real-time image data that traffic or other obstacles prevent an immediate change in directional course. In these embodiments, an instruction may first be sent to braking system 230 and/or the turn signals, and vehicle 200 may decelerate or be brought to a stop until the directional course change is possible. At that time, the instruction to steering system 220 may be safely made and the vehicle may turn to change course.

In some alternative embodiments, where vehicle 200 is partially or fully under the control of a human operator, step 1560 may instead comprise generating feedback to the operator informing that an object is detected in the roadway and that a change in directional course is suggested or required. In some embodiments, an automated system such as system 100 and its action module 1330 may take over operation of the car and cause the vehicle to change course automatically as described above if the human operator does not respond to the feedback within a certain time period. The time period may be predetermined, or may be calculated based on visual determinations such as those described above in association with FIGS. 12 and 14A-14B.

Ultra-Wide Traffic Light Detection System

In some embodiments, system 100 may identify objects located outside of a sightline of a typical driver location in vehicle 200. The typical driver location in vehicle 200 is on the left side of the front seat in countries that drive on the right-hand side of the road, and on the right side of the front seat in countries that drive on the left-hand side of the road. The U.S. National Highway Traffic Safety Administration recommends that drivers place themselves 10 inches (25.4 centimeters) from the driver air bag for safety reasons. This distance is measured from the center of the steering wheel to the driver's breastbone. Because vehicle 200 is not transparent, portions of vehicle 200 (e.g., the roof, doors, windshield frame, etc.) may obscure the angle-of-view from the typical driver location. In addition, while humans have an almost 180-degree forward-facing horizontal field of view, the vertical range of the field of view in humans is significantly less. However, a driver assistance system may use an image capture device (e.g., image capture device 122) that has an extended angle-of-view that exceeds the angle-of-view of a driver who is seated in the typical driver location. The extended angle-of-view may enable system 100 to identify objects in the environment of vehicle 200 that are otherwise undetectable by the driver. Moreover, system 100 may determine a change associated with the identified objects, and act accordingly. For example, system 100 may determine a change in status of a traffic light located in a region above vehicle 200. As another example, system 100 may determine the trajectory of different objects (e.g., pedestrians) located in a region beside vehicle 200.

Figure 16:
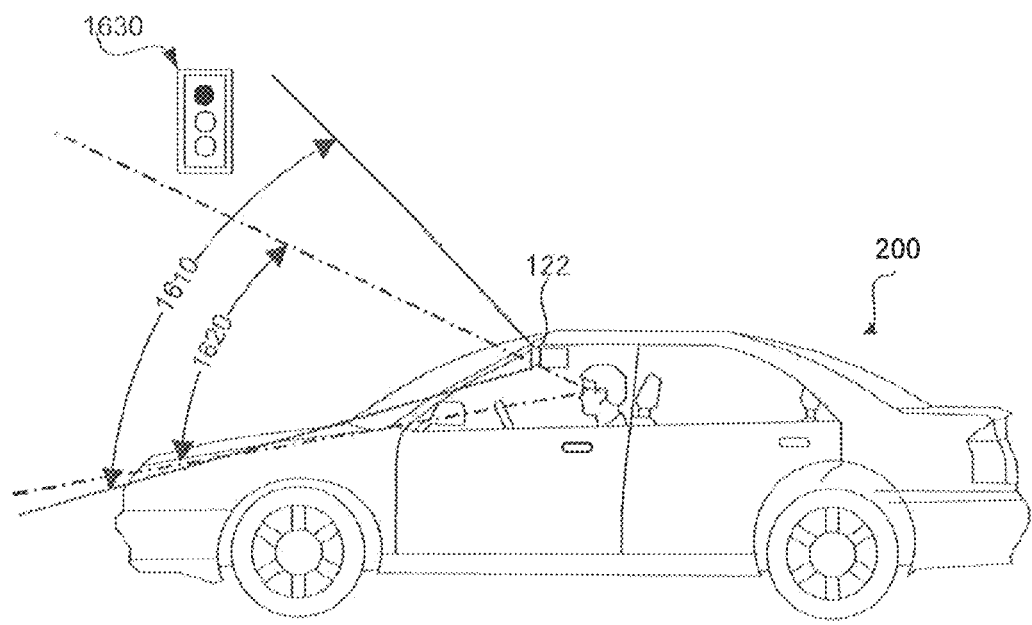
FIG. 16 is a diagrammatic side view representation of an exemplary vehicle including an image capture device with an extended angle-of-view consistent with the disclosed embodiments.
Figure 17:
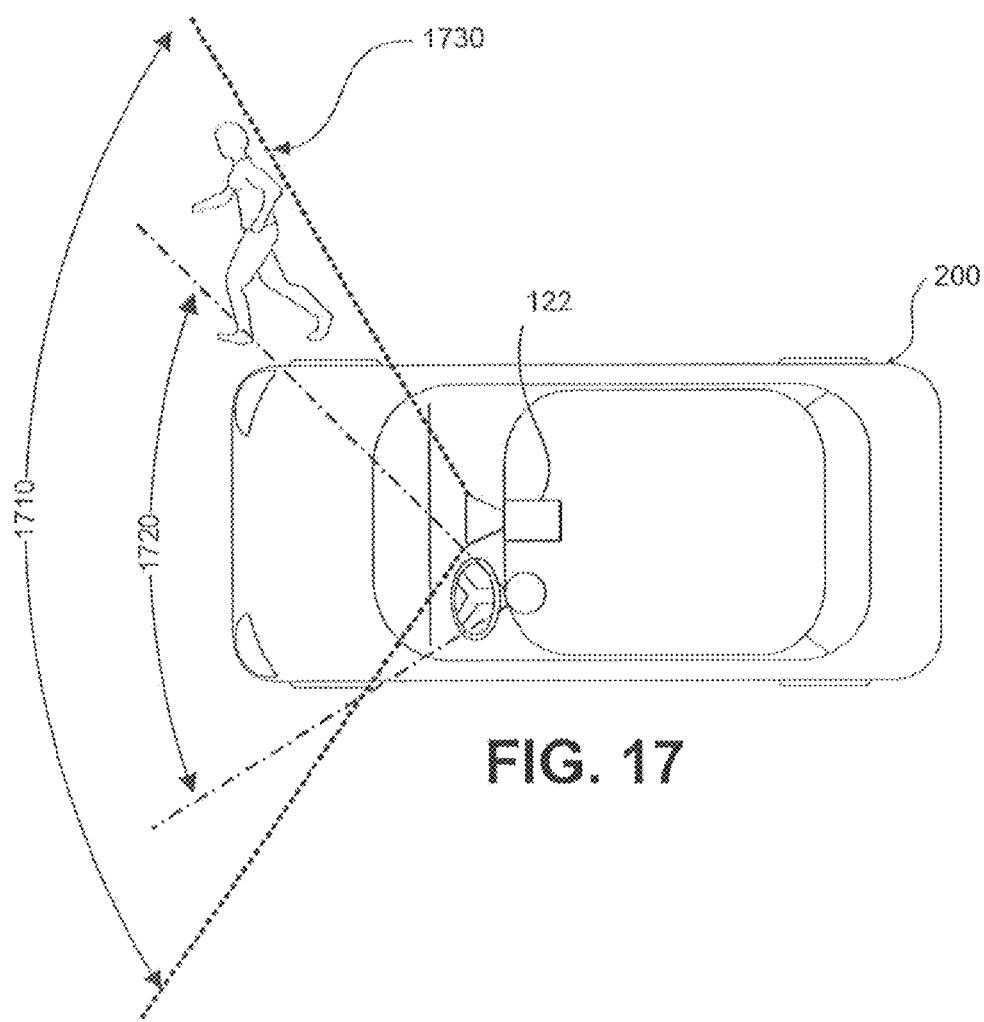
FIG. 17 is a diagrammatic top view representation of the vehicle including the image capture device with the extended angle-of-view consistent with the disclosed embodiments.

FIGS. 16 and 17 are diagrammatic representations of vehicle 200 in two situations, consistent with disclosed embodiments. As illustrated in FIGS. 16 and 17, vehicle 200 may include image capture device 122 associated with a first angle-of-view. The first angle-of-view is vertically represented by FOV 1610, as shown in FIG. 16, and horizontally represented by FOV 1710, as shown in FIG. 17. Also illustrated in FIGS. 16 and 17 is a second angle-of-view from the typical driver location in vehicle 200. The second angle-of-view is vertically represented by FOV 1620, as shown in FIG. 16, and horizontally represented by FOV 1720, as shown in FIG. 17. Consistent with embodiments of this disclosure, the first angle-of-view associated with image capture device 122 may be broader than the second angle-of-view associated with the typical driver location in vehicle 200. The delta between the broader first angle-of-view and the second angle-of-view is referenced in this disclosure as an extended zone. In some embodiments, the extended zone may include objects located outside the sightline of the typical driver location in vehicle 200, which system 100 may identify. In addition, system 100 may trigger one or more actions (e.g., cause navigational responses) based on a determined change associated with the objects identified in the extended zone.

FIG. 16 illustrates the first example for determining a change associated with one or more objects located outside of the sightline of the typical driver location in vehicle 200. The angular range of FOV 1610 and FOV 1620 is used in FIG. 16 for illustrative purposes. In some embodiments, FOV 1620 may be, for example, about 65 degrees, and FOV 1610 may be, for example, higher than 65 degrees. In other embodiments, FOV 1620 may be, for example, about 135 degrees, and FOV 1610 may be, for example, higher than 150 degrees, higher than 160 degrees, or higher than 170 degrees. In some embodiments, FOV 1610 and FOV 1620 may be measured in an upward direction from the horizon. As shown in FIG. 16, the extended zone may include a traffic lamp fixture 1630 located in a region above vehicle 200. Traffic lamp fixture 1630, which is located outside of the sightline of the typical driver location, displays a red light. In some embodiments, system 100 may be able to detect traffic lights and changes in the displayed color of traffic lights in situations where the driver of vehicle 200 cannot even see the traffic light fixture.

One example of these situations is when a driver of vehicle 200 applies the brakes in a manner that causes vehicle 200 to stop over the stopping line of the intersection and/or positions vehicle 200 too close to traffic light fixture 1360. Another example of these situations is when vehicle 200 reaches the stopping line at an intersection, and traffic lamp fixture 1630 is placed on a high pole so it can be seen from a distance. Because traffic lamp fixture 1630 is located outside FOV 1620, when the light in traffic lamp fixture 1630 changes to green, a driver who sits in the typical driver location would not be able to detect the status change. However, system 100 would be able to detect the status change of the traffic light because traffic lamp fixture 1630 is located within FOV 1610, and thus in view of image capture device 122. Identifying traffic lights located in a region above vehicle 200 may improve safety and driver convenience. For example, when considering the safety of the driver and the passengers of vehicle 200, if traffic lamp fixture 1630 is not inside FOV 1620, it may be unsafe to back up vehicle 200 until traffic lamp fixture 1630 is within FOV 1620. In addition, even if backing up vehicle 200 is not dangerous, it might be inconvenient for the driver to back up vehicle 200. In one embodiment, after determining that the light in traffic lamp fixture 1630 has turned to green, system 100 may cause vehicle 200 to accelerate to cross the intersection.

FIG. 17 illustrates the second example for determining a change associated with the objects located outside of the sightline of the typical driver location in vehicle 200. The angular range of FOV 1710 and FOV 1720 is used in FIG. 17 for illustrative purposes. In some embodiments, FOV 1720 may be, for example, about 180 degrees, and FOV 1710 may be, for example, higher than 200 degrees, higher than 240 degrees, or higher than 300 degrees. As shown in FIG. 17, the extended zone may include a pedestrian 1730 located in a region beside vehicle 200. Pedestrian 1730 may be moving in a certain direction. In some cases, pedestrian 1730 may be located at the edge of FOV 1720, but because the driver is focused on the road ahead, he or she may fail to detect pedestrian 1730. In contrast, system 100 not only has a broader FOV, it does not have to focus on the road ahead and can identify objects located in any region of its FOV. Because pedestrian 213 is located within FOV 1710, system 100 may detect pedestrian 1730 and determine the pedestrian's walking direction trajectory. In other embodiments, system 100 may identify an object located beside vehicle 200, determine the object's moving direction trajectory, determine whether the object is on a possible collision course with vehicle 200, and act accordingly. For example, after determining that pedestrian 1730 is on a possible collision course with vehicle 200, system 100 may control the vehicle's horn to generate a type of audio alarm.

As discussed above, FIGS. 3B-3D illustrate exemplary camera mount 370, which is configured to be positioned behind rearview mirror 310 and against a vehicle windshield. As shown in FIGS. 3B-3D, camera mount 370 may include a plurality of image capture devices (122, 124, and 126). In one embodiment, the combined angle-of-view of image capture devices 122, 124, and 126 forms the first angle-of-view. For example, in order for FOV 1710 to be higher than 300 degrees, a combination of six image capture devices may be used. In a different embodiment, at least one of the image capture devices depicted in FIGS. 3B-3D (e.g., image capture device 122) includes an ultra-wide lens. The ultra-wide lens may enable image capture device 122 to have the first angle-of-view. In some embodiments, the ultra-wide lens may have a focal length shorter than the short side of the image sensor of image capture device 122. Alternatively, the ultra-wide lens may have a focal length shorter than the long side of the image sensor, but longer then the short side of the image sensor. Consistent with an embodiment of the present disclosure, image capture device 122 may be configured to capture images of traffic lights located in a conic section zone of, for example, between 150 to 180 degrees, 150 to 190 degrees, 160 to 180 degrees, or 170 to 180 degrees relative to a location of image capture device 122.

Figure 18:
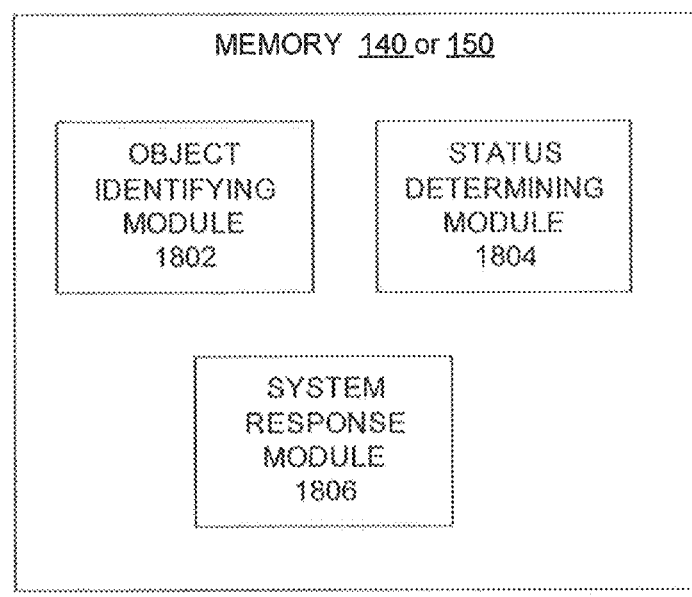
FIG. 18 is a diagrammatic representation of a memory storing instructions to identify objects located outside of a sightline of a typical driver location consistent with the disclosed embodiments.

FIG. 18 is an exemplary block diagram of a memory configured to store instructions for performing one or more operations, consistent with the disclosed embodiments. As shown in FIG. 18, memory 140 or 150 may store an object identifying module 1802, a status determining module 1804, and a system response module 1806. The disclosed embodiments are not limited to any particular configuration of memory 140 or 150. Further, processing unit 110 may execute the instructions stored in any of modules 1802-1806 included in memory 140 or 150.

In one embodiment, object identifying module 1802 may store software instructions (such as computer vision software) which, when executed by processing unit 110, identifies an object located outside of the sightline of the typical driver location in vehicle 200. In one embodiment, processing unit 110 may scan a plurality of images, compare portions of the images to one or more predetermined patterns, and identify a traffic light located in a region above vehicle 200. In another embodiment, processing unit 110 may scan a plurality of images, compare portions of the images to one or more predetermined patterns, and identify an object located in a region beside vehicle 200. In some embodiments, module 1802 may store software instructions, which, when executed by processing unit 110, identifies intersections and determines that a traffic light may be nearby. One way for processing unit 110 to identify an intersection is by using historical image data. For example, processing unit 110 may determine that a traffic light may be nearby even when no traffic light is visible in a current image, but the traffic light was visible in a prior image (e.g., a prior frame, five frames ago, etc.). Additionally or alternatively, processing unit 110 may identify in image data objects indicative of a close intersection. For example, processing unit 110 may determine that a traffic light may be nearby by identifying cross roads in image data of the road ahead. In another example, processing unit 110 may identify in image data the back of other traffic lights regulating traffic going in the opposite direction to the driving direction of vehicle 200. Additionally or alternatively, processing unit 110 may use map data (such as data from map database 160) to identify an intersection. For example, processing unit 110 may consider general road shape descriptions extracted from map database 160 to determine that a traffic light may be nearby.

In another embodiment, module 1802 may store software instructions, which, when executed by processing unit 110, corrects optical distortion in the plurality of images to enable identifying the objects. The optical distortion may be a result of image capture device 122 using an ultra-wide lens. For example, the optical distortion may be a barrel distortion in which the image magnification decreases with distance from the optical axis, and thus the distortion may be most significant close to the edge of the image frame. Consistent with the present disclosure, a plurality of algorithms may be used to correct the optical distortion that may result from using an ultra-wide lens. For example, an algorithm may be used to correct the optical distortion to identify an object close to the edge of the image frame. As another example, a different algorithm may be used to identify the status of an object located at the edge of the image frame. In another embodiment, the image capture device may include a plurality of image capture devices (e.g., image capture devices 122, 124, and 126), and each image capture device may be associated with a different field-of-view. Module 1802 may store software instructions, which, when executed by processing unit 110, correctly combines images retrieved from the plurality of image capture devices. For example, even when there may be some overlap in the field-of-view of two image capture devices, different parts of an object may be captured by the different image capture devices. Accordingly, object identifying module 1802 may include instructions for identifying objects in regions that span adjoining images captured by different image capture devices.

In one embodiment, status determining module 1804 may store software instructions which, when executed by processing unit 110, determines a status of an object identified in the image data, and located at least in part within an extended zone. Consistent with the present disclosure, the extended zone includes the region between the field-of-view of an image capture device (e.g., FOV 1610 and 1710) and the field-of-view of a typical driver location in vehicle 200 (e.g., FOV 1620 and 1720). In one embodiment, status determining module 1804 may store software instructions, which, when executed by processing unit 110, determines the status of a traffic light located in a region above vehicle 200. For example, processing unit 110 may determine the status of a traffic light by comparing one or more images to stored patterns. In addition, a change in the status of the traffic light may be determined based on the differences from between the stored patterns and two or more images taken at different times. In another embodiment, status determining module 1804 may store software instructions, which, when executed by processing unit 110, determines the trajectory of moving objects located in a region beside vehicle 200. For example, processing unit 110 may determine the trajectory of the moving objects by comparing a plurality of images to each other. In addition, processing unit 110 may determine whether the moving object is on a possible collision course with vehicle 200.

In one embodiment, system response module 1806 may store software instructions which, when executed by processing unit 110, causes one or more responses in vehicle 200. One type of system response may include navigational responses, as described above in detail with reference to navigational response module 408. Other types of system responses may involve control throttling system 220, braking system 230, and/or steering system 240. For example, processing unit 110 may transmit electronic signals that cause system 100 to physically depress the brake by a predetermined amount or ease partially off the accelerator of vehicle 200. Further, processing unit 110 may transmit electronic signals that cause system 100 to steer vehicle 200 in a particular direction. Such responses may be based on the determination of the relevant traffic light. Additional system responses may include providing various notifications (e.g., warnings and/or alerts). The notifications may include reporting the status of the traffic light located above vehicle 200, reporting a change in status of the traffic light located above vehicle 200, reporting an existence of an object beside a vehicle, and reporting that the object is on a collision course with vehicle 200.

Figure 19:
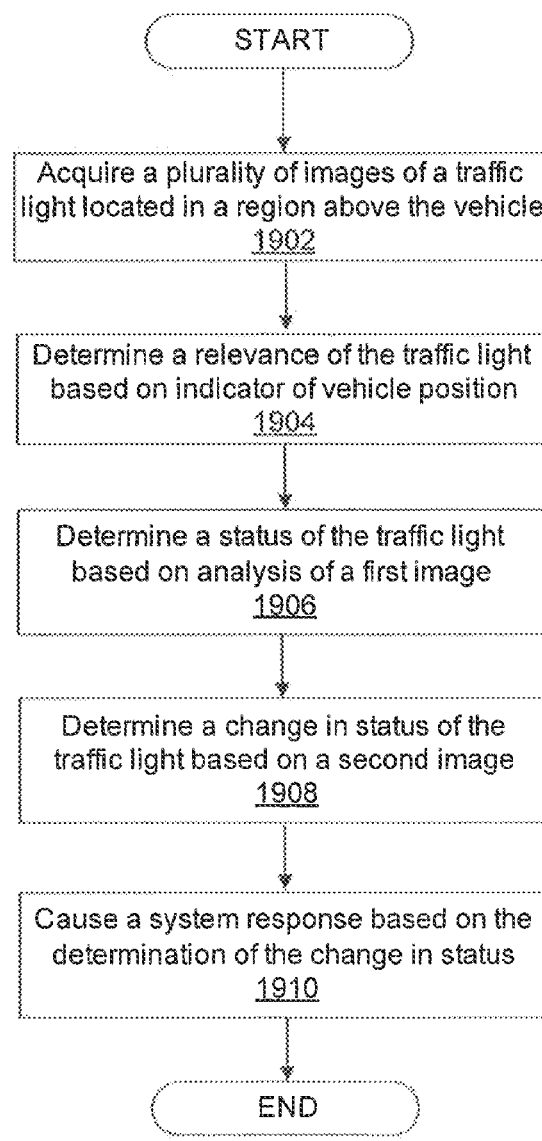
FIG. 19 is a flowchart showing an exemplary process for identifying objects located outside of a sightline of a typical driver location consistent with the disclosed embodiments.

FIG. 19 is a flowchart showing an exemplary process 1900 for navigating a vehicle based on a change in status of a traffic light located in a region above vehicle 200, as depicted in FIG. 16. A similar process is contemplated for controlling a vehicle based on the trajectory of moving objects located in a region beside vehicle 200, as depicted in FIG. 17. Accordingly, exemplary process 1900 may be applied to a variety of situations, including the situation depicted in FIG. 17.

As shown in FIG. 19, at step 1902, image capture device 122 may acquire a plurality of images of a traffic light located in a region above vehicle 200, outside of the sightline of a typical driver location. At step 1904, processing unit 110 may determine the relevancy of the traffic light captured in the plurality of images based on at least one indicator of the vehicle position, for example, lane markers. In some embodiments, this step may be optional and omitted. At step 1906, processing unit 110 may determine the status of the traffic light based on an analysis of at least a first image from among the plurality of images. At step 1908, processing unit 110 may determine a change in the status of the traffic light based on at least a second image from among the plurality of images. For example, the change in the status of the traffic light may be from a red light to a green light. After determining that the status of a traffic light has changed, at step 1910, processing unit 110 may cause a system response based on the determined change in status. These steps of process 1900 are discussed in further detail below.

At step 1902, image capture device 122 may acquire a plurality of images of a traffic light located in a region above vehicle 200. Consistent with disclosed embodiments, image capture device 122 may include one or more image capture devices. Consistent with some embodiments, the traffic light may be located outside of a sightline of a typical driver location in vehicle 200. For example, the traffic light may be located in the extended zone as described with reference to FIG. 16. In some embodiments, image capture device 122 may be located within vehicle 200. In addition, although in some embodiments image capture device 122 may be located behind a rearview mirror and against a vehicle windshield, processing unit 110 may determine the status of the traffic light through the windshield.

At step 1904, processing unit 110 may determine the relevancy of the traffic light located in the region above vehicle 200 based on at least one indicator of vehicle position. A detailed disclosure of how system 100 may determine the relevancy of traffic lights is provided below in connection with FIGS. 20-23. In some embodiments, the indicator of vehicle position may be derived from analyzing the plurality of images. For example, processing unit 110 may determine the relative position of the traffic light to vehicle 200, based on identification of a lane marker in the plurality of images. Additionally or alternatively, the indicator of vehicle position may be derived from geographic position data retrieved from position sensor 130. For example, processing unit 110 may determine the relative position of the traffic light to vehicle 200, based on GPS signals or local positioning signals. In some embodiments, processing unit 110 may compare the GPS acquired vehicle location to map data to determine the relevance of the traffic light. For example, processing unit 110 may conduct an analysis using information derived from image data and the map data. Using the derived information, processing unit 110 may determine a correspondence between the detected traffic light located in the region above vehicle 200 and the lane vehicle 200 is currently driving.

At step 1906, processing unit 110 may determine the status of the traffic light based on an analysis of at least a first image from among the plurality of images. In some embodiments, the status of the traffic light located in the region above vehicle 200 is associated with the color the traffic light indicates. For example, a steady green light may indicate that vehicle 200 can continue after yielding to other vehicles, bicycles, or pedestrians in the road; a flashing yellow light is a warning and may indicate that vehicle 200 should proceed with caution; and a steady red light may indicate that vehicle 200 needs to stop. Additionally or alternatively, the status of the traffic light may also include additional information associated with the traffic light. The additional information may be the type of the traffic light. For example, the traffic light located in the region above vehicle 200 may be a pedestrian crossing signal. Accordingly, processing unit 110 may determine that pedestrians may cross the road in front of vehicle 200. In some embodiments, in order to determine the status of the traffic light located in the region above vehicle 200, processing device 110 may correct optical distortion in the at least a first image. The optical distortion may occur when image capture device 122 includes an ultra-wide lens.

At step 1908, processing unit 110 may determine a change in status of the traffic light based on at least a second image from among the plurality of images. In some embodiments, the status of the traffic light located in the region above vehicle 200 may change, for example, from a red light to a green light. In one embodiment, the at least second image may include two or more images subsequent to the at least a first image. In addition, processing unit 110 may process only a portion of the at least a second image. For example, when vehicle 200 is not moving the position of the traffic light in the frame remains the same. Accordingly, in some embodiments, upon identifying the portion of the frame that includes the traffic lamp fixture in the at least a first image, processing unit 110 may determine the change in status by processing only the same portion of the frame in the at least a second image. For example, in some embodiments, by processing only the portion of the frame that includes the traffic lamp fixture, processing unit 110 may save processing power.

At step 1910, processing unit 110 may cause a system response based on the determined change in status. In some embodiments, processing unit 110 may cause one or more system responses (e.g., two or more responses), including responses of different types. One type of system response may include providing various notifications (e.g., warnings and/or alerts) to the driver of vehicle 200. The notifications may be provided via speakers 360 or via a touch screen 320. For example, the system response may include reporting the change in status to the driver of vehicle 200. Another type of system response may include navigational responses, the navigational responses may include, for example, accelerating to a driver-specified cruise speed.

Identifying Relevant Traffic Lights

In some embodiments, system 100 may distinguish between relevant and irrelevant (or less relevant) traffic lights. During a typical driving session, vehicle 200 may cross one or more junctions, such as intersections, having multiple traffic lights. For example, one or more of the traffic lights at an intersection may regulate traffic traveling toward the intersection in a particular direction. Accordingly, one or more traffic lights may regulate whether vehicle 200 may continue to travel through the intersection or whether vehicle 200 must stop at the intersection. However, in addition to the traffic lights that regulate the lane in which vehicle 200 is traveling, other traffic lights that regulate traffic in other lanes may be visible to vehicle 200. Navigating vehicle 200 according to any of the traffic lights that regulate lanes other than the lane in which vehicle 200 is traveling may result in navigational responses undesirable or inapplicable to the intended route of vehicle 20. Accordingly, to enable autonomous control of vehicle 200 in a manner appropriate to the intended navigational path of vehicle 200, system 100 may identify which of a plurality of traffic lights is regulating traffic in the lane in which vehicle 200 is traveling while disregarding (or placing less emphasis on) other traffic lights that regulate other lanes of traffic. Further, after system 100 identifies a relevant traffic light, system 100 may identify a status of the traffic light (e.g., red, yellow, green) and implement an appropriate navigational response. For example, system 100 may discontinue cruise control and apply the brakes when a red light is recognized that regulates the lane in which vehicle 200 is traveling or when a yellow light is recognized that regulates the lane in which vehicle 200 is traveling and vehicle 200 is beyond a predetermined distance of a junction.

Figure 20:
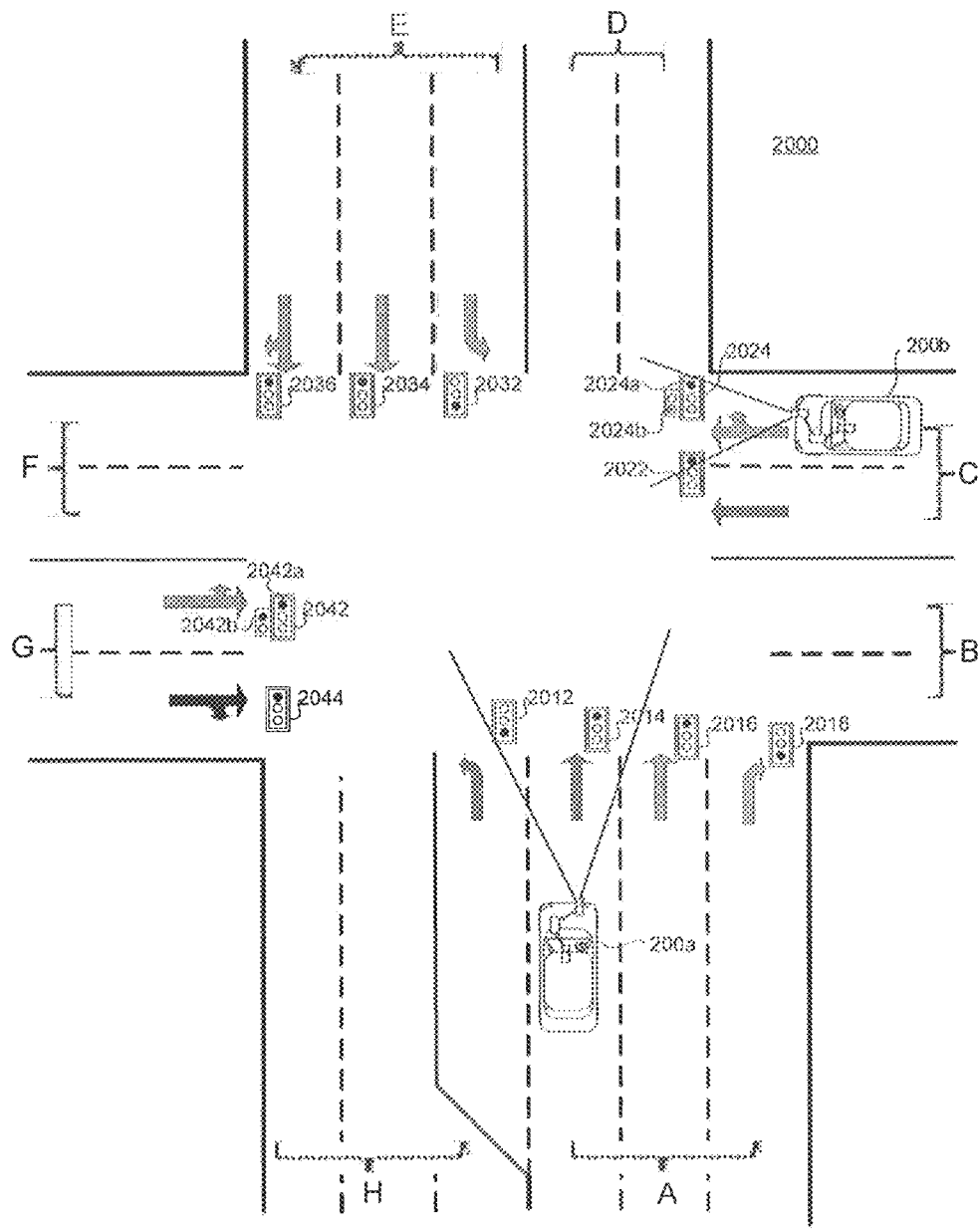
FIG. 20 is a diagrammatic representation of two exemplary vehicles approaching an intersection with a plurality of traffic lights consistent with the disclosed embodiments.
Figure 21:
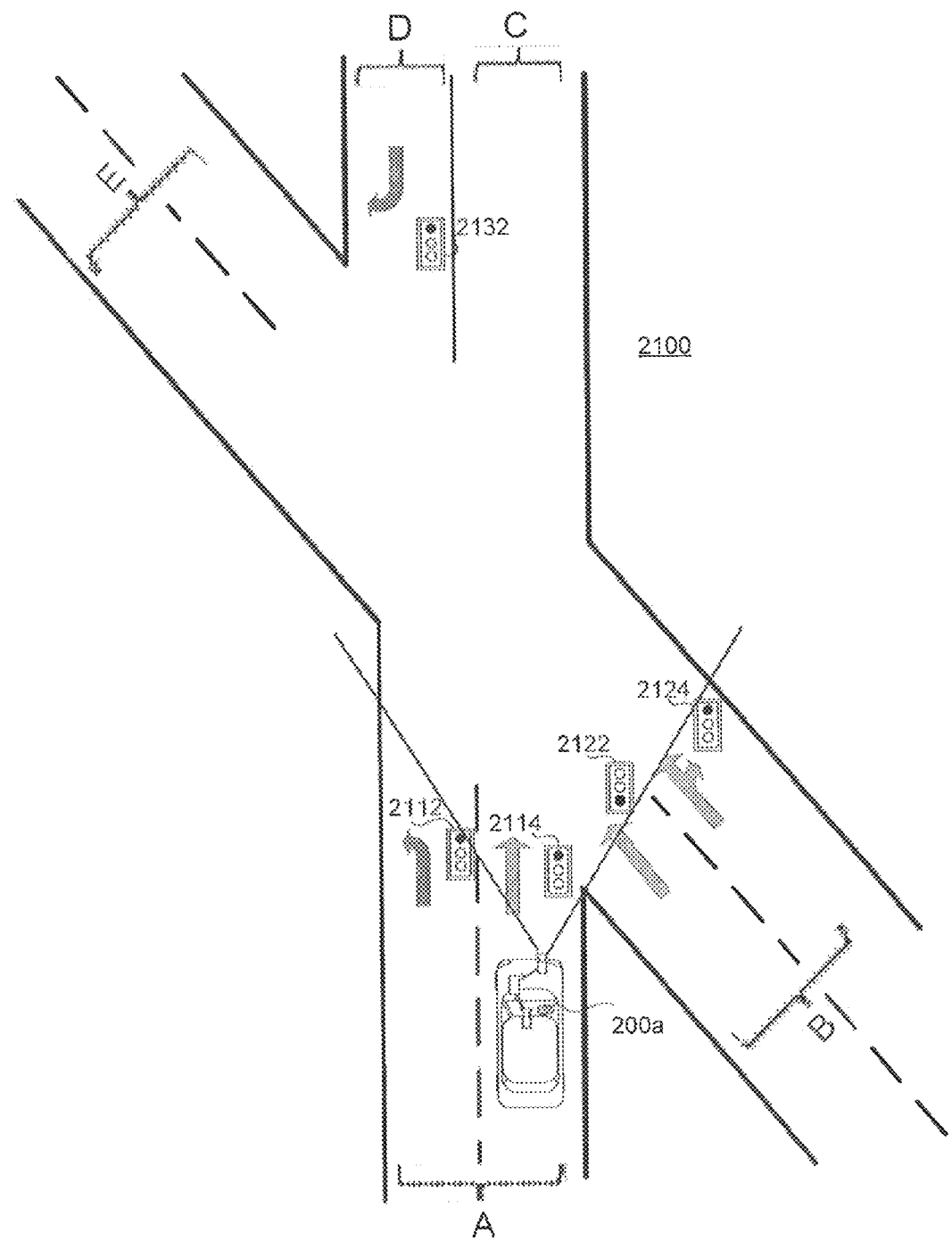
FIG. 21 is a diagrammatic representation of an exemplary vehicle approaching an intersection with a plurality of traffic lights consistent with the disclosed embodiments.

Distinguishing between relevant and irrelevant (or less relevant) traffic lights on a road may be complex. FIG. 20 and FIG. 21 illustrate examples of situations where driving based on information derived from an inapplicable traffic light may be undesirable. In FIG. 20, vehicle 200a is traveling on a multilane road. Each lane of the road is associated with a different traffic lamp fixture. Vehicle 200a is approaching an intersection and is traveling in a lane designated for proceeding through the intersection and to the other side of the intersection. Also shown in FIG. 20, vehicle 200b is traveling in a lane that allows traffic to continue to travel straight and through the intersection or that allows traffic to make a right turn. The traffic lamp fixture associated with the lane in which vehicle 200b is traveling includes a right-turn traffic light. As another example, in FIG. 21, vehicle 200a reaches a junction of non-perpendicular roads. Multiple traffic lamp fixtures (e.g., traffic lamp fixtures 2122 and 2124), including some that do not regulate the lane in which vehicle 200a is traveling, may be visible to vehicle 200a due to the orientation of the junction.

Returning to FIG. 20, an intersection 2000 is shown that has the following driving options: road A has lanes leading to roads B, D, and F; road C has lanes leading to roads D and F; road E has lanes leading to roads F, H, and B; and road G has lanes leading to roads H, B, and D. Road A is associated with four traffic lamp fixtures 2012, 2014, 2016, and 2018. In the situation shown, each traffic lamp fixture regulates a different lane. Road C is associated with two traffic lamp fixtures 2022 and 2024. Traffic lamp fixture 2024 includes a traffic light 2024a for continuing straight and a traffic light 2024b for right turns (e.g., displaying a green arrow when a right turn is authorized). Road E is associated with three traffic lamp fixtures 2032, 2034, and 2036. And road G is associated with two traffic lamp fixtures 2042 and 2044. Traffic lamp fixture 2042 includes a traffic light 2042a for continuing straight and a traffic light 2042b for left turns. In the situation illustrated in FIG. 20, traffic light 2024b and traffic lamp fixtures 2012, 2018, and 2032 display green lights while all the other traffic lamp fixtures display red lights. Of course, many other road variations and relative traffic light configurations may exist in addition to those shown in FIG. 20.

In the situation illustrated in FIG. 20, vehicle 200a is located on road A in a lane that continues straight through intersection 2000 to road D. However, the field-of-view of an image capture device included in vehicle 200a may include both traffic lamp fixtures 2012 and traffic lamp fixture 2014 (or even additional fixtures). Vehicle 200a arrived at intersection 2000 when both traffic lamp fixtures 2012 and 2014 displayed red lights, and only recently the light in traffic lamp fixture 2012 has turned green. In this situation, it is important that the traffic light detection system 100 of vehicle 200a recognizes that the green light of fixture 2012 is not applicable to vehicle 200a. Rather, system 100 should base any determined navigational response on the status of the lamp associated with the more relevant fixture 2014.

In another aspect of the situation illustrated in FIG. 20, vehicle 200b is located on road C in a lane that continues straight through intersection 2000 to road F, and that lane also allows traffic to make a right turn to road D. Vehicle 200b faces traffic lamp fixture 2024 that includes a traffic light 2024a for continuing straight and a traffic light 2024b for right turns. Vehicle 200b arrived at intersection 2000 when traffic lamp fixture 2024 displayed red lights for continuing straight (traffic light 2024a) and for right turns (traffic light 2024b), and only recently traffic light 2024b has turned green. This means that the current status of traffic lamp fixture 2024 prohibits traffic from driving straight and turning right. An undesirable situation might occur if vehicle 200b acts on the status of light 2024b without recognizing and accounting for the status of light 2024a. For example, if vehicle 200b drives to road F (i.e., drives straight) based on the information of traffic light 2024b (showing a green light), vehicles driving from road E to road B may create a hazard for vehicle 200b.

Turning to FIG. 21, FIG. 21 illustrates an intersection 2100 with non-perpendicular roads that has the following driving options: road A has two lanes, one lane leading to road C and the other lane leading to road E; road B has two lanes leading to road C, and one lane that can also lead to road E; and road D has a single lane leading to road E. Road A is associated with two traffic lamp fixtures 2112 and 211, and each traffic lamp fixture regulates a different lane. Road B is also associated with two traffic lamp fixtures 2122 and 2124, and each regulates a different lane. Road D is associated with a single traffic lamp fixture 2132. In the situation illustrated in FIG. 21, traffic lamp fixture 2122 displays a green light, while all the other traffic lamp fixtures display red lights. As shown in FIG. 21, vehicle 200*a* is located on road A in a lane that continues straight through intersection 2000 to road C. However, the field-of-view of image capture device 122 included in vehicle 200*a* may include both traffic lamp fixture 2114 and traffic lamp fixture 2122. In this example, vehicle 200*a* has arrived at intersection 2100 when both traffic lamp fixtures 2114 and 2122 were red, and only recently the light in traffic lamp fixture 2122 has turned green. In such a situation, it may be important that vehicle 200*a* determines its navigational response based on the status of traffic fixture 2114, rather than on the status of traffic fixture 2122.

The three situations depicted in FIGS. 20 and 21 provide just a few examples of road situations in which it may be helpful to have a driver assistance system that can distinguish between relevant and irrelevant traffic lamp fixtures, to determine the status of the traffic lights included in the relevant traffic lamp fixture(s), and to generate and take an appropriate navigational response based on the status. Further, these examples demonstrate that the system may need to evaluate multiple traffic lamp fixtures that may face a vehicle in order to identify the traffic lamp fixture that is most applicable to the lane in which the vehicle is traveling or to the intended travel direction of the vehicle (especially where, for example, multiple traffic lights or traffic lamp fixtures may be associated with a single lane in which the vehicle is traveling).

As discussed above, system 100 may distinguish between relevant and irrelevant traffic lamp fixtures, determine the status of the traffic lights included in the relevant traffic lamp fixture(s), and generate and take an appropriate navigational response based on the status in various driving scenarios. For example, as vehicle 200 approaches an intersection, system 100 may determine which traffic light is relevant, determine a status of that traffic light, and find any other relevant information in images captured by one or more of image capture devices 122-126. If the traffic light is red, system 100 may cause vehicle 200 to apply its brakes. If the traffic light is green, system 100 may cause vehicle 200 to continue. If the traffic light is yellow, system 100 may determine a distance to the intersection and/or an estimate time to the intersection based on analysis of images, the speed of vehicle 200, and/or positional data (e.g., GPS data). If vehicle 200 is within a predetermined time (e.g., five seconds, ten seconds, etc.) and/or distance (e.g., one meter, five meters, ten meters, etc.) threshold, system 100 may cause vehicle 200 to continue. If vehicle 200 is not within the predetermined time threshold and/or distance threshold, system 100 may cause vehicle 200 to stop before reaching the intersection. As another example, when vehicle 200 is stopped at a traffic light, after the traffic light changes its status from red to green, system 100 may cause a navigational response that includes applying the accelerator, releasing the brakes, and steering through an intersection, for example.

Figure 22:
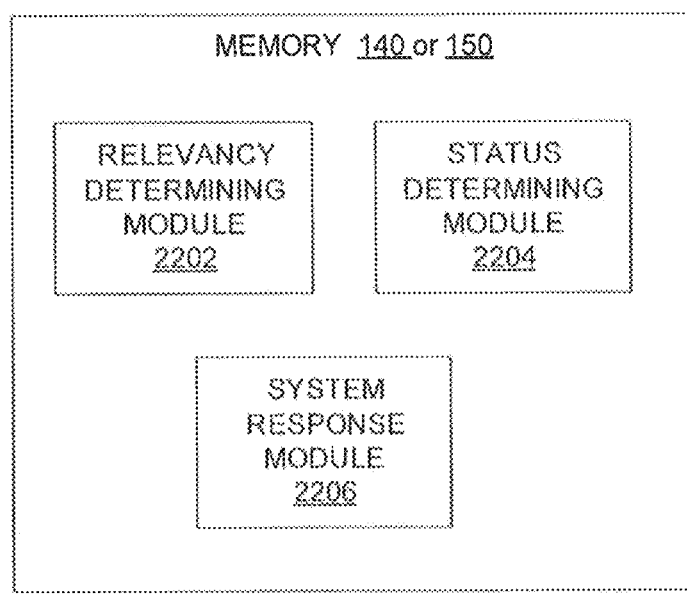
FIG. 22 is a diagrammatic representation of a memory storing instructions for detecting traffic lights consistent with the disclosed embodiments.

FIG. 22 is an exemplary block diagram of a memory 140/150 configured to store instructions for performing one or more operations, consistent with the disclosed embodiments. Memory 140/150 may be accessed by processing unit 110. As discussed above, processing unit 110 may include various devices, such as a controller, an image preprocessor, a central processing unit (CPU), support circuits, digital signal processors, integrated circuits, memory, or any other types of devices for image processing and analysis. Accordingly, memory 140/150 may be accessed by processing unit 110, may be integrated with processing unit 110, or many included in an embedded system together with processing unit 110. As shown in FIG. 22, memory 140 or 150 may store a relevancy determining module 2202, a status determining module 2204, and a system response module 2206. The disclosed embodiments are not limited to any particular configuration of memory 140. Further, processing unit 110 may execute the instructions stored in any of modules 2202-2206 included in memory 140 or 150.

In one embodiment, relevancy determining module 2202 may store software instructions (such as computer vision software) which, when executed by processing unit 110, determines a relevance of each of the plurality of traffic lamp fixtures to vehicle 200. For purposes of this disclosure, determining the relevancy of traffic lamp fixtures may include executing one or more assessments. In one embodiment, processing unit 110 may assess the orientation of each of a plurality of traffic lamp fixtures with respect to the vehicle. For example, in the situation illustrated in FIG. 21 the field-of-view of image capture device 122 includes both traffic lamp fixture 2114 and traffic lamp fixture 2122. However, the orientation of traffic lamp fixture 2114 suggests that traffic lamp fixture 2114 is more relevant to vehicle 200*a* than fixture 2122.

Other assessments may be applicable to the decision making process. For example, processing unit 110 may assess the distance of each of the plurality of traffic lamp fixtures with respect to the vehicle. Additionally or alternatively, processing unit 110 may assess which traffic lamp is facing a front portion of vehicle 200. Additionally or alternatively, processing unit 110 may use the identified lane markers to divide the area forward of vehicle 200 to a plurality of zones, associate each identified traffic lamp fixture with a zone, and assess which zone is the most relevant for vehicle 200. Additionally or alternatively, processing unit 110 may compare a vehicle location that was acquired via GPS to map data to determine the relevance of the traffic light. For example, vehicle 200 may access map data that includes information about the possible driving options at a number of locations. By using the GPS acquired vehicle location, processing unit 110 may determine which driving options are available to vehicle 200 approaching a junction, and use this information to determine the relevance of the traffic lights at the junction to vehicle 200.

In one embodiment, status determining module 2204 may store software instructions which, when executed by processing unit 110, determine a status of a traffic light included in at least one traffic lamp determined to be relevant to the vehicle. As described above, the status of the traffic light may be also associated with the information the traffic light provides. In a typical traffic light, the color being displayed and the relative location of the illuminated traffic light may provide basic information relevant to vehicle 200.

Status determining module 2204 may derive additional information from the environment of the relevant traffic lamp fixture and from non-typical traffic light included in the relevant traffic lamp fixture. For example, the relevant traffic lamp fixture may have in its proximity a sign that includes relevant text, e.g., a sign stating specific days and hours. Accordingly, in some embodiments, status determining module 2204 may derive information from the text included in signs associated with the relevant traffic fixture. For example, status determining module 2204 may implement optical character recognition techniques to recognize text in the signs. Status determining module 2204 may then compare the recognized text to a database to determine the information provided by the sign. As another example, the relevant traffic lamp fixture may include a pedestrian crossing signal. Status determining module 2204 may determine that the status of the pedestrian crossing signal means that pedestrians may cross the road in front of vehicle 200, while vehicle 200 has a green light to turn right.

In one embodiment, system response module 2206 may store software instructions (such as computer vision software) which, when executed by processing unit 110, causes one or more responses in vehicle 200. One type of system response may include one or more navigational responses, as described above in detail with reference to navigational response module 408. Other types of system responses may provide control signals to throttling system 220, braking system 230, and/or steering system 240. For example, processing unit 110 may transmit electronic signals that cause system 100 to physically apply the brakes by a predetermined amount or ease partially off the accelerator of vehicle 200. Further, processing unit 110 may transmit electronic signals that cause system 100 to steer vehicle 200 in a particular direction. Such responses may be based on the determination of the relevant traffic light. Further, if pedestrians may cross the road in front of vehicle 200, then the system responses may include executing additional processing of the image data. For example, processing unit 110 may confirm that a pedestrian in the proximity of vehicle 200 is not walking in a trajectory that would place the pedestrian in danger while vehicle 200 is moving.

The location of the traffic lamp fixtures in a junction can be before, after, or in the middle of the junction. Identifying the position of each traffic light fixture in the junction may be used, for example, to determine the relevancy of the traffic lamp fixtures. In some embodiments, processing unit 110 may estimate the distance of one or more traffic lamp fixtures with respect to vehicle 200 to create a 3D model of a junction. In one embodiment, the 3D model of the junction may be stored for future usage. The 3D model of the junction may include one or more of the following: a 3D position for one or more traffic light fixtures, the relative distance between each traffic light fixture and other traffic light fixtures in the junction, the direction(s) each traffic light fixture refers to, and the relative distance between each traffic light fixture and the stop line of the junction. In addition, the 3D model may be periodically updated using details recognizable when vehicle 200 approaches the junction. Examples of the recognizable details may include arrows in traffic lights, the lane marking in the junction, etc. In one example, when time vehicle 200 passes the junction, recognized details are compared to the information stored in the 3D model, and if appropriate, the 3D model is updated.

Consistent with embodiments of the present disclosure, the 3D model may be used to determine the relevancy of one or more traffic lamp fixtures. In order to activate braking system 230 with sufficient time to stop vehicle 200 before the junction, system 100 may determine which traffic light is relevant to vehicle 200 at a distance of about eighty meters from the junction. As vehicle 200 approaches a junction, information derived from the captured images may be compared to the 3D model to find a match. For example, processing unit 110 may compare the relative distance between recognized traffic light fixtures in the junction to the 3D model to determine the relevancy of one or more traffic light fixtures. Using the 3D model, processing unit 110 may identify a relevant traffic light when vehicle 200 is more than 50 meters, 75 meters, 100 meters, or 125 meters from the junction. As another example, processing unit 110 may compare the relative distance between recognized traffic light fixtures in the junction to the 3D model to determine the distance to the junction's stop line, even when the stop line is not visible from the current location of vehicle 200. Using the 3D model, processing unit 110 may determine the distance to the junction's stop line when vehicle 200 is more than 50 meters, 75 meters, 100 meters, or 125 meters from the junction. Further details regarding relevancy determining module 2202, a status determining module 2204, and a system response module 2206 are provided below in connection with the discussion of FIG. 23.

Figure 23:
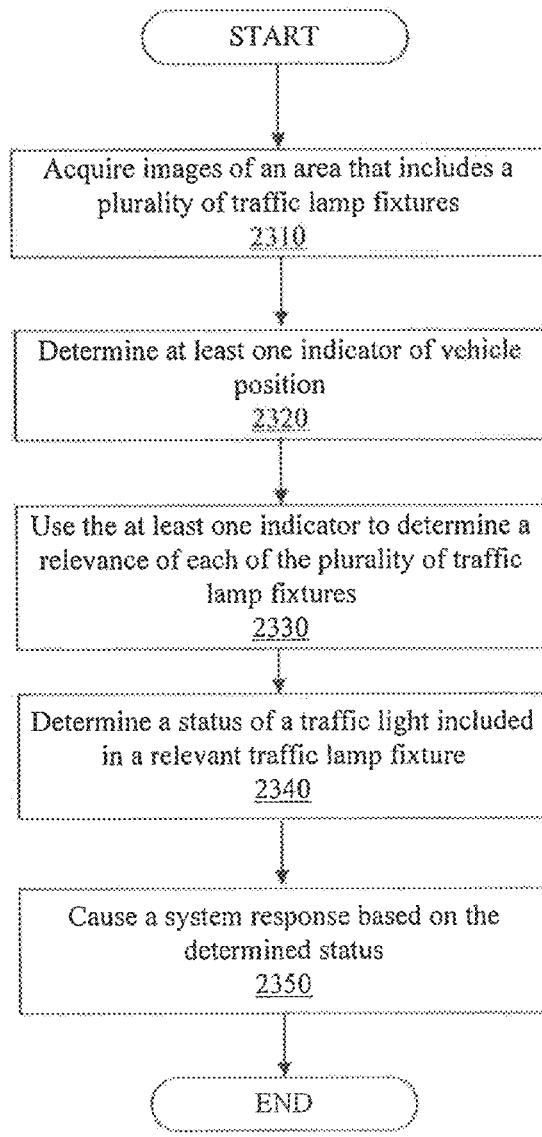
FIG. 23 is a flowchart showing an exemplary process for detecting traffic lights consistent with the disclosed embodiments.

FIG. 23 is a flowchart showing an exemplary process 2300 for identifying relevant traffic lights, consistent with disclosed embodiments. System 100 may implement process 2300 to address the situations depicted in, for example, FIGS. 20 and 21.

As illustrated in FIG. 23, at step 2310, image capture device 122 may acquire images of an area forward of vehicle 200. The area may include a plurality of traffic lamp fixtures, each including at least one traffic light. At step 2320, processing unit 110 may determine at least one indicator of vehicle position, for example, based on identified features from the acquired images (e.g., lane markers). At step 2330, processing unit 110 may use the at least one indicator to determine a relevance of each of the plurality of traffic lamp fixtures. At step 2340, processing unit 110 may determine a status of a traffic light included in a relevant traffic lamp fixture. For example, the status of the traffic light may indicate that vehicle 200 should stop (e.g., due to a red light) or can turn left (if there are no crossing pedestrians). After determining the status of a traffic light included in a relevant traffic lamp fixture, at step 2350, processing unit 110 may cause a system response based on the determined status. These steps of process 2300 are discussed in further detail below.

For example, at step 2310, image capture device 122 may acquire at least one image of an area forward of vehicle 200. An "area forward of the vehicle" includes any geographical region located in front of a vehicle, relative to its moving direction. The region may include a junction (for example intersections 2000 in FIGS. 20 and 2100 in FIG. 21), an intersection, a crossroad, a traffic circle, a street, a road, etc. In some cases, the area may include a plurality of traffic lamp fixtures each including at least one traffic light. A "traffic lamp fixture" includes any form of structure housing one or more light-producing devices used to regulate traffic and/or to provide road-related information. In some cases, two or more traffic lamp fixtures may be joined in a single traffic lamp assembly, but each traffic lamp fixture may be associated with a different lane. A typical traffic lamp fixture may include three circular traffic lights: a green traffic light, a yellow traffic light, and a red traffic light. A "traffic light" includes a device having at least one light source capable of displaying a distinctive color. In some cases, vehicle 200 may encounter a non-typical traffic lamp fixture. A non-typical traffic lamp fixture may include one or more non-circular traffic lights having different colors. For example, a right-turn arrow traffic light, a left-turn arrow traffic light, a public transportation traffic light, a pedestrian crossing traffic light, a bicycle crossing traffic light, etc.

In some embodiments, processing unit 110 may receive the at least one acquired image via data interface 128. As discussed in detail with reference to FIG. 5D, processing unit 110 may identify traffic lights in the at least one acquired image. For example, processing unit 110 may filter objects identified in the at least one acquired image to construct a set of candidate objects, excluding those objects unlikely to correspond to traffic lights. The filtering may be done based on various properties associated with traffic lights, such as shape, dimensions, texture, position (e.g., relative to vehicle 200), and the like. In addition, processing unit 110 may analyze the geometry of the area forward of vehicle 200. The analysis may be based on any combination of: (i) the number of lanes detected on either side of vehicle 200, (ii) markings (such as arrow marks) detected on the road, and (iii) descriptions of the area extracted from map data. For example, if lane markings defining a lane of travel are recognized on a road, and a traffic light fixture is within the boundaries of the lane markings, system 100 may conclude that the traffic light fixture is associated with the lane associated with the lane markings.

At step 2320, processing unit 110 may determine at least one indicator of vehicle position from the images. An "indicator of vehicle position" includes any form of information related to the physical location of a vehicle. The indicator of vehicle position may be derived from analyzing the image data (e.g., the at least one acquired image). Additionally, the indicator of vehicle position may be derived from geographic position data (e.g., GPS signals, local positioning signals, and/or map data) or from data indicative of the position of vehicle 200 relative to other vehicles on the road. In some embodiments, the indicator of vehicle position may include the distance to at least one traffic lamp fixture derived from the at least one image. In other embodiments, the at least one indicator of vehicle position may include a lane marker recognized based on analysis of the at least one image. For example, processing unit 110 may conduct an analysis using information derived from the at least one image to identify one or more lane markers. Using the identified lane markers, processing unit 110 may determine a correspondence between the detected traffic lights and the lane vehicle 200 is currently driving.

At step 2330, processing unit 110 (e.g., via relevancy determining module 2202) may use the at least one indicator of the vehicle position, as determined at step 2320, to determine the relevancy of each of the plurality of traffic lamp fixtures to vehicle 200. In some embodiments, processing unit 110 may rank the relevancy of the traffic lamp fixtures identified in the at least one acquired image. The traffic lamp fixture having the highest value of relevancy ranking may be determined to be the relevant traffic lamp fixture. For example, in the situation illustrated in FIG. 20 the field-of-view of image capture device 122 includes both traffic lamp fixture 2012 and traffic lamp fixture 2014, but by using one or more assessments, processing unit 110 may determine that traffic lamp fixture 2014 has a higher relevancy ranking value. One way for processing unit 110 to determine that traffic lamp fixture 2014 has a higher relevancy ranking than traffic lamp fixture 2012 is by assessing the distance of each of the plurality of traffic lamp fixtures with respect to vehicle 200a. For example, in the situation depicted in FIG. 20, traffic lamp fixture 2014 is closer than traffic lamp fixture 2012. Thus, traffic lamp fixture 2014 is more likely to be relevant than traffic lamp fixture 2012. Other ways to determine relevancy are described above in reference to relevancy determining module 2202.

In some embodiments, the relevancy determination of each of the plurality of traffic lamp fixtures to vehicle 200 may include a preliminary examination to eliminate improbable traffic lamp fixtures. For example, when the at least one acquired image includes three close traffic lamp fixtures and two distant traffic lamp fixtures, the two distant traffic lamp fixtures may be classified as improbable to be relevant to vehicle 200. By eliminating improbable traffic lamp fixtures and ranking the relevancy of a subject of the traffic lamp fixtures identified in the at least one acquired image, processing unit 110 may save processing power. In some embodiments, the relevancy ranking may change when vehicle 200 approaches the junction. For instance, the orientation of the traffic lamp fixture may change from different points on the road, thus, the distance to the junction may impact the probability that a given traffic lamp fixture is relevant to vehicle 200. Accordingly, the relevancy ranking may be associated with a confidence level, which may take into account factors, such as distance to a junction, when assessing traffic lamp fixtures. Further, processing unit 110 may periodically or constantly update the relevancy ranking of the traffic lamp fixtures when the confidence level is below a certain predetermined threshold.

Relevancy determining module 2202 may further use navigation information previously stored within system 100, such as within memory 140/150, in order to determine a traffic light relevant to vehicle 200. Based on a determined 3D position of vehicle 200 and/or image capture devices 122-126 as discussed above, relevancy determining module 2202 may perform a registration between navigational map data and vehicle 200. Based on the determination of relative distance measurements as described above, relevancy determining module 2202 may use the navigational map data to determine the point in 3D space at which vehicle 200 (via braking system 230) should brake in order to stop at each detected traffic light fixture at the junction. According to the 3D registration result, relevancy determining module 2202 may determine a lane assignment for each traffic light detected at the intersection using the navigational map data. Relevancy determining module 2202 may then determine the lane assignments within system 100 and image processor 190, then perform the registration.

At step 2340, processing unit 110 (e.g., via status determining module 2204) may determine, based on the at least one acquired image, a status of a traffic light included in at least one traffic lamp fixture determined to be relevant to vehicle 200. In some cases, the relevant traffic lamp fixture may include a plurality of illuminated traffic lights, and the status of each traffic light may depend on the type of the traffic light. In one embodiment, the status of a traffic light means simply the color it indicates, e.g., green, yellow, and red. System 100 may identify the status of a traffic light using a variety of techniques. For example, system 100 may identify an area of one or more images that include a traffic light and perform an analysis of the pixels in the area to determine the colors of the pixels. After analyzing at least a threshold number of pixels (e.g., two pixels, ten pixels, twenty pixels, etc.) in the area, system 100 may, for example, determine the color of the traffic light by finding an average value of the pixels in the area.

Additionally or alternatively, the status of the traffic light may include the direction the traffic light refers to. In a typical traffic light, a green color indicates that vehicle 200 is allowed to proceed. However, sometimes this information by itself is insufficient to decide whether it is safe to drive in a certain direction, such as when a green light only authorizes a turn. One way to determine which direction the traffic light refers to includes accessing a database that correlates each traffic light with one or more directions. Another way includes identifying, from the image data, the type of the traffic light and determining from the contextual situation the direction the traffic light refers to. For example, in the second situation depicted in FIG. 20 relative to vehicle 200b, traffic lamp fixture 2024 may be determined as the relevant traffic fixture, but traffic lamp fixture 2024 includes two illuminated traffic lights 2024a and 2024b. Accordingly, in step 2340, processing unit 110 may determine that the status of traffic light 2024a is a red light for continuing straight, and the status of traffic light 2024b is a green light for turning right. In some embodiments, the determination of the status of the traffic light includes one or more of determining a location of the traffic light within a relevant traffic lamp, determining whether the traffic light is illuminated, determining a color of the traffic light, and determining whether the traffic light includes an arrow.

At step 2350, processing unit 110 (e.g., via system response module 2206) may cause a system response based on the determined status. In some embodiments, processing unit 110 may cause one or more system responses (e.g., two or more responses), including responses of different types. One type of system response may include navigational responses, the navigational response may include, for example, starting to drive, a change in acceleration, a change in velocity, applying vehicle brakes, discontinuing cruise control, and the like. For example, these system responses may include providing control signals to one or more of throttling system 220, braking system 230, and steering system 240 to navigate vehicle 200. Another type of system response may include initiating a timer and/or incrementing a counter in order to provide statistical information about one or more driving sessions to the driver of vehicle 200. For example, the statistical information may indicate how many times vehicle 200 has encountered red lights in a driving session, and/or the duration of a driving session that vehicle 200 spent waiting at red lights. Another type of system response may include providing various notifications (e.g., warnings and/or alerts) to the driver of vehicle 200. The warnings and/or alerts may include, for example, announcing the color of a relevant traffic light and/or a distance to a junction. The notifications may be provided via speakers 360 or via an associated display (e.g., touch screen 320).

Turn Lane Traffic Light Detection

System 100 may detect that a vehicle, such as vehicle 200, is traveling in a turn lane. A "lane" may refer to a designated or intended travel path of a vehicle and may have marked (e.g., lines on a road) or unmarked boundaries (e.g., an edge of a road, a road barrier, guard rail, parked vehicles, etc.), or constraints. System 100 may operate to make these detections and determinations based on visual information acquired via one or more image capture devices, for example. In some embodiments, these detections and determinations may also be made at least in part on map data and/or sensed vehicle position. In addition to determining the status of vehicle 200 as being in a turn lane, system 100 may recognize a traffic light associated with the lane, and may be configured to determine the status of the traffic light based on analysis of road context information and determined characteristics of the traffic light.

Figure 24:
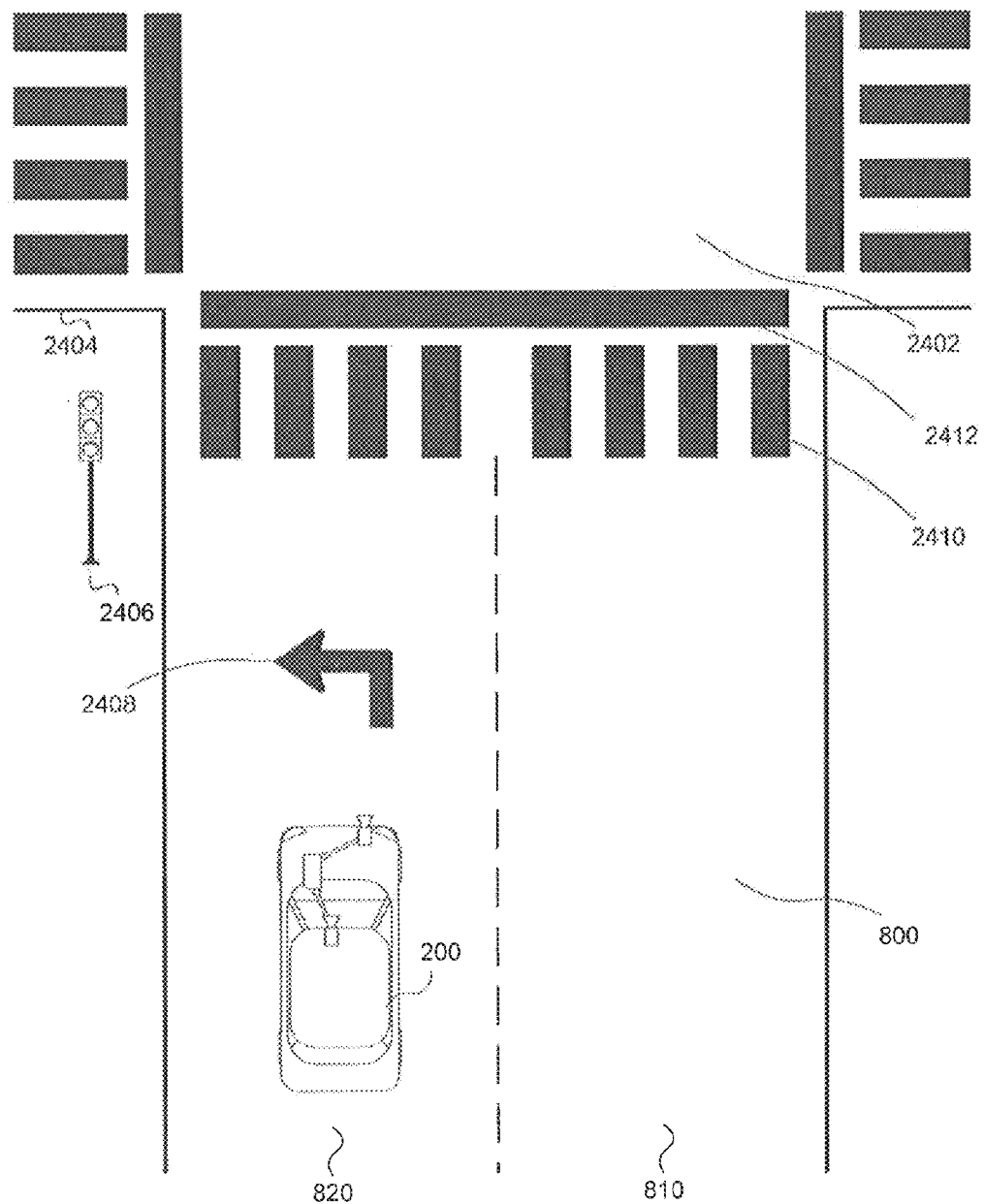
FIG. 24 is a diagrammatic top view representation of an exemplary vehicle including a system consistent with the disclosed embodiments in which the vehicle is approaching an intersection with a traffic light.

FIG. 24 illustrates a vehicle 200 traveling on a roadway 800 in which the disclosed systems and methods for detecting an object in the roadway may be used. Vehicle 200 is depicted as being equipped with image capture devices 122 and 124; more or fewer cameras may be employed on any particular vehicle 200. As shown, roadway 800 may be subdivided into lanes, such as lanes 810 and 820. Lanes 810 and 820 are shown as examples; a given roadway 800 may have additional lanes based on the size and nature of the roadway. In the example of FIG. 24, vehicle 200 is traveling in lane 820, and can be seen to be approaching intersection 2402 with cross street 2404. Traffic in lane 820 at intersection 2402 is regulated by traffic light fixture 2406. System 100 may, as discussed in detail below, determine the status of traffic light fixture 2406 and cause a system response affecting operations of vehicle 200. Further illustrated on roadway 800 are warning lines 2410 leading to stop line 2412.

Processing unit 110 may be configured to determine one or more lane constraints associated with each of lanes 810 and 820, intersection 2402, or cross street 2404 based on a plurality of images acquired by one or more of image capture device 122-126 that processing unit 110 may receive via data interface 128. According to some embodiments, the lane constraints may be identified by visible lane boundaries, such as dashed or solid lines marked on a road surface. Additionally or alternatively, the lane constraints may include an edge of a road surface or a barrier. Additionally or alternatively, the lane constraints may include markers (e.g., Botts' dots). According to some embodiments, processing unit 110 (via lane positioning module 2520, described in detail below) may determine constraints associated with lanes 810/820, intersection 2402, or cross street 2404 by identifying a midpoint of a road surface width, such as the entirety of roadway 800 or cross street 2404 or a midpoint of one of lanes 810/820. Processing unit 110 may identify lane constraints in alternative manners, such as by estimation or extrapolation based on known roadway parameters when, for example, lines designating road lanes such as lanes 810/820 are not painted or otherwise labeled. Processing unit 110 may also determine the physical relative distance between the various constraints and detected objects, such as traffic light lamps.

Distance estimation for a junction with traffic lights may be a challenge when developing autonomous vehicle or red traffic light warning systems, because the location of the traffic light may be after or in the middle of the junction. For example, determining the 3D position for each traffic light at an intersection may imply a braking point for the vehicle but the stop line may provide an accurate position.

In the present system, detection of the constraints and pathways of roadway 800, cross street 2404, or intersection 2402, as well as constituent lanes 810/820 may include processing unit 110 determining their 3D models via a camera coordinate system. For example, the 3D models of lanes 810/820 may be described by a third-degree polynomial. In addition to 3D modeling of travel lanes, processing unit 110 may perform multi-frame estimation of host motion parameters, such as the speed, yaw and pitch rates, and acceleration of vehicle 200. Processing unit 110 may further determine a road elevation model to transform the information acquired from the plurality of images into 3D space. One feature of the present system is that a global model may be created for static objects at a traffic intersection simultaneously rather than creating one standalone model for every detected object. System 100 may thus be configured to determine absolute distances for objects or lane constraints at a distance, for example, within about one hundred meters. In some cases, system 100 may be configured to determine absolute distances for objects or lane constraints at other distances (e.g., within 125 meters, within 150 meters, etc.). Further, system 100 may be configured to determine which traffic light fixture (e.g., traffic light fixture 2406) is relevant to vehicle 200 within a distance of about eighty meters from stop line 2412.

Accurate distance estimation to the traffic light(s) at an intersection may be achieved through processes referred to as expansion and scaling. The expansion process may use relative distances to determine a distance from vehicle 200 to an object, such as stop line 2412. For example, if two traffic lamp fixtures are detected in the image data, and the distance between them increases by 5% when the vehicle moves a distance of ten meters, then the system calculates that the distance is 200 meters.

Figure 25:
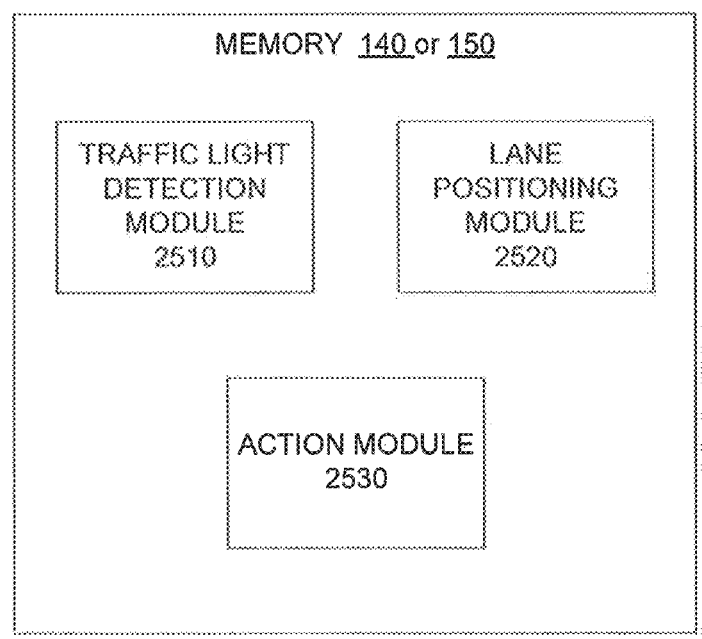
FIG. 25 is a diagrammatic representation of the memory of an exemplary traffic light detection system consistent with the disclosed embodiments.

FIG. 25 is an exemplary block diagram of memory 140 and/or 150, which may store instructions for performing one or more operations consistent with disclosed embodiments. As illustrated in FIG. 25, memory 140/150 may store one or more modules for performing the object detection and responses described herein. For example, memory 140/150 may store a traffic light detection module 2510, a lane positioning module 2520, and an action module 2530. Application processor 180 and/or image processor 190 may execute the instructions stored in any of modules 2510-2530 included in memory 140/150. One of skill in the art will understand that references in the following discussions to processing unit 110 may refer to application processor 180 and image processor 190 individually or collectively. Accordingly, steps of any of the following processes may be performed by one or more processing devices.

Traffic light detection module 2510 may store instructions which, when executed by processing unit 110, may detect the presence and status of a traffic light fixture, such as traffic light fixture 2406. As will be discussed below in association with FIGS. 26A, 26B, and 27, traffic light detection module 2510, along with image processor 190, may perform image processing on one or more images acquired by one or more of image capture devices 122-126. Traffic light detection module 2510 may further determine the status of traffic light fixture 2406, including a determination of whether one of the lights within traffic light fixture 2406 includes an arrow. Traffic light detection module 2510 may determine other information relevant to the status of traffic light fixture 2406, including but not limited to whether any of the traffic lights associated within traffic light fixture 2406 are illuminated (in either a solid or blinking manner), determining positions of the traffic lights within the traffic lamp fixture (i.e. a horizontal orientation of traffic lights versus a vertical orientation), or determining a color associated with the traffic light. In some embodiments, traffic light detection module 2510 may store information determined for a particular heading, a particular intersection 2402, and/or a particular traffic light fixture 2406 within processing unit 110, such as in memory 140/150. In these embodiments, previously determined and saved information may be used in the future when vehicle 200 returns to the same intersection.

In some embodiments, a blinking traffic light may be determined through image analysis of multiple images acquired at a predetermined or known capture rate (e.g., analyzing images acquired 1 second, 1.5 seconds, 2 seconds, etc., apart). For example, system 100 may analyze image data to identify a pattern in illumination among a plurality of images. System 100 may further determine a region of a captured image determined to be within the boundaries of a particular traffic light of interest in a traffic light fixture. System 100 may then determine the color of a traffic light through pixel analysis in the region determined to be within the boundaries of the traffic light of interest.

Lane positioning module 2520 may store instructions which, when executed by processing unit 110, may assist system 100 in determining a position of vehicle 200. In some embodiments, determining the position of vehicle 200 may include determining at least one indicator of vehicle position, either via a visual determination or through analysis of the at least one image received from image capture devices 122-126 via data interface 128. In these embodiments, the at least one indicator of vehicle position may include a distance from the vehicle to one or more lane constraints or lane markers associated with the current lane in which the vehicle is traveling, or to markers associated with an intersection, such as warning lines 2410 and stop line 2412. The distance from the vehicle to a location or object may be determined based on, for example, one or more of an analysis of image data, GPS information, or data from a position sensor. Further, the at least one indicator of vehicle position may include an arrow associated with the traffic lamp fixture having at least one associated traffic light. Additionally or alternatively, the at least one indicator of vehicle position may include a vehicle location acquired by GPS or a like coordinate system. In some embodiments, lane positioning module 2520 may store lane constraint information determined for a particular roadway 800 and its lanes 810/820. For example, processing unit 110 may store the information in memory 140/150. In these embodiments, previously determined and saved information may be used in the future when vehicle 200 returns to the same intersection. For example, GPS information may be used to determine that vehicle 200 has returned to the same intersection.

Consistent with disclosed embodiments, lane positioning module 2520 may use the information from the at least one indicator of vehicle position to determine if a system response changing the operation of vehicle 200 is required or recommended. Additionally or alternatively, lane positioning module 2520 may receive information from other modules (including position sensor 130) or other systems indicative of the presence of other features in the image data, such as additional vehicles, curvature of the road, etc.

Action module 2530 may store instructions which, when executed by processing unit 110, may assist system 100 in taking one or more actions relative to the operation of vehicle 200 based on information received from one or more sources, such as position sensor 130, image processor 190, traffic light detection module 2510, or lane positioning module 2520. In some embodiments, action module 2530 may receive information (from, e.g., traffic light detection module 2510) regarding the status of a traffic light at an intersection, such as traffic light fixture 2406 at intersection 2402 discussed above. Other information received by action module 2530 may include a determination of whether the vehicle is in a turn lane, and whether the traffic light fixture 2406 includes an arrow.

Based on this received information, action module 2530 may then cause a system response affecting the operational status of vehicle 200, such as causing system 100 to provide control signals to one or more of throttling system 220, braking system 230, and steering system 240 to navigate vehicle 200 (e.g., by accelerating, turning, etc.). For example, in some embodiments, system 100 may determine that the turn lane traffic light authorizes vehicle 200 to make a turn. In these embodiments, action module 2530 may send an instruction to steering system 240, and steering system 240 may execute the instruction to turn vehicle 200 through intersection 2402 into a new lane of travel associated with cross street 2404. In other embodiments, the system response initiated and executed by action module 2530 may include any or all of providing a visual or audible notice to the operator of the vehicle, applying vehicle brakes, discontinuing a cruise control function, or initiating one or more automated turning maneuvers.

Additionally or alternatively, action module 2530 may send instructions to other systems associated with vehicle 200, such as braking system 230, turn signals, throttling system 220, etc. In some embodiments, action module 2530 may instead provide a human operator of the vehicle with audio, visual, or tactile feedback representative of the information gathered from the relevant systems and/or sensors. The human operator may then act on this feedback to turn the vehicle.

Figure 26A:
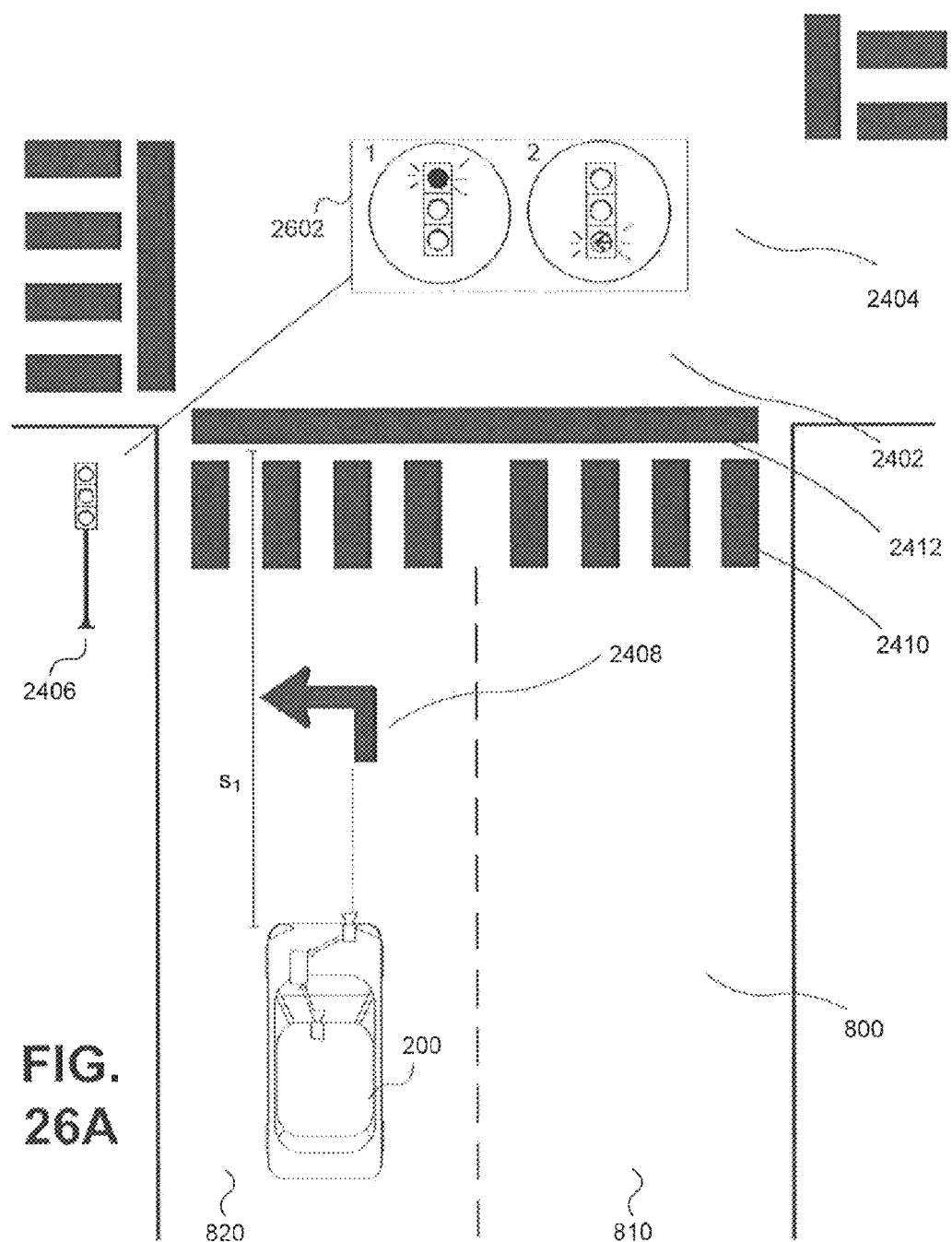
FIG. 26A is a diagrammatic representation of an exemplary vehicle including a traffic light detection system encountering an intersection with a traffic light and determining its status consistent with the disclosed embodiments.

FIG. 26A provides an annotated view of the situation depicted in FIG. 24. Vehicle 200 is once again traveling in lane 820 of roadway 800, and is approaching intersection 2402 with cross street 2404. Vehicle 200 is again equipped with image capture devices 122 and 124; more or fewer devices may be associated with any particular vehicle 200. For simplicity of illustration, roadway 800 in FIG. 26A is depicted as a one-way street oriented from the top to the bottom of the page with two travel lanes 810 and 820. Cross street 2404 is a two-way street oriented left-right across the page with one travel lane going in each direction.

To the left side of roadway 800 at intersection 2402 is traffic light fixture 2406. Painted on the surface of lane 820 in front of vehicle 200 is lane arrow 2408, indicating that lane 820 is a left turn lane. Also painted or otherwise affixed on the surface of roadway 800 are warning lines 2410 leading to stop line 2412.

Consistent with disclosed embodiments, system 100 may be configured to determine whether vehicle 200's travel lane approaching an intersection (here, lane 820) is a turn lane; determine whether a traffic light fixture (here, traffic light fixture 2406) regulates the intersection; determine the status of a traffic light in the traffic light fixture; and determine whether that traffic light includes an arrow. This process will be described in further detail below in association with FIG. 27 and process 2700.

Briefly, system 100 associated with vehicle 200 may determine the position of vehicle 200 within roadway 800 via one or more of processing unit 110, position sensor 130, traffic light detection module 2510, or lane position module 2520. Additionally or alternatively, system 100 may gather information from at least one indicator of vehicle position. As discussed above in association with lane positioning module 2520, the at least one indicator of vehicle position may include a distance from vehicle 200 to one or more lane constraints or lane markers associated with the current lane in which the vehicle is traveling (such as lane 820), or to markers associated with an intersection 2401, such as warning lines 2410 and stop line 2412. Further, the at least one indicator of vehicle position may include an arrow associated with traffic light fixture 2406. Additionally or alternatively, the at least one indicator of vehicle position may include a vehicle location acquired by GPS or a like coordinate system.

In the illustration of FIG. 26A, multiple indicators of the position of vehicle 200 are present. One or more of image capture devices 122-126 associated with vehicle 200 may be configured to capture a plurality of images of the area in front of vehicle 200 that may assist in determining a position of vehicle 200. For example, the images may include lane arrow 2408, which indicates that lane 820 is a left turn lane for intersection 2402. The images may also include traffic light fixture 2406, and may indicate that one or more of the individual lamps within traffic light fixture 2406 includes an arrow suggestive of a turn lane situation. One or more of image capture devices 122-126 may further capture images of warning lines 2410 or stop lines 2412 associated with either roadway 800 or cross street 2404. Further, system 100 via lane positioning module 2520 may determine a position of vehicle 200 within the turn lane by measuring distance s, from a surface of vehicle 200 to stop line 2412. Still further, system 100 may implement an optical character recognition (OCR) process to obtain text included in one or more captured images (e.g., text from signs and/or road markings). System 100 may then use the text information as part of or as the basis of determining whether vehicle 200 is within a turn lane. For example, system 100 may identify certain words indicative of a turn lane (e.g., "turn, "right," left," etc.).

The measurement(s) may be direct measurements, such as via position sensor 130, or may be determined via analysis of captured image data by image processor 190 and may be used in connection with map data. The measurement(s) may be measured from any portion of the interior or exterior vehicle 200, including but not limited to the front of vehicle 200, a portion of vehicle 200 such as a headlight or front license plate, a position as-installed of image capture devices 122-126, a determined centroid of vehicle 200, the rear of vehicle 200, one or more windshields or mirrors associated with vehicle 200, wheels of vehicle 200, right or left sides or windows of vehicle 200, a point associated with the roof of vehicle 200, or a point associated with the chassis of vehicle 200.

In some embodiments, determining the distance from vehicle 200 to traffic light fixture 2406 may be sufficient to assist processing unit 110 in calculating a braking distance or other such measurement. In other embodiments, however, traffic light fixture 2406 may be located past the point at which vehicle 200 would be required to stop. In these embodiments, the distance to the intersection may be determined by using one or more of warning lines 2410 or stop line 2412.

As discussed above in association with FIG. 24, these distances may be calculated using an estimation process employing expansion and scaling. At an intersection 2402 with two traffic light fixtures, for example, system 100 may measure the relative distance between the two fixtures over a period of time as captured in the image data, and then use that relative distance to estimate the distance to stop line 2412. In some embodiments, these measurements may be repeated over time for increased precision. Precision may also be increased by other methods; for example, if three or four traffic light fixtures are situated at intersection 2402 relative distances may be calculated between each of the fixtures and averaged. Additionally or alternatively, the distance may be estimated using a Kalman filter, as discussed above.

System 100 may still need additional information or inputs to determine the location of a stop line 2412 relative to an intersection 2402 and/or traffic light fixtures 2406. In some embodiments, system 100 may use previously-stored map data gathered from prior trips to the intersection. This information may be received from traffic light detection module 2510, or lane positioning module 2520. A distance measure Z may also be derived from the image data using the equation $$Z = fW/w$$

where W is the known distance between two traffic light fixtures 2406, w is the distance in the image data in pixels, and f is the focal length of the particular image capture device 122-126 in pixels.

In FIG. 26A, inset 2602 shows the two statuses of traffic light fixture 2406 relevant to the example. Based on image data from at least one image received via data interface 128 from image capture devices 122-126, system 100 may be configured to determine the status of traffic light fixture 2406. This determination will be described in further detail below in association with FIG. 27 and process 2700. Upon approaching intersection 2402, system 100 may first determine that traffic light fixture 2406 is displaying a solid red light, as seen in image 1 of inset 2602. In the example of FIG. 26A, lane 820 is a left turn lane, so unless roadway 800 is located in a jurisdiction where left turns on red are legal (or if cross street 2404 were configured as a one way street with both lanes flowing from right to left on the page), vehicle 200 must stop at stop line 2412 and remain stationary until traffic light fixture 2406 is determined to have changed. In alternative embodiments (not shown), vehicle 200 may be traveling in a lane that is determined to be a right turn lane, and assuming that right terms on red are legally permissible in that jurisdiction, system 100 may cause a system response enabling vehicle 200 to turn right while traffic light fixture 2406 remains red.

Subsequently, as seen in image 2 of inset 2602, traffic light fixture 2406 shifts from a solid red light to a solid green arrow indicating a protected left turn. System 100 may be configured to detect not only that the color of the light has changed, but also that an arrow has appeared within the lamp based on pixel-level image analysis by image processor 190 of acquired images of traffic light fixture 2406. In some embodiments, in order for system 100 to detect that the color of a traffic light has changed, system 100 may analyze captured images over a period of time (e.g., 1 second, 5 seconds, 10 seconds, 15, seconds, 20 seconds, 30 seconds, 1 minute, etc.) in order to recognize the status change of the traffic light. System 100 may further determine once traffic light fixture 2406 changes to display the green arrow whether it is safe or authorized to proceed in the direction indicated by the status of the light. Even though the light may show a green arrow, various situations (not shown) may require vehicle 200 to further delay before completing the turn. For example, a pedestrian may be crossing cross street 2404. Although roadway 800 in FIG. 26A is a one-way street, in alternative embodiments (such as that described below and shown in FIG. 26B), the road may be a two-way street and vehicle 200 may further assess whether a second vehicle coming from the opposite direction is making a right turn on red onto cross street 2404 from the other direction. Further, other obstacles may prevent a timely left turn; for example, a set of railroad tracks may be oriented parallel to roadway 800 to its left side, and although a left turn green arrow may be illuminated, barriers associated with the train track may be down to allow a train to pass through. These examples are not intended to be limiting. Once system 100 determines that both traffic light fixture 2406 and the situation at the intersection enables a safe turn, system 100 via action module 2530 may cause a system response involving one or more of throttling system 220, braking system 230, steering system 240, turn signals, and/or other subsystems and modules that automatically causes vehicle 200 to turn left.

Figure 26B:
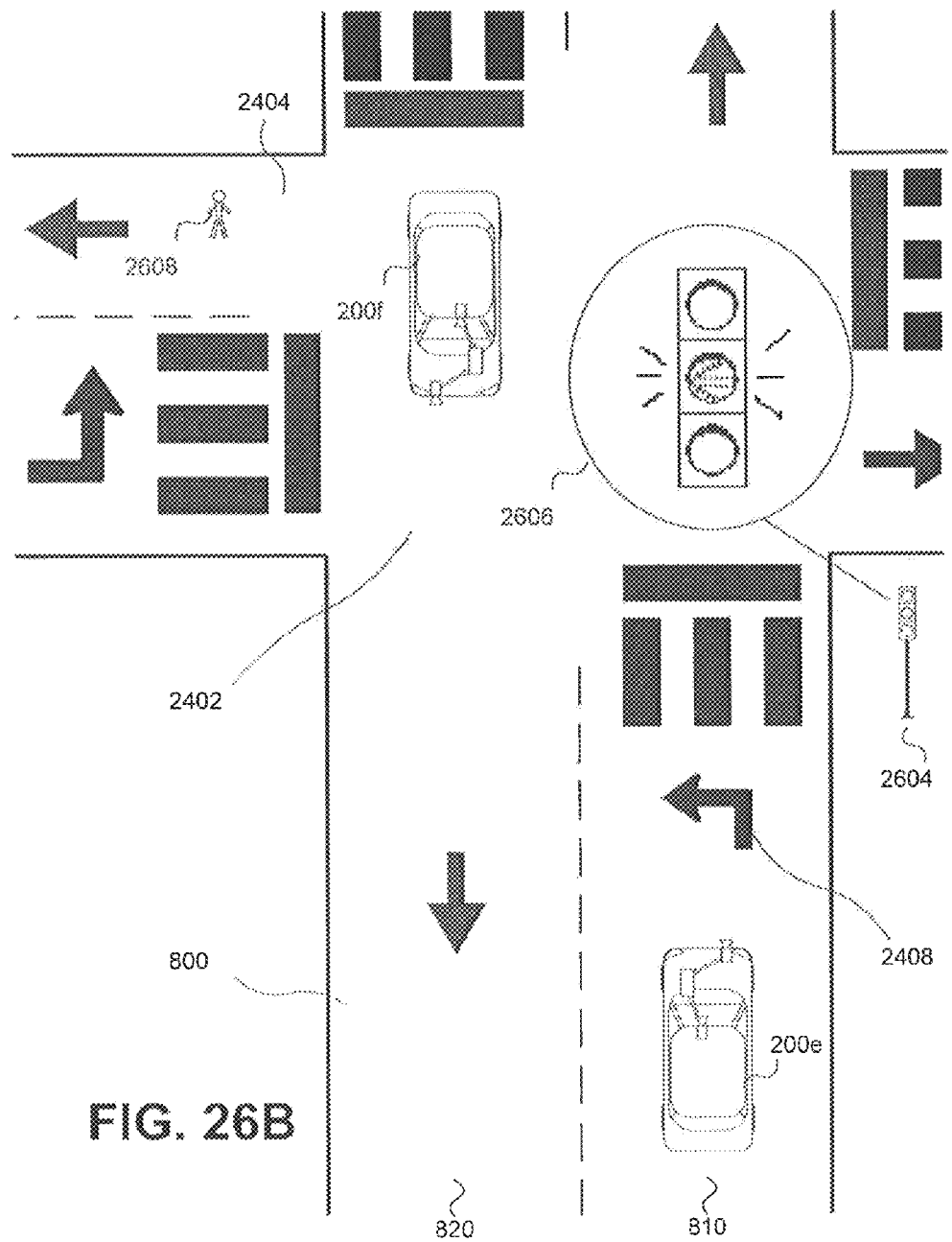
FIG. 26B is a diagrammatic representation of an exemplary vehicle including a traffic light detection system encountering an intersection with a blinking yellow light and determining a course of action consistent with the disclosed embodiments.

FIG. 26B illustrates an additional intersection scenario consistent with disclosed embodiments. In the example of FIG. 26B, vehicle 200 (here represented as vehicle 200e) is now traveling in lane 810 of roadway 800, and is approaching intersection 2402 with cross street 2404. Vehicle 200 is again equipped with image capture devices 122 and 124; more or fewer devices may be associated with any particular vehicle 200. Unlike the illustration of FIG. 26A, roadway 800 is now a two-way street in FIG. 26B, and traffic may proceed in both directions. Cross street 2404 remains a two-way street oriented left-right across the page with one travel lane going in each direction.

To the right side of roadway 800 at intersection 2402 is traffic light fixture 2604. Painted on the surface of lane 810 in front of vehicle 200 is lane arrow 2408, indicating that lane 810 is a left turn lane. As before, consistent with disclosed embodiments, system 100 may be configured to determine whether vehicle 200's travel lane approaching an intersection (this time, lane 810) is a turn lane; determine whether a traffic light fixture (here, traffic light fixture 2604) regulates the intersection; determine the status of the traffic light; and determine whether that traffic light includes an arrow.

System 100 may operate to make these determinations in much the same manner as described above. However, in the example of FIG. 26B, inset 2606 demonstrates that as vehicle 200e approaches intersection 2402, traffic light fixture 2604 is displaying a flashing or blinking yellow light. The non-solid nature is indicated in inset 2606 by the dashed lines of the arrow. As may be familiar to one of ordinary skill in the relevant art, some jurisdictions use blinking yellow lights to essentially serve the same functions as "Yield" or "Stop" signs during certain times of the day, while still permitting the lanes of travel to be fully stopped with a red light or fully authorized to proceed with a green light.

As outlined above, system 100 may determine that traffic light fixture 2604 is displaying a blinking yellow light, and may further determine that lane 810 is a turn lane. With the situation depicted in FIG. 26B, however, system 100 may be required to make additional determinations in order for vehicle 200e to successfully traverse intersection 2402. As one of ordinary skill would understand, a blinking yellow light authorizes an approaching vehicle to turn at will, but only if it is safe to do so. Drivers are expected to use caution at the intersection and determine that no potential collisions or other hazards would result from making the turn too early.

One such determination that system 100 may make is whether one or more vehicles are approaching the intersection from the other direction. For example, while travel lanes traveling one direction of a roadway may have a traffic light indicating a blinking yellow light in a turn lane, traffic traveling the opposite direction may have a green light to proceed straight through the intersection. Accordingly, a collision could occur if the operator of the vehicle with the blinking yellow signal fails to yield. In the example of FIG. 26B, a second vehicle 200f is indeed passing straight through intersection 2402. System 100 may be configured to detect the presence of vehicle 200f via image data captured from one or more of image capture devices 122-126, as well as determine that vehicle's location within the roadway/intersection and its velocity using one or more of position sensor 130, image processor 190, traffic light detection module 2510, or lane positioning module 2520. Upon detecting and analyzing vehicle 200f, system 100 (via action module 2530) may cause braking system 230 to remain engaged until vehicle 200f has passed.

Once no additional vehicles are approaching the intersection from the opposite direction, system 100, via action module 2530, may cause a system response based on that determination. The system response may include one or more of providing feedback to an operator of vehicle 200, applying vehicle brakes via braking system 230, discontinuing cruise control, or initiating an automated turning maneuver onto cross street 2404 using one or more of throttling system 220, braking system 230, or steering system 240. First, however, system 100 may analyze image data for the presence of any additional obstacles or objects associated with intersection 2402 or cross street 2404. For example, in the illustration of FIG. 26B, pedestrian 2608 can be seen walking across cross street 2404, since the other lane of roadway 800 has a green light in that direction. System 100 may detect the presence of pedestrian 2608 via image processor 190 by analyzing one or more of the plurality of images captured by one or more of image capture devices 122-126. As described above, other subsystems and modules of system 100 may coordinate to detect the velocity of pedestrian 2608, and may notify system 100 when pedestrian 2608 is no longer in the roadway and it is safe to turn.

Figure 27:
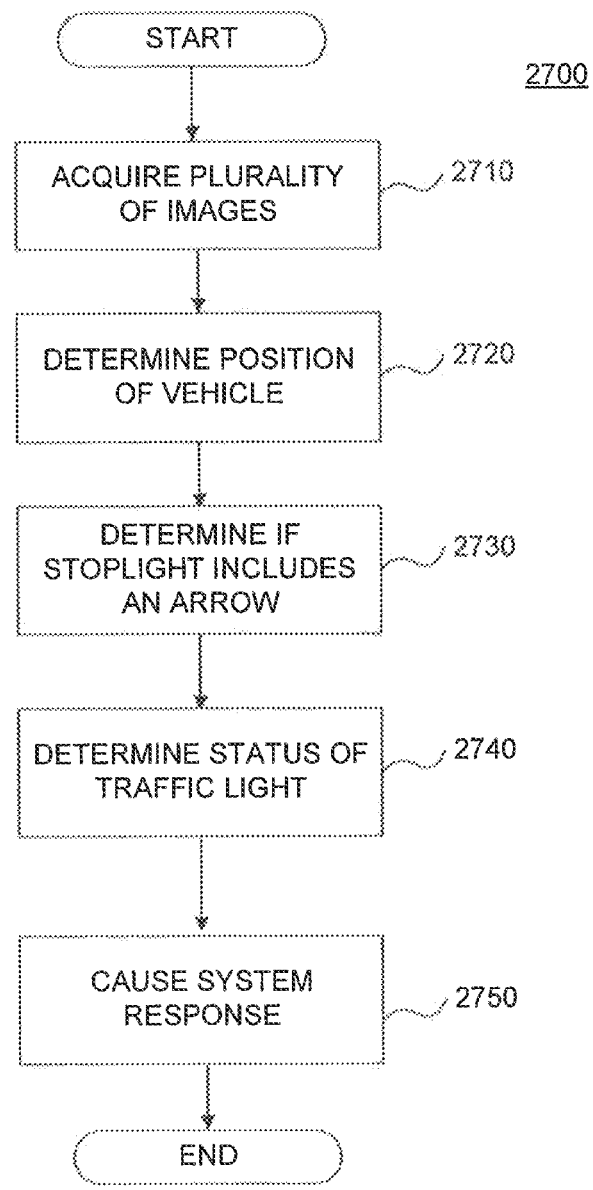
FIG. 27 is a flowchart showing an exemplary process for determining the status of a traffic light at an intersection, consistent with the disclosed embodiments.

FIG. 27 illustrates a process 2700 for detecting the status of a traffic light, consistent with disclosed embodiments. Steps of process 2700 may be performed by one or more of processing unit 110, image acquisition unit 120, position sensor 130, image processor 190, traffic light detection module 2510, lane positioning module 2520, or action module 2530.

At step 2710, process 2700 may include acquiring, using at least one image capture device 122, 124, and/or 126, a plurality of images of an area forward of vehicle 200. The area may contain one or more traffic lamp fixtures having at least one traffic light, such as traffic light fixtures 2406 and 2604 described above. Processing unit 110 may receive the plurality of images from the image capture device(s) through data interface 128. The plurality of images may then be processed in real time by image processor 190 of processing unit 110. Image processor 190 may process at least one image captured by the at least one image capture device(s), as well as additional images captured at later points in time.

At step 2720, process 2700 may determine, based on at least one indicator of vehicle position, whether vehicle 200 is traveling in a turn lane. As described generally above, various indicators of position may be used to determine whether a travel lane is a turn lane. In some embodiments, the position indication may include a vehicle location acquired by GPS. In other embodiments, system 100 may recognize lane markers or constraints, such as lane arrow 2408 indicating that the lane is a turn lane. Alternatively, image processor 190 may determine that an arrow is associated with the traffic lamp fixture regulating the lane travel. Additionally, measurements of distance may be made, using various elements of system 100. For example, position sensor 130 and/or lane positioning module 2520 may send information to processing unit 110 regarding the relative position of vehicle 200 within lane 810/820, including how far vehicle 200 is from intersection 2402 (distance s, described above). The end of the lane may be based on a measured distance or a visual determination (e.g., by analyzing one or more image images acquired by one or more of image capture devices 122-126 and detecting the presence of warning lines 2410 or stop line 2412).

At step 2730, process 2700 may perform image processing on the at least one image received via data interface 128 to determine whether an arrow exists in the image data associated with the traffic light. Traffic light detection module 2510 and/or image processor 190 may be configured to analyze the pixels of the image corresponding to the locations representative of the individual traffic lights within the traffic lamp fixture. One or more image processing algorithms may be applied to the pixels to determine if either a solid or blinking/flashing arrow is present in the relevant regions. Further examples of how system 100 may analyze one or more images to determine whether an arrow is displayed by a traffic light are discussed below in connection with FIGS. 28-30B.

At step 2740, process 2700 may determine a status of the traffic light. As discussed above, determining the status of the traffic light may include, but not be limited to, determining whether the traffic light is illuminated (and/or functional at all), determining a position of the illuminated traffic light within the traffic lamp fixture, or determining a color associated with the traffic light (i.e. red, yellow, or green). This list is intended as exemplary only, and any information relevant to the traffic light may be determined and processed by system 100 and processing unit 110. For example, the system may be configured to determine whether the traffic light is solid or flashing based on image processing over a series of acquired images. Image processor 190 may determine in these embodiments that the same traffic light within the fixture is illuminated in one image, darkened in the next in the sequence, and then immediately illuminated again; this would indicate that the particular light is flashing. In some embodiments, system 100 may be configured to recognize traffic light situations particular to the specific jurisdiction in which the vehicle is traveling. This information may be pre-programmed into system 100, such as in a database stored within memory 140/150 (not shown).

At step 2750, process 2700 may cause a system response via system 100 impacting the operation of vehicle 200. The response initiated by system 100 may be based on any or all of the determination of the status of the traffic light, whether the traffic light includes an arrow, and whether the vehicle is in a turn lane. As discussed above, the particular action(s) initiated by system 100 via action module 2530 may include, but not be limited to, providing a visual or audible feedback notice to an operator of vehicle 200 regarding the traffic light, applying vehicle brakes via braking system 230, discontinuing a cruise control function, or proceeding to initiate an automated turning maneuver and proceeding through the intersection using one or more of throttling system 220, braking system 230, or steering system 240.

Additionally, in some embodiments as part of the function of system 100, action module 2530 and/or processing unit 110 may be further configured to determine whether the turn lane in which the vehicle is located is authorized to proceed in the direction indicated by the determined status of the traffic light. In other words, even if the traffic light indicates that a particular system response is legally permissible, system 100 may provide the occupants of vehicle 200 an extra level of safety protection by further determining whether such an action is actually possible and safe. For example, as discussed above in association with FIG. 26B, system 100 and image processor 190 may be configured to detect the presence of other obstacles associated with the roadway(s) or the intersection, such as pedestrians present in the street or the presence of other vehicles. In some embodiments, the other vehicles may be proceeding normally through the intersection, such as in the scenario depicted in FIG. 26B where vehicle 200e has a blinking yellow light. In these embodiments, vehicle 200e could theoretically turn onto cross street 2404, but system 100 may further account for the fact that vehicle 200f is proceeding on a green light through the intersection. Alternatively, a second vehicle may be present in an unusual or illegal manner, such as if the operator of the other vehicle ran through a stop sign or a red light, or if a vehicle has become disabled in the intersection or one of the roadways.

In still other embodiments, determining whether the turn lane in which the vehicle is located is authorized to proceed in the direction indicated by the determined status of the traffic light may further comprise determining whether to actually follow the indicated status of the light based on a predetermined destination for the vehicle. In embodiments involving autonomous vehicles, it may be presumed that the operators and/or passengers have indicated their desired destination to the processing unit 110 of system 100. Accordingly, using GPS location technology or other such information, system 100 may be configured to determine if making the turn indicated by a traffic light is actually relevant to the predetermined destination. For example, in some embodiments the vehicle 200 may have ended up in the turn lane unintentionally, and proceeding to the predetermined destination may involve merging to an adjacent lane (with the help of lane positioning module 2520) and continuing to proceed straight through the intersection. Accordingly, system 100 may be configured to determine whether to turn left, turn right, or continue straight through the intersection based on this predetermined destination information.

Traffic Light Detail Detection

In some embodiments, system 100 may provide additional functionality related to the recognition of traffic signals. For example, system 100 may provide a traffic light detail detection function to provide feedback based on analysis of the physical features of a traffic light. To implement such functionality, processing unit 110 may process images captured by at least one of image capture devices 122, 124, 126 and employ a super resolution technique to recognize a specific feature of a traffic light in the images, where the specific feature may indicate useful information to system 100. For example, system 100 may recognize and distinguish between round and arrow shaped signals of a traffic light that have been illuminated.

Figure 28:
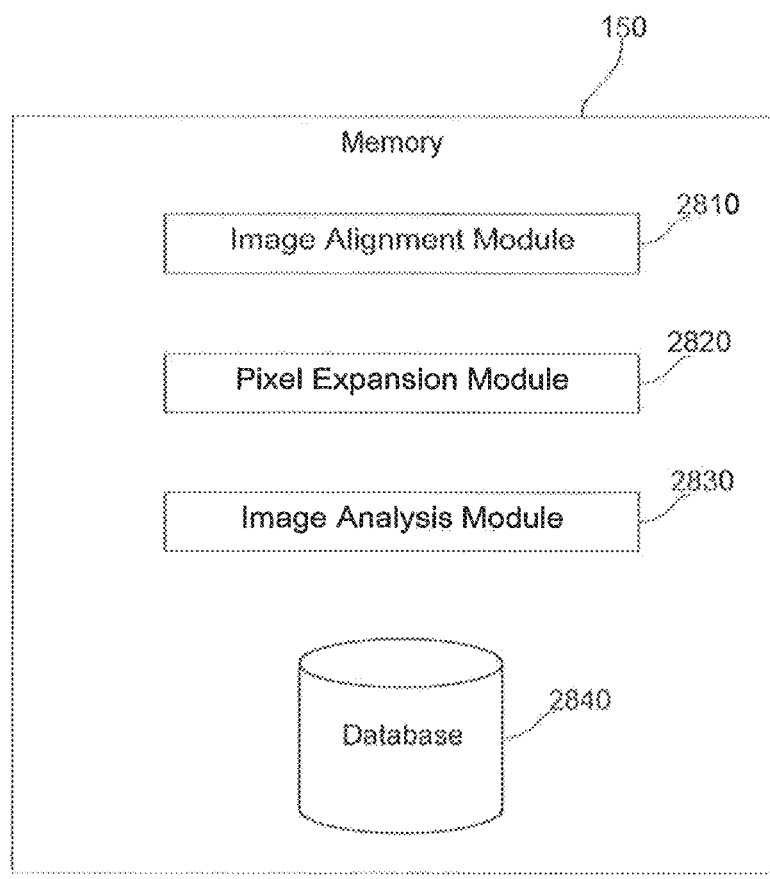
FIG. 28 is an exemplary block diagram of a memory configured to store instructions for performing one or more operations consistent with disclosed embodiments.

In some embodiments, memory 140 and/or 150 may store instructions programmed such that upon execution by a processing device will provide the traffic light detail detection function. As shown in FIG. 28, memory 140 and/or 150 may store an image alignment module 2810, a pixel expansion module 2820, an image analysis module 2830, and a database 2840. Image alignment module 2810 may store instructions for aligning a plurality of images captured by image capture devices 122, 124, 126. Pixel expansion module 2820 may store instructions for increasing the resolution of at least a portion of an image to allow images to be scaled to a standard size. Image analysis module 2830 may store instructions for analyzing the images to detect and identify features of the image. Database 2830 may be configured to store data associated with providing traffic light detail detection functionality and provide data when requested. Further, image alignment module 2810, pixel expansion module 2820, and image analysis module 2830 may store instructions executable by one or more processors (e.g., processing unit 110), alone or in various combinations with each other. For example, image alignment module 2810, pixel expansion module 2820, and image analysis module 2830 may be configured to interact with each other and/or other modules of system 100 to perform functions consistent with disclosed embodiments.

Database 2840 may include one or more memory devices that store information and are accessed and/or managed through a computing device, such as processing unit 110. In some embodiments, database 2840 may be located in memory 150, as shown in FIG. 28. In other embodiments, database 2840 may be located remotely from memory 150, and be accessible to other components of system 100 (e.g., processing unit 120) via one or more wireless connections (e.g., a wireless network). While one database 2840 is shown, it should be understood that several separate and/or interconnected databases may make up database 2840. Database 630 may include computing components (e.g., database management system, database server, etc.) configured to receive and process requests for data stored in memory devices associated with database 2840 and to provide data from database 2840 (e.g., to processing unit 110).

In some embodiments, database 2840 may be configured to store data associated with providing traffic light detail detection functionality. For example, database 2840 may store data, such as images, maps, algorithms, sets of values, or the like, which may allow processing unit 110 to identify information detected in an image. For example, database 2840 may store a set of average pixel values corresponding to each of a round signal and an arrow signal of a traffic light.

In some embodiment, system 100 may provide feedback based on a detail of a traffic light detected in one or more capture images. For example, system 100 may be configured to differentiate between colors, shapes, and positions of a signal associated with a traffic light in order to provide specific feedback based on a meaning of the detected detail (e.g., an arrow signal controls turning movement, while a round signal control straight forward movement).

Figures 29A, 29B:
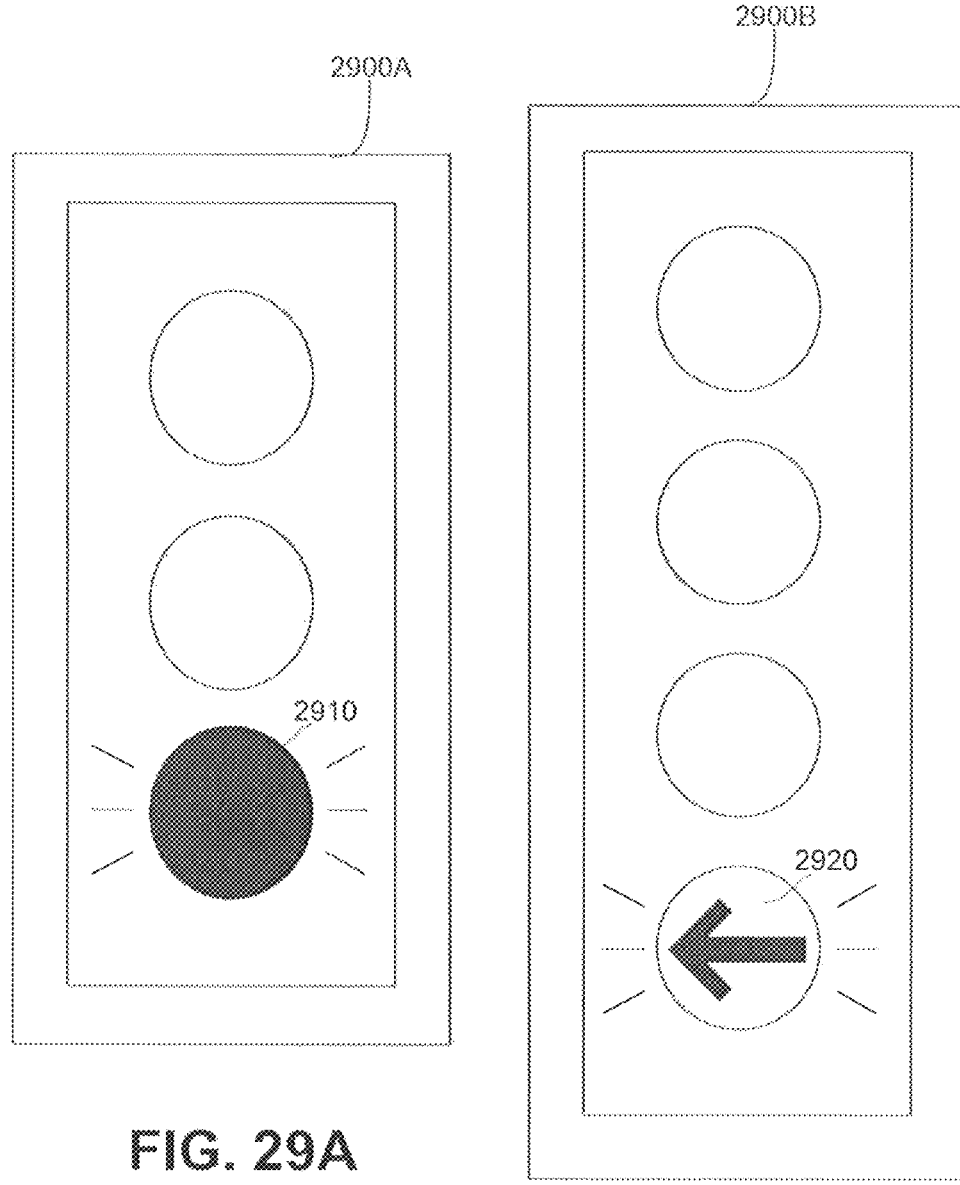
FIG. 29A is an illustration of an exemplary traffic light, consistent with disclosed embodiments.
FIG. 29B is another illustration of an exemplary traffic light, consistent with disclosed embodiments.

FIGS. 29A and 29B depict exemplary objects that may be detected by system 100. FIG. 29A depicts a traffic lamp fixture 2900A that includes a round signal 2910. FIG. 29B depicts a traffic lamp fixture that includes an arrow signal 2920. While both objects include traffic lights, they include different details that indicate different messages. In an exemplary embodiment, system 100 may be configured to analyze the pixels of one or more images to identify differentiating features, such as a round signal 2910 and arrow signal 2920.

Figure 29C:
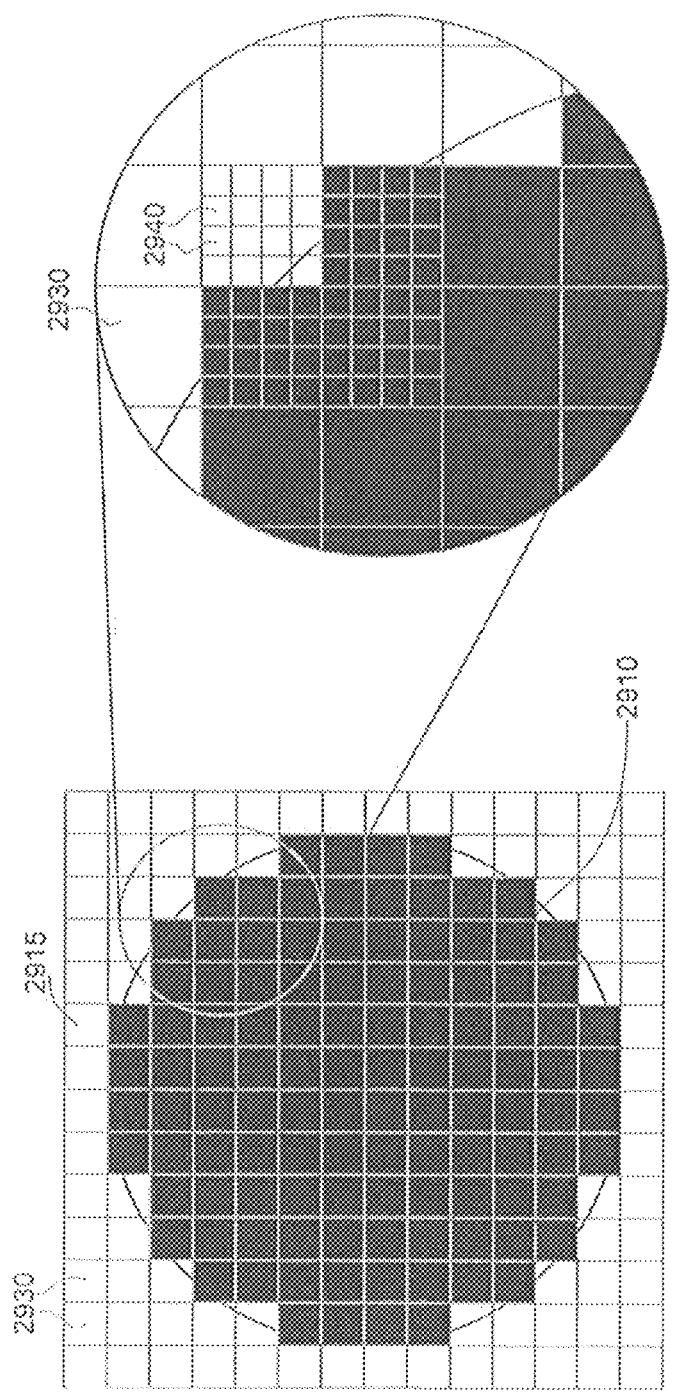
FIG. 29C is an illustration of an exemplary image of a portion of the traffic light of FIG. 29A, consistent with disclosed embodiments.

FIG. 29C depicts an exemplary portion of an image 2915 of round signal 2910, including a plurality of pixels 2930. System 100 may be configured to analyze pixels 2930 to identify an object and/or detail found in the image. For example, image analysis module 2830 may be configured to identify features such as brightness, color, contrast, tint, opacity, and the like, associated with each pixel 2930, and determine an object and/or detail associated with the image based on the pixel analysis. Each feature that image analysis module 2830 identifies may be given a value. For example, image analysis module 2830 may assign a value of one to pixels that are identified as the color red and a value of zero to any other pixel.

In some embodiments, system 100 may be configured to use a super resolution technique to allow for a more accurate analysis of an object in plurality of images. For example, pixel expansion module 2820 may modify image 2915 to divide one or more pixels 2930 into a subset of pixels 2940. While only some pixels 2930 are shown as expanded into pixels 2940 in FIG. 29C, it should be understood that any portion or all of pixels 2930 may be divided in this way. Thus, pixel expansion module 2820 may increase the number of pixels associated with a particular portion of an image.

In an exemplary embodiment, pixel expansion module 2820 may increase the number of pixels associated with a particular object in an image such that the section of the image including the object includes a selected number of pixels (e.g., a standard number of pixels). In this way, even if a plurality of images include the same object at different sizes (e.g., because the images were taken at different distances from the object), the images can be modified such that the portions of the images that include the object include the same number of pixels, which can be directly compared and averaged to more reliably determine a feature (e.g., color) of the part of the object located within the pixel.

Scaling selected portions of images to associate the same number of pixels with an object in each image may allow the images to be directly compared (e.g., compare the value of one pixel in an image with the same pixel in another image). In this way, multiple images may be considered and analyzed by image analysis module 2830, thus increasing accuracy as compared to analysis of one image. For example, the super resolution technique may increase the likelihood that image analysis module 2830 may correctly distinguish between round signal 2920 and arrow signal 2930 in images.

Figure 29D:
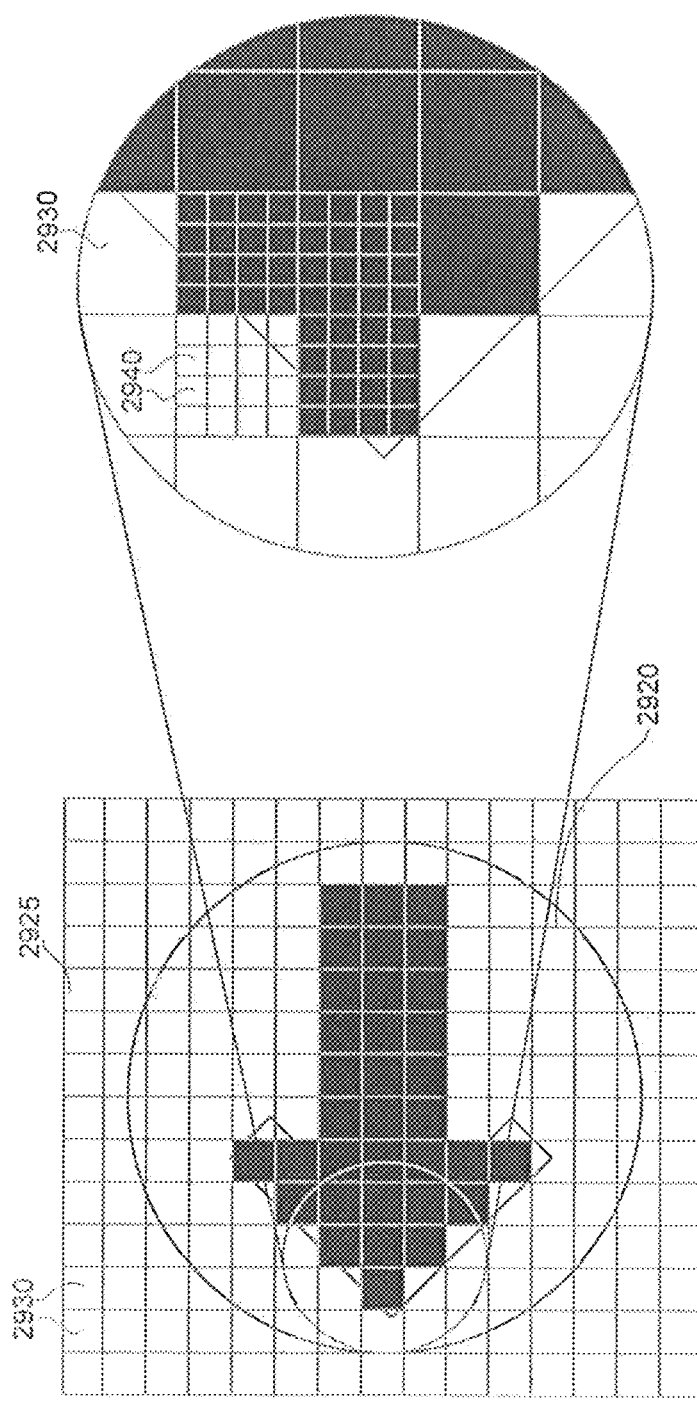
FIG. 29D is an illustration of an exemplary image of a portion of the traffic light of FIG. 29B, consistent with disclosed embodiments.

FIG. 29D depicts an exemplary portion of an image 2925 of arrow signal 2920. As described above with respect to image 2915, image 2925 may be divided into pixels 2930, which each may be expanded into a subset of pixels 2940. As can be seen in FIGS. 29C and 29D, pixels 2930 differ around the edges of the respective signals 2920, 2930. Image analysis module 2830 may be configured to identify one or more characteristics of pixels 2930 to determine whether the pixels correspond to round signal 2910 or arrow signal 2920. Expansion of pixels 2930 into pixels 2940 may allow multiple images to be aligned and considered, thus increasing the reliability of detection.

Figure 30A:
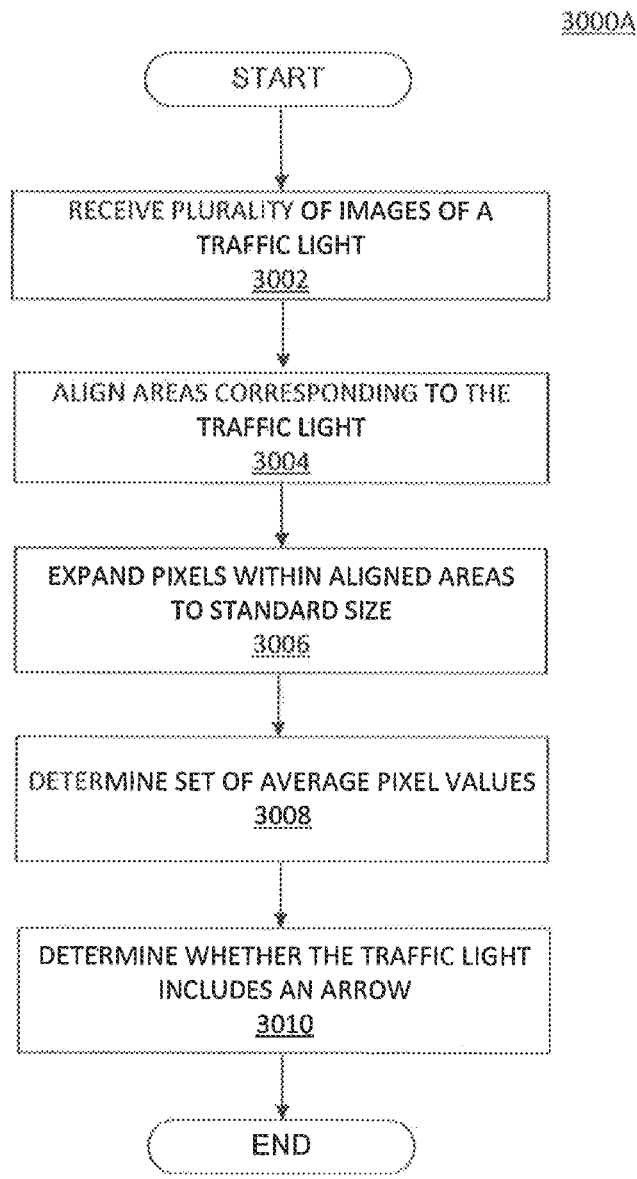
FIG. 30A is a flowchart showing an exemplary process for determining whether a traffic light includes an arrow, consistent with disclosed embodiments.

FIG. 30A is a flowchart showing an exemplary process 3000A for determining whether a traffic light includes an arrow, consistent with disclosed embodiments. In an exemplary embodiment, system 100 may perform process 3000A to determine whether a portion of a traffic light detected in a plurality of images includes an arrow signal. An arrow signal (or "arrow") may be a type of signal of a traffic light in which a visual component of the signal takes the shape of an arrow. The arrow may be a signal indicating that a vehicle turn (e.g., a turn in a direction of the arrow) is allowable at that time.

At step 3002, processing unit 10 may receive a plurality of images of a traffic light. For example, one or more of image capture devices 122, 124, 126 may acquire a plurality of images of an area forward of vehicle 200. In some instances, such as when vehicle 200 is approaching a junction, the area forward of vehicle 200 may include one or more traffic lamp fixtures that include at least one traffic light. In these instances, one or more of image capture devices 122, 124, 126 may acquire a plurality of images of the traffic light. Processing unit 110 may receive the plurality of images from image capture devices 122, 124, 126 through data interface 128.

Processing unit 110 may analyze the received plurality of images. In some embodiments, processing unit 110 may analyze the plurality of images to determine that the plurality of images include a traffic light. For example, processing unit 110 may recognize one or more objects as a candidate for being a traffic light and perform one or more processes (e.g., image matching) to determine whether the candidate corresponds to a traffic light. It should be understood, however, that processing unit 110 may perform process 3000A without the distinct step of identifying an object as a traffic light. In addition, processing unit 110 may analyze portions of the plurality of images to determine characteristics of the traffic light. These characteristics may help system 100 determine a response to the traffic light (e.g., the light is green—move through the junction, the light is red—stop at the junction).

At step 3004, processing unit 110 (e.g., via image alignment module 2810) may align areas of the plurality of images that correspond to the traffic light. For example, processing unit 110 may use an area of a traffic light as a common point to align the plurality of images. The alignment may allow processing unit 110 to analyze a common area of multiple images.

In order to align the areas of the plurality of images that correspond to the traffic light, processing unit 110 may select a trait or characteristic of a traffic light that may allow for an area of interest to be identified. In an exemplary embodiment, processing unit 110 may align areas of the plurality of images corresponding to the traffic light based on a determined center of brightness (e.g., of a lit signal of the traffic light). In some embodiments, the center of brightness may be determined by finding, for example, a center of mass of brightness of a traffic light. In other embodiments, processing unit 110 may use color, shape, position, or any other trait or characteristic of a traffic light to align the plurality of images. Further, in some instances, processing unit 110 may rotate the areas of the plurality of images to align the images in the plane of the image (e.g., to match the rotational position of the areas).

As described above, the aligned areas of the plurality of images may correspond to an area of interest of the traffic light. For example, by aligning the plurality of images at areas corresponding to the traffic light based on brightness, a lit signal of the traffic light may be identified and placed within the aligned areas. A lit signal may indicate to a viewer an action that is acceptable at that time (e.g., stop, go, turn, etc.). Therefore, aligning areas that correspond to a lit signal may help processing unit 110 isolate an area of interest of the traffic light.

In step 3006, processing unit 110 (e.g., via pixel expansion module 2820) may expand pixels of the plurality of images within the aligned areas to obtain a standard size (e.g., the same number of pixels). For example, processing unit 110 may perform an image modification process in which processing unit 110 replaces each pixel corresponding to the aligned areas of the plurality images with a plurality of pixels. In this way, the aligned areas of one or more images may be expanded to a standard size. The expansion of the pixels may allow for direct comparison of pixels between the plurality of images.

In some embodiments, processing unit 110 may expand the pixels of the plurality of images within the aligned areas by replacing each pixel with a matrix of pixels. Each pixel in the matrix of pixels may be attributed with the same value as the parent pixel. In this way, the expanded pixels may also include a value associated with a feature of the image at the pixel (e.g., color, brightness, etc.).

In one embodiment, processing unit 110 may expand each pixel within the aligned areas into a 3×3 matrix of pixels. In another embodiment, processing unit 110 may expand each pixel within the aligned areas into a 4×4 matrix of pixels. In other embodiments, other matrix sizes may be used (e.g., 5×5, 6×6, 8×8, etc.).

In some embodiments, pixel expansion module 2820 may expand pixels based on a scaling factor (e.g., 2, 2.5, 3, 4, 5, etc.) that transforms each pixel into a number of pixels corresponding to the scaling factor. Pixel expansion module 2820 may determine a scaling factor based on a size of an object in an image and a standard size that is used. In this way, the objects in the images may be standardized to include the same number of pixels.

Processing unit 110 may analyze the pixels across the plurality of images. For example, in step 3008, processing unit 110 (e.g., via image analysis module 2830) may determine a set of average pixel values including an average pixel value for each pixel, including expanded pixels. As described above, expanded pixels include values associated with a parent pixel. The pixel values may be any value that defines a selected pixel and allows processing unit 110 to determine a characteristic of the traffic light in the aligned areas. For example, the pixel values may correspond to a color or brightness value associated with each pixel. In another embodiment, the pixel values may be binary values indicating whether each pixel (or pixel matrix average) includes a color or brightness value above a threshold value. Processing unit 110 may determine an average pixel value for each pixel across all of the plurality of images.

Processing unit 110 may use the pixel values to determine a characteristic of the traffic light in the aligned areas. For example, in step 3010, processing unit 110 may determine whether the traffic light includes an arrow based on the set of average pixel values. In one example, processing unit 110 may compare the set of average pixel values to stored criteria (e.g., information stored in database 2840) to determine whether the pixel values correspond to an arrow. In another example, processing unit may map the average pixel values and compare it to a stored map to determine whether the pixel values correspond to the shape of an arrow.

In some embodiments, processing unit 110 may use an accuracy factor to determine whether the pixel values correspond to an arrow. For example, processing unit 110 may determine whether the set of average pixel values match stored criteria (e.g., a set of pixel values, a stored image, a pixel map, etc.) to within a degree of accuracy greater than a threshold value. In some embodiments, the accuracy factor may change depending on a quality of the images. For example, a relatively low accuracy factor may be used if vehicle 200 is far away from a traffic light and/or if only one of image capture devices 122, 124, 126 is able to capture images of the traffic light. Similarly, a relatively high accuracy factor may be used if vehicle 200 is close to the traffic light and/or more than one (or all) of image capture devices 122, 124, 126 are able to capture images of the traffic light. In some embodiments, image analysis module 2830 may classify an object for one or more features. For example, image analysis module 2830 may classify an object as an arrow or round signal.

Through exemplary process 3000A, system 100 may be configured to identify an arrow signal associated with a traffic light. The ability to identify the arrow signal provides additional functionality to system 100 that enhances the capabilities of system 100. In particular, since an arrow signal may indicate different information than a non-arrow signal (e.g., a plain round light) system 100 may be configured to provide a particularized system response (e.g., acceptable to turn left at this time, not acceptable to turn left at this time, etc. that may otherwise be incorrect (e.g., green indicates go in all directions). In another example, system 100 may differentiate between two identified traffic signal lights (e.g., a green round light and a red arrow light) to determine which traffic signal light should be followed. An exemplary process for using the detection of an arrow signal to achieve this functionality is described in more detail below.

Figure 30B:
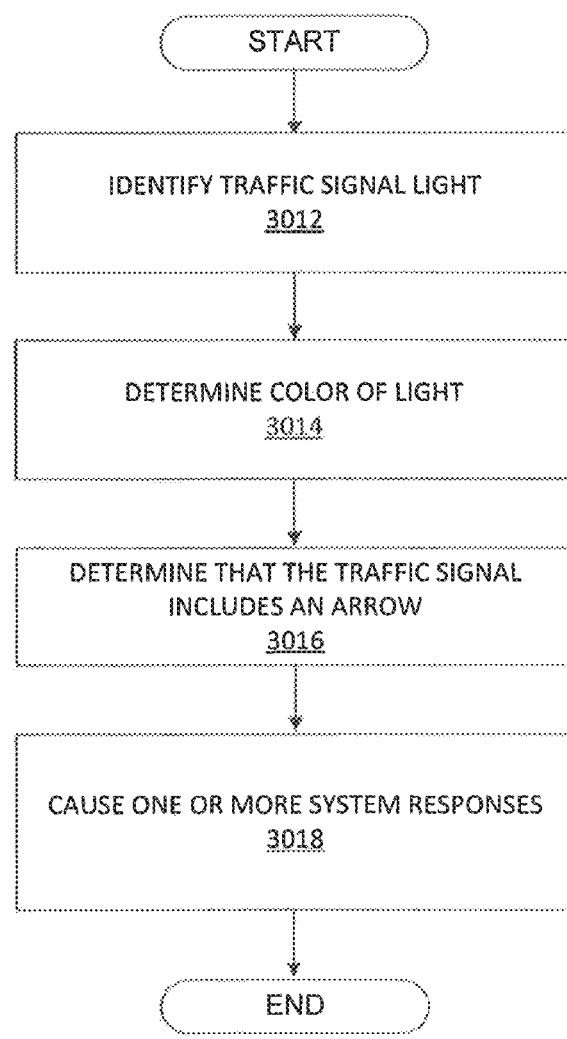
FIG. 30B is a flowchart showing an exemplary process for causing a system response based on the detection of an arrow signal in a traffic light, consistent with disclosed embodiments.

FIG. 30B is a flowchart showing an exemplary process 3000B for causing a system response based on the detection of an arrow signal in a traffic light, consistent with disclosed embodiments. In an exemplary embodiment, processing unit 110 may perform process 3000B to use a result of process 3000A to control vehicle 200. For example, based on a detection of an arrow signal in a traffic light, processing unit 110 may command vehicle 200 to accelerate, turn, stop, change lanes, etc.

In step 3012, processing unit 110 may identify a traffic signal light. For example, processing unit 110 may identify a traffic signal light in one or more images captured by one or more image capture devices 122, 124, 126. In some instances, more than one traffic signal light may be identified in an image (e.g., a green round light and a red arrow light).

At step 3014, processing unit 110 may determine a color of the identified traffic signal light. Processing unit 110 may use a color identification process to analyze one or more of the plurality of images of the traffic light to determine and categorize a color of the traffic signal light. For example, processing unit 110 may match image data to stored criteria to determine a color from a plurality of color possibilities (e.g., green, red, yellow, orange, etc.).

In one embodiment, processing unit 110 may identify a color of the pixels that include a pixel value indicating that the pixel is part of the shape of the traffic signal light. In another embodiment, one or more image capture devices 122, 124, 126 may use clear pixels and red (or other color) pixels to assist with color differentiation. For example, in some embodiments, when a red light is present in an image, both the red and clear pixels may be used, whereas when a green (or other color) light is present, only the clear pixels may be used while the red pixels are ignored (e.g., defined as black, no color, not red, etc.). For example, when the light is red, the red pixels may match the color and be "used" to determine the color. As another example, when the light is green, the clear pixels may be used to identify the color and/or the red pixels are ignored to define the color as not red. In this way, processing unit 110 may differentiate between colors in images depending on the type of pixels that are used to define a value of the light within the pixel. Further, since the images may be aligned and averaged with other images to achieve a higher resolution image, values for ignored red pixels (or other pixels missing values) may be supplied based on information from other images.

It should be understood that the foregoing are examples and other color identification processes and/or techniques may be used. In some embodiments, processing unit 110 may be configured to determine one or more other characteristics of the arrow and/or traffic signal. For example, processing unit 110 may determine whether the arrow is blinking and/or steady. In another example, processing unit 110 may determine whether the arrow has recently changed from another signal. For example, the plurality of images may include two identified signals, a previous signal and a current signal (e.g., the identified arrow). These other characteristics may provide processing unit 110 with additional information that may be helpful in determining how to interpret the arrow signal.

In step 3018, processing unit 110 may cause one or more system responses based on the color of the arrow (and/or other characteristic of the arrow and/or traffic signal). In one example, the system response may correspond to an indication of the arrow (e.g., green arrow—acceptable to turn, red arrow—not acceptable to turn, etc.). In another example, the system response may correspond to an indication that a particular traffic signal does not apply because it is an arrow (e.g., the vehicle is traveling straight). The system response may be a navigational response configured to change or continue an operating parameter of vehicle 200. For example, processing unit 110 may provide a notice to the driver of the vehicle (e.g., an audible sound or visual indicator via user interface 170), apply vehicle brakes, discontinue cruise control, and/or initiate an automated turning maneuver. For example, processing unit 110 may provide control signals to one or more of throttling system 220, braking system 230, and steering system 240 to navigate vehicle 200. In some embodiments, processing unit 110 may continue to analyze images to determine whether the system response should be interrupted (e.g., the arrow is no longer green—discontinue cruise control and apply brakes).

Through the exemplary disclosed processes 3000A and 3000B, system 100 may have enhanced functionality in providing autonomous control of vehicle 200. In particular, system 100 may be configured to react to a traffic signal based on detailed information provided by the traffic signal and provide an appropriate system response that allows for safe operation of vehicle 200. Further, while the above processes have been described in the context of an arrow signal, it should be understood that one or more of the steps thereof may be used in similar processes to determine a system response to other objects and/or signals, such as pedestrian signals, no-turn-on-red signals, fixed road signs, street signs, traffic advisory boards, billboards, etc.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A traffic light detection system for a vehicle, the system comprising:
   at least one image capture device configured to acquire a plurality of images of an area forward of the vehicle, the area including a traffic lamp fixture having at least one traffic light;
   a data interface; and
   at least one processing device configured to:
      receive the plurality of acquired images via the data interface;
      determine, based on analysis of at least two of the plurality of images, a change in a relative distance between at least two traffic lamp fixtures included in the at least two of the plurality of images;
      determine a distance from the vehicle to an intersection based on the change in the relative distance;
      determine, based on analysis of at least one of the plurality of images, a status of the traffic light; and
      cause a system response based on the determination of the status of the traffic light and the distance from the vehicle to the intersection.

2. The traffic light detection system of claim 1, wherein the at least one processing device is further configured to determine, based on analysis of at least one of the plurality of images, at least one indicator of vehicle position including a lane marker.

3. The traffic light detection system of claim 2, wherein the at least one indicator of vehicle position includes an arrow associated with the traffic lamp fixture.

4. The traffic light detection system of claim 2, wherein the at least one indicator of vehicle position includes a vehicle location acquired by GPS.

5. The traffic light detection system of claim 1, wherein the system response includes any of providing a notice to a driver of the vehicle, applying vehicle brakes, discontinuing cruise control, and initiating an automated turning maneuver.

6. The traffic light detection system of claim 1, wherein determining a status of the traffic light includes any of determining whether the traffic light is illuminated, determining a position of the traffic light within the traffic lamp fixture, and determining a color associated with the traffic light.

7. The traffic light detection system of claim 1, wherein the at least one processing device is further configured to determine, based on analysis of at least one of the plurality of images, whether an arrow exists in the at least one of the plurality of images within pixels of an image representative of the traffic light.

8. The traffic light detection system of claim 1, wherein the determined status of the traffic light is that it is a blinking yellow light.

9. The traffic light detection system of claim 8, wherein the at least one processing device is further configured to:
   determine whether one or more vehicles are approaching the intersection from the opposite direction; and
   if no vehicles are approaching the intersection from the opposite direction, cause the system response based on the determination of the status of the traffic light, the distance from the vehicle to the intersection, and the determination of whether one or more vehicles are approaching the intersection from the opposite direction,
   wherein the system response includes any of providing a notice to a driver of the vehicle, applying vehicle brakes, discontinuing cruise control, and initiating an automated turning maneuver.

10. The traffic light detection system of claim 1, wherein the at least one processing device is further configured to determine whether the vehicle is in a turn lane and whether the vehicle is authorized to proceed in the direction indicated by the determined status of the traffic light.

11. The traffic light detection system of claim 10, wherein determining whether the vehicle is in the turn lane and whether the vehicle is authorized to proceed comprises determining whether to turn left, turn right, or continue straight through the intersection based on a predetermined destination for the vehicle.

12. A vehicle, comprising:
a body;
at least one image capture device configured to acquire a plurality of images of an area forward of the vehicle, the area including a traffic lamp fixture having at least one traffic light;
a data interface; and
at least one processing device configured to:
- receive the plurality of acquired images via the data interface;
- determine, based on analysis of at least two of the plurality of images, a change in a relative distance between at least two traffic lamp fixtures included in the at least two of the plurality of images;
- determine a distance from the vehicle to an intersection based on the change in the relative distance;
- determine, based on analysis of at least one of the plurality of images, a status of the traffic light; and
- cause a system response based on the determination of the status of the traffic light and the distance from the vehicle to the intersection.

13. The vehicle of claim 12, wherein the at least one processing device is further configured to determine, based on analysis of at least one of the plurality of images, at least one indicator of vehicle position including a lane marker.

14. The vehicle of claim 13, wherein the at least one indicator of vehicle position includes a vehicle location acquired by GPS.

15. The vehicle of claim 12, wherein the system response includes any of providing a notice to a driver of the vehicle, applying vehicle brakes, discontinuing cruise control, and initiating an automated turning maneuver.

16. The vehicle of claim 12, wherein determining a status of the traffic light includes any of determining whether the traffic light is illuminated, determining a position of the traffic light within the traffic lamp fixture, and determining a color associated with the traffic light.

17. The vehicle of claim 12, wherein the at least one processing device is further configured to determine, based on analysis of at least one of the plurality of images, whether an arrow exists in the at least one of the plurality of images within pixels of an image representative of the traffic light.

18. The vehicle of claim 12, wherein the determined status of the traffic light is that it is a blinking yellow light, and the at least one processing device is further configured to:
- determine whether one or more vehicles are approaching the intersection from the opposite direction; and
- if no vehicles are approaching the intersection from the opposite direction, cause the system response based on the determination of the status of the traffic light, the distance from the vehicle to the intersection, and the determination of whether one or more vehicles are approaching the intersection from the opposite direction,
- wherein the system response includes any of providing a notice to a driver of the vehicle, applying vehicle brakes, discontinuing cruise control, and initiating an automated turning maneuver.

19. The vehicle of claim 12, wherein the at least one processing device is further configured to determine whether the vehicle is in a turn lane and whether the vehicle is authorized to proceed in the direction indicated by the determined status of the traffic light.

20. A method for traffic light detection, the method comprising:
- acquiring, via at least one image capture device, a plurality of images of an area forward of a vehicle, the area including a traffic lamp fixture having at least one traffic light;
- determining, based on analysis of at least two of the plurality of images, a change in a relative distance between at least two traffic lamp fixtures included in the at least two of the plurality of images;
- determining a distance from the vehicle to an intersection based on the change in the relative distance;
- determining, based on analysis of at least one of the plurality of images, a status of the traffic light; and
- causing a system response based on the determination of the status of the traffic light and the distance from the vehicle to the intersection.

21. The method of claim 20, further comprising determining, based on analysis of at least one of the plurality of images, at least one indicator of vehicle position including a lane marker.

22. The method of claim 21, wherein the at least one indicator of vehicle position includes an arrow associated with the traffic lamp fixture.

23. The method of claim 21, wherein the at least one indicator of vehicle position includes a vehicle location acquired by GPS.

24. The method of claim 20, wherein the system response includes any of providing a notice to a driver of the vehicle, applying vehicle brakes, discontinuing cruise control, and initiating an automated turning maneuver.

25. The method of claim 20, wherein determining a status of the traffic light includes any of determining whether the traffic light is illuminated, determining a position of the traffic light within the traffic lamp fixture, and determining a color associated with the traffic light.

* * * * *